United States Patent
Levy et al.

(10) Patent No.: US 10,698,916 B1
(45) Date of Patent: Jun. 30, 2020

(54) DATA PREPARATION CONTEXT NAVIGATION

(71) Applicant: DR HoldCo 2, Inc., Boston, MA (US)

(72) Inventors: Amnon Levy, Los Altos, CA (US);
Dave Brewster, Redwood City, CA (US); Pakshi Rajan, Belmont, CA (US); Nenshad Dinshaw Bardoliwalla, Castro Valley, CA (US); Jing Chen, Redwood City, CA (US); Lilia Gutnik, San Francisco, CA (US); Krupa Natarajan, Saratoga, CA (US)

(73) Assignee: DR HoldCo 2, Inc., Boston, MA (US)

( * ) Notice: Subject to any disclaimer, the term of this patent is extended or adjusted under 35 U.S.C. 154(b) by 860 days.

(21) Appl. No.: 15/294,605

(22) Filed: Oct. 14, 2016

Related U.S. Application Data

(60) Provisional application No. 62/242,820, filed on Oct. 16, 2015.

(51) Int. Cl.
| | | |
|---|---|---|
| *G06T 1/20* | (2006.01) | |
| *G06T 1/60* | (2006.01) | |
| *G06F 16/245* | (2019.01) | |
| *G06F 16/248* | (2019.01) | |

(52) U.S. Cl.
CPC ......... *G06F 16/248* (2019.01); *G06F 16/245* (2019.01); *G06T 1/20* (2013.01); *G06T 1/60* (2013.01)

(58) Field of Classification Search
None
See application file for complete search history.

(56) References Cited

U.S. PATENT DOCUMENTS

| | | | |
|---|---|---|---|
| 9,633,076 B1* | 4/2017 | Morton | G06F 16/248 |
| 9,858,292 B1* | 1/2018 | Setlur | G06F 16/248 |
| 9,870,362 B2* | 1/2018 | Lee | G06F 16/4393 |
| 10,248,720 B1* | 4/2019 | Wesley | G06F 16/34 |
| 2005/0262194 A1* | 11/2005 | Mamou | G06F 16/254 709/203 |
| 2013/0166598 A1* | 6/2013 | Vaitheeswaran | G06F 16/256 707/792 |
| 2015/0278371 A1* | 10/2015 | Anand | G06F 16/24578 707/723 |
| 2016/0253340 A1* | 9/2016 | Barth | G06F 16/122 707/756 |
| 2017/0109378 A1* | 4/2017 | Brewster | G06F 9/5066 |
| 2018/0095644 A1* | 4/2018 | Cheung | G06F 16/26 |

* cited by examiner

*Primary Examiner* — Richard L Bowen
(74) *Attorney, Agent, or Firm* — Goodwin Procter LLP

(57) ABSTRACT

Navigating to a data preparation context is disclosed. A set of data preparation operations is performed on one or more data sets to generate a set of answer sets in a first application. A final answer set in the set of answer sets is provided to a second application. In response to a user specification of a source-related query, a reference associated with the source-related query is obtained. A corresponding subset of the set of answer sets associated with one or more corresponding or relevant data preparation operations is determined according to the obtained reference. The corresponding subset of the set of answer sets associated with the one or more data preparation operations are presented in the first application according to the obtained reference.

20 Claims, 51 Drawing Sheets

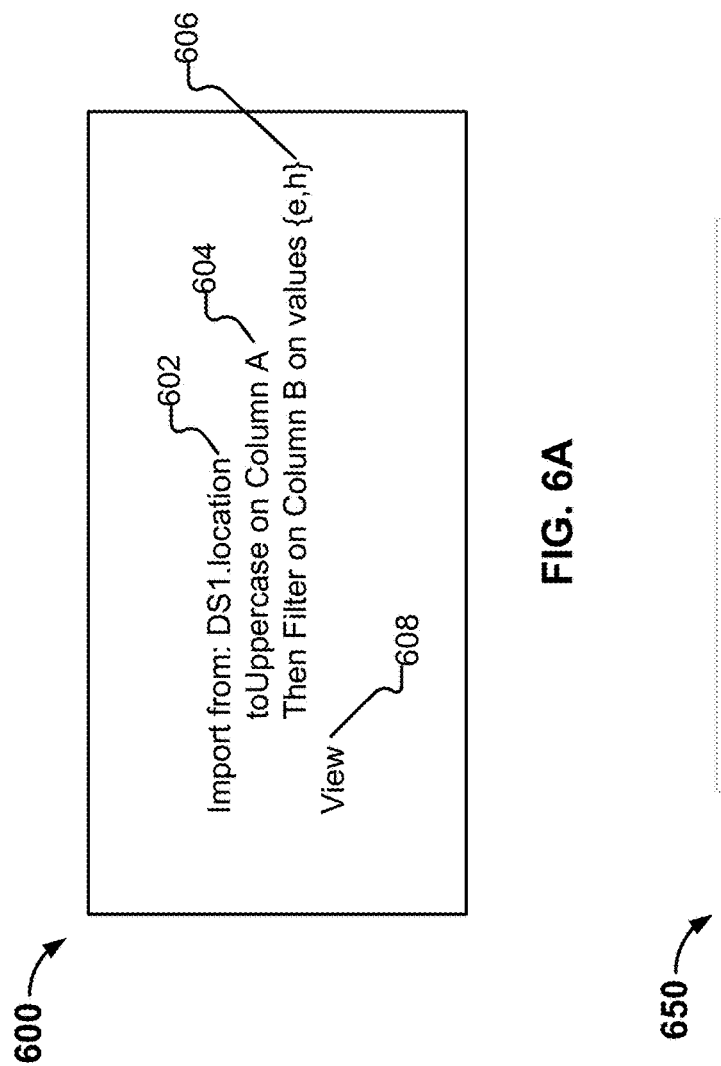

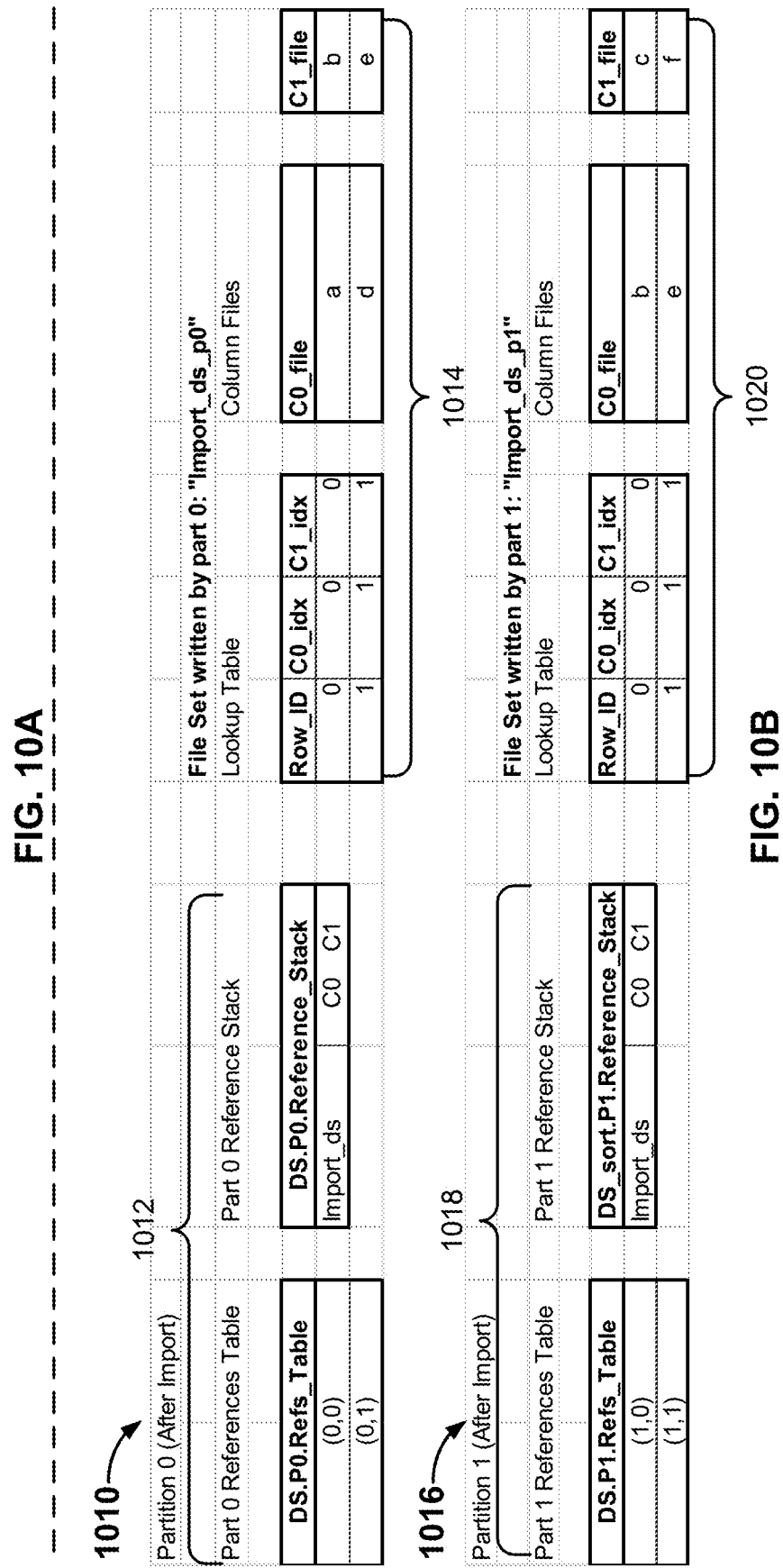

Sort on C0

| Data Before Sort | | | | Data After Sort | |
|---|---|---|---|---|---|
| C0 | C1 | | | C0 | C1 |
| a | b | | => | a | b |
| d | e | | | b | c |
| b | c | | | d | e |
| e | f | | | e | f |

1030 (Data Before Sort)
1032 (Data After Sort)
1034 (d)
1036 (b)

FIG. 10C

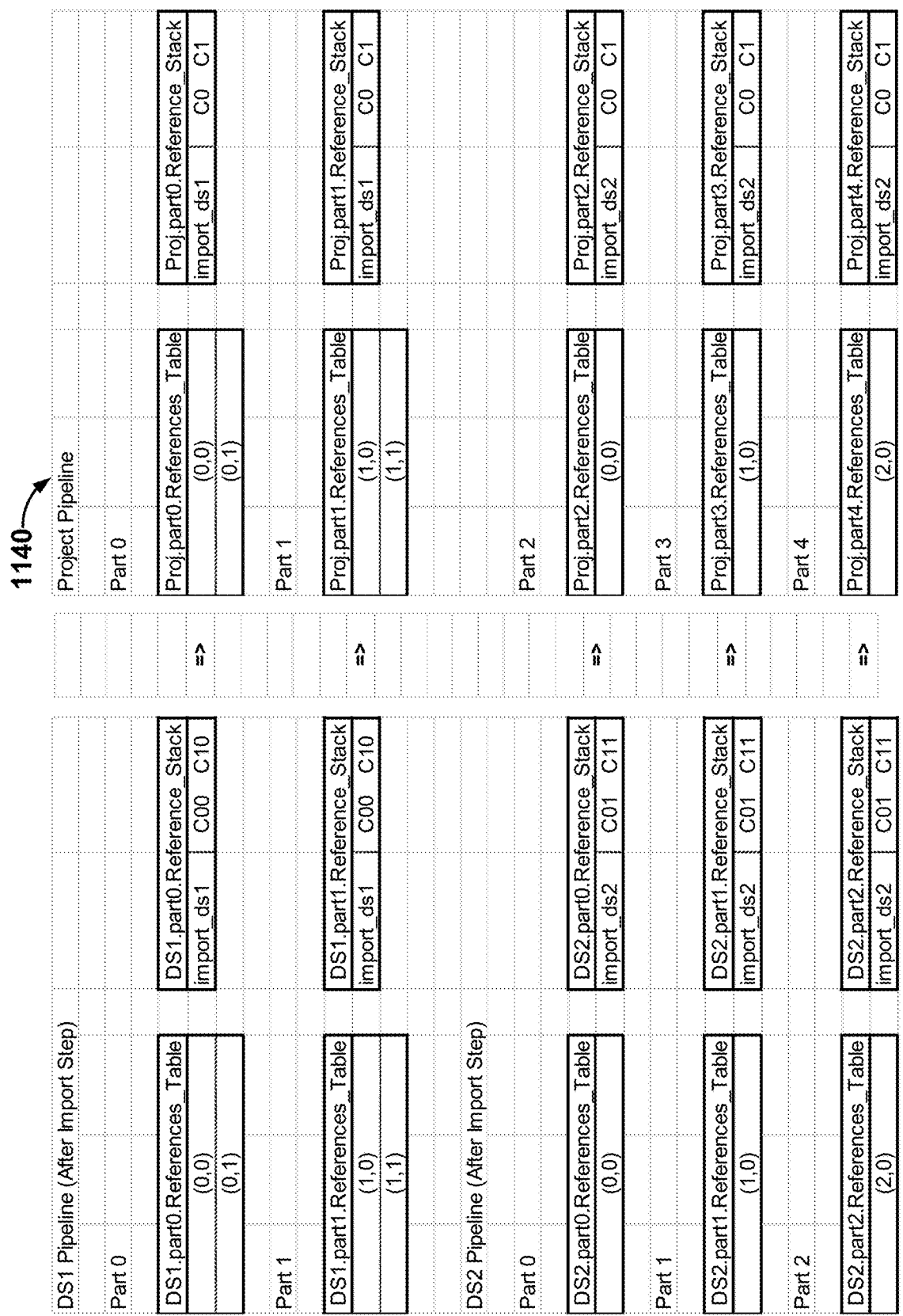

DS1 Pipeline (After Import Step)

Part 0

| DS1.part0.Refs_Table |
|---|
| (0,0) |
| (0,1) |

| DS1.part0.Reference_Stack | |
|---|---|
| import_ds1 | C00 C10 |

Part 1

| DS1.part1.Refs_Table |
|---|
| (1,0) |
| (1,1) |

| DS1.part1.Reference_Stack | |
|---|---|
| import_ds1 | C00 C10 |

DS2 Pipeline (After Import Step then LC on C11)

Part 0

| DS2.part0.Refs_Table |
|---|
| (0,0) |

| DS2.part0.Reference_Stack | |
|---|---|
| LC_ds2.C11_import_ds2 | C11 |
| import_ds2 | C01 |

File Set written by DS2.Part0 - "LC_ds2.C11_import_ds2_p0" Lookup Table

| Row_ID | C11_idx | | C11_file |
|---|---|---|---|
| (0,0) | 0 | | a |

Part 1

| DS2.part1.Refs_Table |
|---|
| (1,0) |

| DS2.part1.Reference_Stack | |
|---|---|
| LC_ds2.C11_import_ds2 | C11 |
| import_ds2 | C01 |

File Set written by DS2.Part1 - "LC_ds2.C11_import_ds2_p1" Lookup Table

| Row_ID | C11_idx | | C11_file |
|---|---|---|---|
| (1,0) | 0 | | b |

Part 2

| DS2.part2.Refs_Table |
|---|
| (2,0) |

| DS2.part2.Reference_Stack | |
|---|---|
| LC_ds2.C11_import_ds2 | C11 |
| import_ds2 | C01 |

File Set written by DS2.Part2 - "LC_ds2.C11_import_ds2_p2" Lookup Table

| Row_ID | C11_idx | | C11_file |
|---|---|---|---|
| (2,0) | 0 | | c |

FIG. 11F

DS1 Pipeline (After Import Step)

Part 0

| DS1.part0.Reference_Stack | | |
|---|---|---|
| import_ds1 | C00 | C10 |

| DS1.part0.Refs_Table | |
|---|---|
| (0,0) | |
| (0,1) | |

Part 1

| DS1.part1.Reference_Stack | | |
|---|---|---|
| import_ds1 | C00 | C10 |

| DS1.part1.Refs_Table | |
|---|---|
| (1,0) | |
| (1,1) | |

DS2 Pipeline (After Import Step then LC on C11)

Part 0

| DS2.part0.Reference_Stack | | |
|---|---|---|
| LC_ds2.C11_import_ds2 | | C11 |
| import_ds2 | | C01 |

| DS2.part0.Refs_Table | |
|---|---|
| (0,0) | |

Part 1

| DS2.part1.Reference_Stack | | |
|---|---|---|
| LC_ds2.C11_import_ds2 | | C11 |
| import_ds2 | | C01 |

| DS2.part1.Refs_Table | |
|---|---|
| (1,0) | |

Part 2

| DS2.part2.Reference_Stack | | |
|---|---|---|
| LC_ds2.C11_import_ds2 | | C11 |
| import_ds2 | | C01 |

| DS2.part2.Refs_Table | |
|---|---|
| (2,0) | |

FIG. 11G

Project Pipeline

Part 0

| Proj.part0.Reference_Stack | | |
|---|---|---|
| import_ds1 | C0 | C1 |

| Proj.part0.Refs_Table | |
|---|---|
| (0,0) | |
| (0,1) | |

Part 1

| Proj.part1.Reference_Stack | | |
|---|---|---|
| import_ds1 | C0 | C1 |

| Proj.part1.Refs_Table | |
|---|---|
| (1,0) | |
| (1,1) | |

Part 2

| Proj.part2.Reference_Stack | | |
|---|---|---|
| LC_ds2.C11_import_ds2 | | C1 |
| import_ds2 | | C0 |

| Proj.part2.Refs_Table | |
|---|---|
| (0,0) | |

Part 3

| Proj.part3.Reference_Stack | | |
|---|---|---|
| LC_ds2.C11_import_ds2 | | C1 |
| import_ds2 | | C0 |

| Proj.part3.Refs_Table | |
|---|---|
| (1,0) | |

Part 4

| Proj.part4.Reference_Stack | | |
|---|---|---|
| LC_ds2.C11_import_ds2 | | C1 |
| import_ds2 | | C0 |

| Proj.part4.Refs_Table | |
|---|---|
| (2,0) | |

Step 9 (Append results of step 4 and results of step 8)

Project Part 0

| PROJ.P0.REFS_TABLE | |
|---|---|
| (1,0) | (0,0) |
| (0,0) | (0,1) |

| PROJ.P0.REF_STACK | | |
|---|---|---|
| import_ds2 | B | J2 |
| import_ds1 | A | J1 |

Project Part 1

| PROJ.P1.REFS_TABLE | |
|---|---|
| ∅ | (1,0) |
| (1,1) | (1,1) |

| PROJ.P1.REF_STACK | | |
|---|---|---|
| import_ds2 | B | J2 |
| import_ds1 | A | J1 |

Project Part 2

| PROJ.P2.REFS_TABLE |
|---|
| ∅ |

| PROJ.P2.REF_STACK | | |
|---|---|---|
| import_ds2 | B | J2 |

Project Part 3

| PROJ.P3.REFS_TABLE |
|---|
| (1,2) |

| PROJ.P3.REF_STACK | | |
|---|---|---|
| import_ds2 | B | J2 |

FIG. 12E

DS1 Pipeline (As of Completion of Import stage in DS1 Pipeline)

Part 0

| Refs Table |
|---|
| (0,0) |
| (0,1) |

| Reference Stack | | |
|---|---|---|
| Import_ds1 | A | J1 |

Part 1

| Refs Table |
|---|
| (1,0) |
| (1,1) |

| Reference Stack | | |
|---|---|---|
| Import_ds1 | A | J1 |

DS2 Pipeline (As of Completion of Import stage in DS2 Pipeline)

Part 0

| Refs Table | |
|---|---|
| (0,0) | (0,0) |

| Reference Stack | |
|---|---|
| LC_DS2.J2 | J2 |
| Import_ds2 | B |

Part 1

| Refs Table | |
|---|---|
| (1,0) | (1,0) |
| (1,1) | (1,1) |
| (1,2) | (1,2) |

| Reference Stack | |
|---|---|
| LC_DS2.J2 | J2 |
| Import_ds2 | B |

FIG. 12F

Project Pipeline

Project Part 0

| PROJ.P0.REFS_TABLE | | |
|---|---|---|
| ∅ | ∅ | (0,0) |
| ∅ | ∅ | (0,1) |

| PROJ.P0.REF_STACK | |
|---|---|
| LC_ds2_J2 | J2 |
| import_ds2 | B _ |
| import_ds1 | A  J1 |

Project Part 1

| PROJ.P1.REFS_TABLE | | |
|---|---|---|
| ∅ | ∅ | (1,0) |
| ∅ | ∅ | (1,1) |

| PROJ.P1.REF_STACK | |
|---|---|
| LC_ds2_J2 | J2 |
| import_ds2 | B _ |
| import_ds1 | A  J1 |

Project Part 2

| PROJ.P2.REFS_TABLE | |
|---|---|
| (0,0) | (0,0) |

| PROJ.P2.REF_STACK | |
|---|---|
| LC_J2 | J2 |
| Import_ds2 | B _ |

Project Part 3

| PROJ.P3.REFS_TABLE | |
|---|---|
| (1,0) | (1,0) |
| (1,1) | (1,1) |
| (1,2) | (1,2) |

| PROJ.P3.REF_STACK | |
|---|---|
| LC_J2 | J2 |
| Import_ds2 | B _ |

| Company | 1902 {2015 Sales (millions) | Variance (millions) | 1904 {Project Step URL |
|---|---|---|---|
| Acme Bank | $1.23 | -$0.5 | https://server.com/proj_name=Proj/step=cluster |
| Beta Co | $0.90 | $0.13 | https://server.com/proj_name=Proj/step=cluster |
| Cool Bank | $0.89 | $0.25 | https://server.com/proj_name=Proj/step=cluster |
| Delta Co | $0.77 | -$0.11 | https://server.com/proj_name=Proj/step=cluster |
| ... | ... | ... | ... |
| ... | ... | ... | ... |
| ... | ... | ... | ... |
| ... | ... | ... | ... |

FIG. 19

| StepType | Syntax |
|---|---|
| Import | AnchorTableStep |
| Append | AppendStep |
| Find and Replace | BulkEditStep |
| Cluster and Edit | ClusterEditStep |
| Duplicate Column | DuplicateColumnStep |
| Computed Column | ExpressionStep |
| Manage Columns—includes all of the following operations: Hide, Reorder, Delete columns (**see note below*) | EditColumnsStep |
| Pivot—includes all of the following shaping operations: Deduplicate, Depivot, Transpose, Group and Pivot (**see note below*) | PivotStep |
| Transform—includes all of the following transformations: capital case, lowercase, upper case, unescaped HTML, blanks, custom value, rename, whitespace for both numeric and string values (**see note below*) | TransformStep |

FIG. 24

DATA PREPARATION CONTEXT NAVIGATION

CROSS REFERENCE TO OTHER APPLICATIONS

This application claims priority to U.S. Provisional Patent Application No. 62/242,820 entitled CLICK TO PREP filed Oct. 16, 2015 which is incorporated herein by reference for all purposes.

BACKGROUND OF THE INVENTION

Data processing tools such as data visualization applications can be used to provide answers facilitating data driven decisions. Typically, however, such tools only provide a final set of results and do not provide underlying data, and thus, it can be difficult for users of such tools to understand how those results were arrived at.

BRIEF DESCRIPTION OF THE DRAWINGS

Various embodiments of the invention are disclosed in the following detailed description and the accompanying drawings.

FIG. 6A illustrates an example embodiment of a script.

FIG. 6B illustrates an example embodiment of a data set to be processed.

FIG. 10A is a diagram illustrating an embodiment of a data set to be sorted.

FIG. 10B is a diagram illustrating an embodiment of data traversal programs and file sets.

FIG. 10C illustrates an example of a sorted result.

FIG. 11D illustrates an example embodiment of data traversal programs prior to an append.

FIG. 11E illustrates an example embodiment of data traversal programs subsequent to an append.

FIG. 11F illustrates an example embodiment of partitions and data traversal programs.

FIG. 11G illustrates an example embodiment of data traversal programs prior to an append.

FIG. 11H illustrates an example embodiment of data traversal programs subsequent to an append.

FIG. 11I illustrates an example embodiment of data traversal programs and file sets.

FIGS. 12C-E illustrate an example embodiment of a process for performing a join.

FIG. 12F illustrates an example embodiment of data traversal programs prior to a join.

FIG. 12G illustrates an example embodiment of data traversal programs subsequent to a join.

FIGS. 15A-E illustrate example embodiments of user interfaces of a step editor.

FIG. 19 is an example embodiment of a portion of an answer set including reference metadata.

FIG. 24 illustrates example step types.

DETAILED DESCRIPTION

Figure 1:
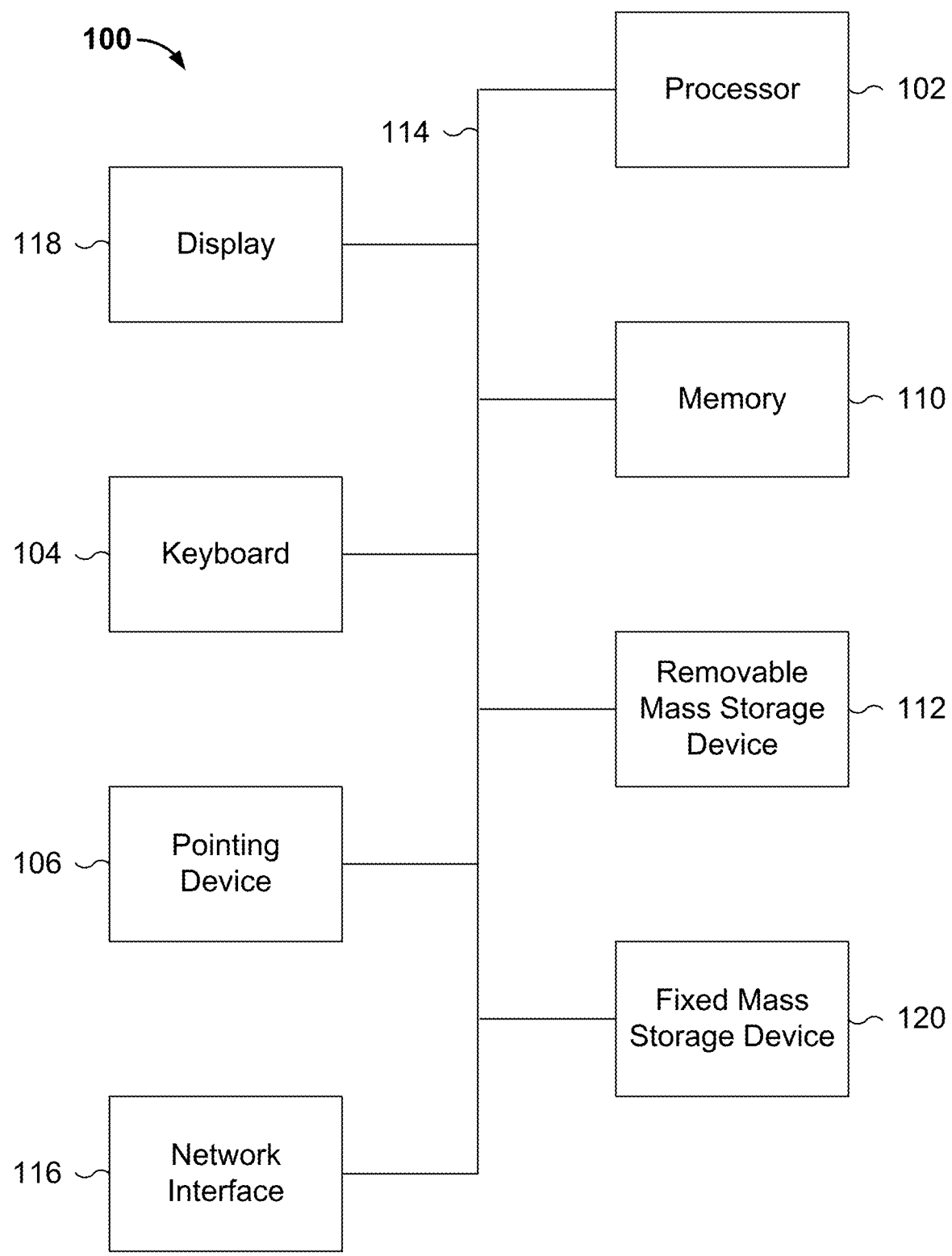
FIG. 1 is a functional diagram illustrating a programmed computer system for using a step editor for data preparation in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Using the techniques described herein, a distributed computing platform such as Apache Spark™ can be efficiently utilized to perform sequenced data preparation operations (i.e., a set of operations that are applied in sequential order) on data sets to generate transformation results. As used herein, a data preparation operation refers to an operation used to transform/mutate an input data. The input data is accessible dynamically upon execution of a set of sequenced operations, where the data is not necessarily stored, but may be computed on-the-fly, as needed. This is in contrast to operating against data stored at a fixed and known location, and is performed without the advantages of prior indexing and partitioning. The input data includes data that is organized (e.g., into rows and columns). Various examples of data preparation operations include clustering, joining, appending, sorting, uppercase, lowercase, filtering, deduplicating, grouping by, adding or removing columns, adding or removing rows, pivoting, depivoting, order dependent operations, etc. The representation of the transformation results is referred to herein as a "data traversal program," which indicates how to assemble one or more affected columns in the input data to derive a transformation result. The representation of the transformation results can be stored for reuse along with corresponding operation signatures, allowing cached results to be identified and obtained for reuse.

Navigation to a relevant data preparation context is disclosed. In some embodiments, a set of data preparation operations is performed on one or more data sets to generate a set of answer sets in a first application. A final answer set in the set of answer sets is provided to a second application. In response to a user specification of a source-related query, a reference associated with the source-related query is obtained. A corresponding subset of the set of answer sets associated with one or more corresponding data preparation operations is determined according to the obtained reference. The determined corresponding subset of the set of answer sets is presented in the first application.

FIG. 1 is a functional diagram illustrating a programmed computer system for navigating to a relevant data preparation context in accordance with some embodiments. As will be apparent, other computer system architectures and configurations can be used to perform automated join detection. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide front end 200 of FIG. 2, pipeline server 206 of FIG. 2, and data preparation application 1702 of FIG. 17, and/or executes/performs process 500, 1300, 1400, 1600, and/or 2000.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storages 112, 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
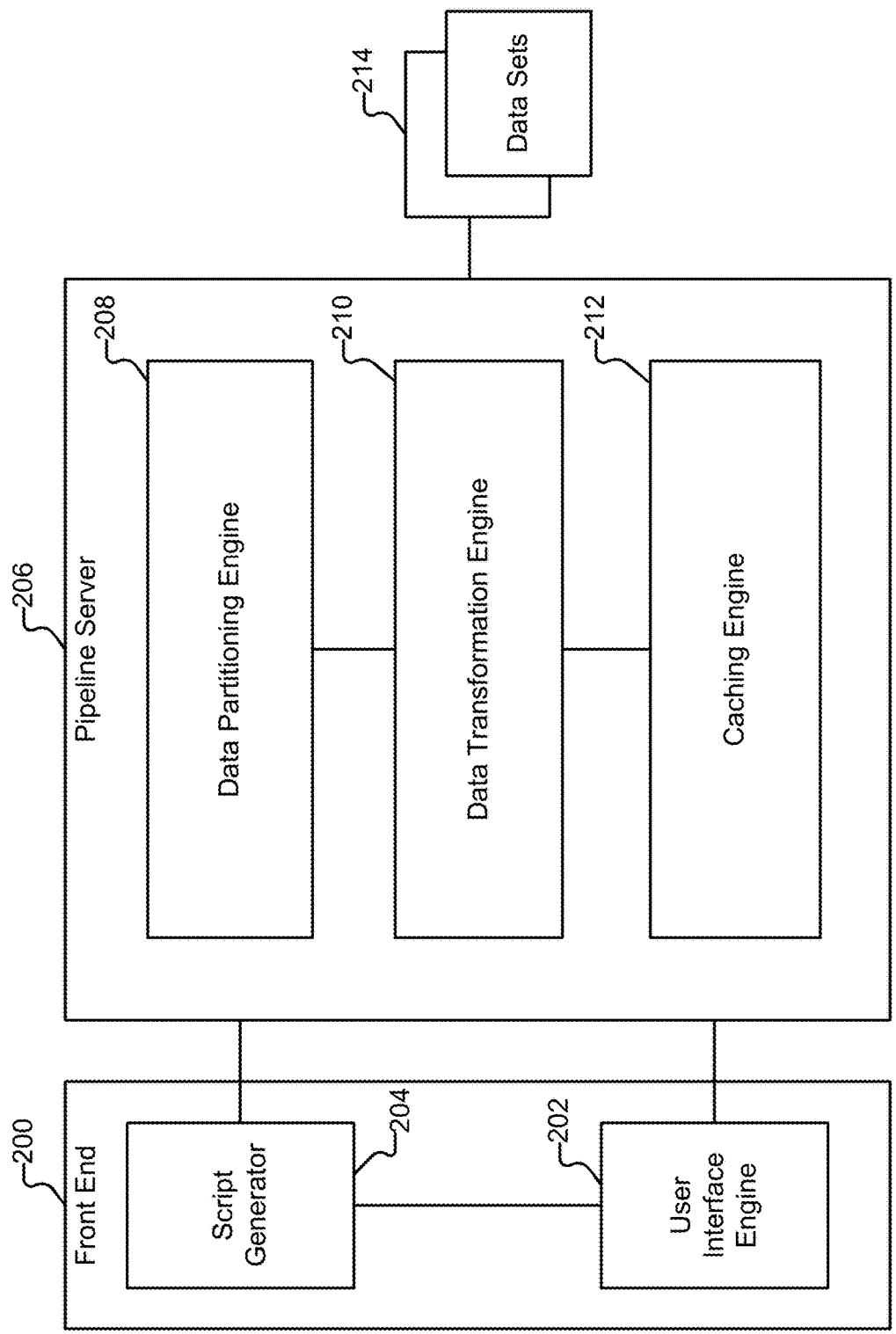
FIG. 2 is a system diagram illustrating an embodiment of a system for data preparation.

FIG. 2 is a system diagram illustrating an embodiment of a system for data preparation. The system includes front end server (or application) 200 and pipeline server 206. Each server can be implemented using a system such as 100.

Front end 200 is configured to provide an interface for configuring data preparation. Front end 200 interacts with the pipeline server 206. In various embodiments, front end 200 can be implemented as a standalone application and/or a browser-based client application executing on a client device and communicating with the pipeline server, as a J2EE application server such as Tomcat or Jetty, or a combination thereof. Front end 200 includes user interface engine 202 and script generator 204.

User interface engine 202 is configured to interact with pipeline server 206 to present table data, configuration options, results of sequenced operations, and any other appropriate information to the user in user interface screens and receive user input from user interface components. For example, user interface engine 202 is configured to provide editor user interfaces by which users can specify a sequence of data preparation operations to be performed on one or more sets of data to generate one or more transformation results. The specified sequenced set of operations, which are to be applied in a specified order, forms a pipeline through which one or more sets of data are processed. The data sets include tables of data that include data records organized in rows and columns. Examples of user interfaces provided by user interface engine 202 are described in conjunction with FIGS. 15A-E.

Script generator 204 is configured to generate a script based on the data sets and sequence of operations specified by a user using the one more user interfaces provided by user interface engine 202. The script includes a formatted set of instructions that includes a specification of the one or more data sets to be operated on and the sequenced set of operations specified to be performed on the one or more data sets. In some embodiments, the pipeline specified in the script is referred to as an application. An example of a script generated using script generator 204 is described in conjunction with FIG. 6A.

Pipeline server 206 is configured to perform data preparation. In some embodiments, the pipeline server receives a script from script generator 204, and performs a sequenced set of data preparation operations (which form a pipeline) on one or more input data sets (e.g., data sets 214) according to the script. A data set can be stored in a memory (e.g., a random access memory), read or streamed from a storage (e.g., a local disk, a network storage, a distributed storage server, etc.), or obtained from any other appropriate sources. Pipeline server 206 can be implemented on one or more servers in a network-based/cloud-based environment, a client device (e.g., a computer, a smartphone, a wearable device, or other appropriate device with communication capabilities), or a combination. In some embodiments, the pipeline server is deployed as an application. The pipeline server can be implemented using a system such as 100. In some embodiments, the pipeline server is implemented using a distributed computing platform, such as Apache Spark™. While example embodiments involving Apache Spark™ are described below, any other distributed computing platform/architecture can be used, with the techniques described herein adapted accordingly. Pipeline server 206 includes data partitioning engine 208, data transformation engine 210, and caching engine 212.

Data partitioning engine 208 is configured to partition input data sets (e.g., data sets 214) and distribute them to a cluster of processing nodes in a distributed computing environment. In some embodiments, the data partitioning engine is configured to pre-process the input data so that it can be translated into a form that can be provided to a distributed computing platform such as Apache Spark™. Determining the distribution of the data in a data set includes determining how obtained data sets should be divided/partitioned into logical partitions/work portions, and includes determining how many partitions should be generated, as well as the load to assign each partition. In some embodiments, the partition determination is based on various cost functions. The operations of the data partitioning engine are described in greater detail below.

Data transformation engine 210 is configured to perform data preparation. Performing data preparation includes determining transformation results by performing a sequenced set of data preparation operations on one or more sets of data. In some embodiments, the data transformation engine is a columnar data transformation engine. In some embodiments, the data transformation engine is also configured to perform caching of results, as well as lookups of existing cached results for reuse.

As will be described below, the data transformation engine is configured to efficiently perform the sequenced data preparation operations by generating a compact representation (referred to herein as a "data traversal program") of the transformation results of a set of sequenced operations on one or more sets of data. The data traversal program includes references and reference stacks which, when used in conjunction with column files, indicate how to assemble one or more affected columns in the one or more sets of data that were operated on to derive a transformation result. The operations of the data transformation engine are described in greater detail below.

Caching engine 212 is configured to perform caching and cache identification. For example, the data traversal program/representation of the results determined using data transformation engine 210 can be cached at various points (e.g., after a particular subset of sequenced data preparation operations) for reuse. The data being cached can be stored in a cache layer, for example in memory (e.g., random access memory), stored on a local or networked storage device (e.g., a disk or a storage server), and/or any other appropriate devices. The results can be cached, for example, based on an explicit request from a user (e.g., via an interaction with a step editor user interface provided by user interface engine 202). The results can also be cached automatically, for example, based on factors such as the complexity of operations that were performed to arrive at the result. The cached representations can be identified based on corresponding signatures. For example, the caching engine can take as input a set of sequenced operations (e.g., received in a script generated from user input via step editor user interfaces provided by user interface engine 202), derive an operation signature, and compare it to the signatures associated with existing cached results. The operations of the caching engine are described in greater detail below.

The engines described above can be implemented as software components executing on one or more processors, as hardware components such as programmable logic devices (e.g., microprocessors, field-programmable gate arrays (FPGAs), digital signal processors (DSPs), etc.), Application Specific Integrated Circuits (ASICs) designed to perform certain functions, or a combination thereof. In some embodiments, the engines can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application. The engines may be implemented on a single device or distributed across multiple devices. The functions of the engines may be merged into one another or further split into multiple sub-engines.

Figure 3:
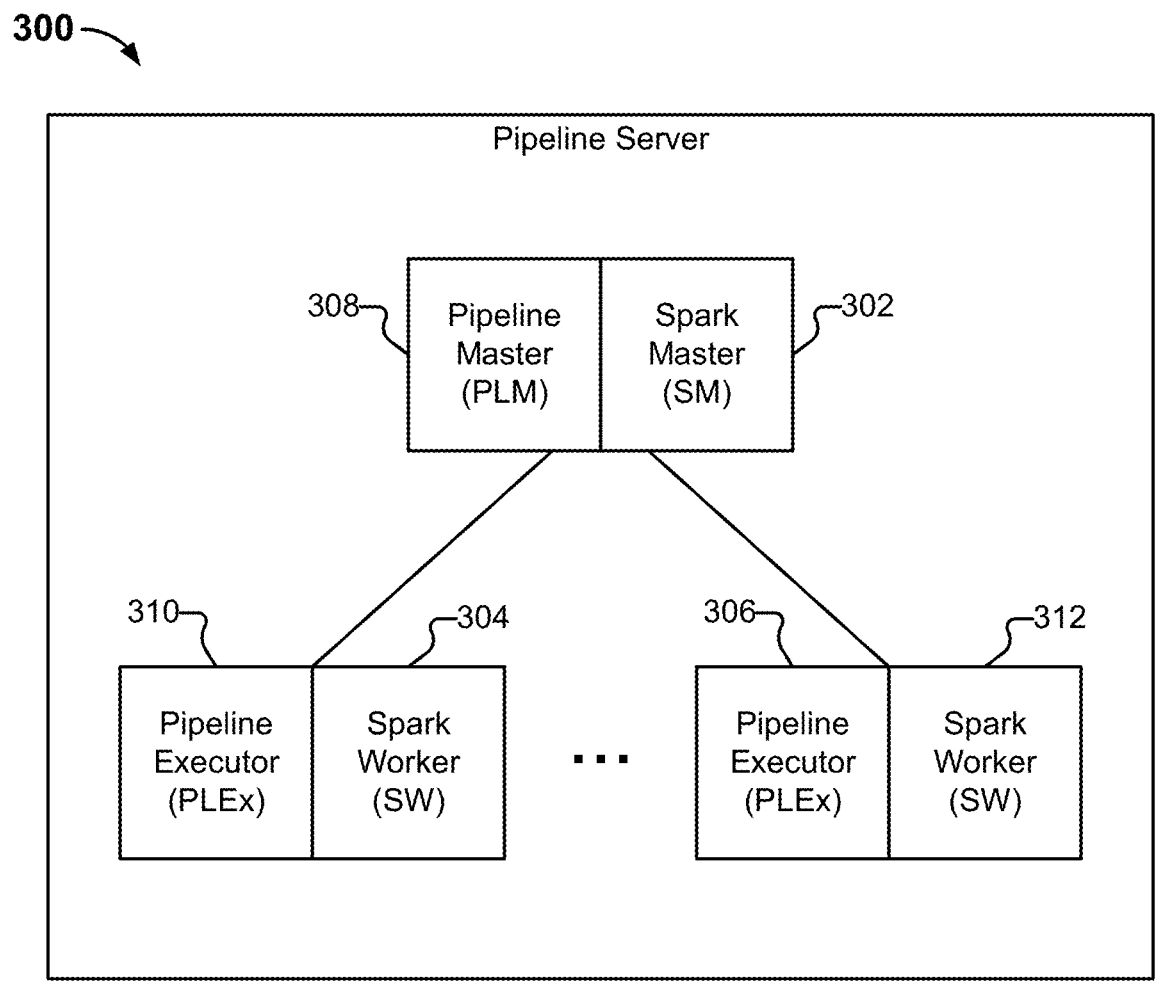
FIG. 3 is a system diagram illustrating an embodiment of a pipeline server.

FIG. 3 is a system diagram illustrating an embodiment of a pipeline server. In some embodiments, pipeline server 300 is an example of pipeline server 206 of FIG. 2. In this example, pipeline server 300 is implemented using a distributed computing platform. In some embodiments, the distributed computing platform of pipeline server 300 is used to implement data partitioning engine 208, data transformation engine 210, and caching engine 212 of FIG. 2.

Shown in pipeline server 300 is an example embodiment of a Spark cluster. The cluster includes a Spark master (302) and Spark workers (304 and 312). In some embodiments, the Spark cluster is implemented using a master-slave architecture. In some embodiments, the Spark master is configured to coordinate all work that is to be executed (in possibly a distributed manner) In some embodiments, the Spark workers are responsible for receiving and executing pieces of work that point at some data with instructions as to the operations to perform. The Spark master and workers can be implemented, for example, as Java applications.

In some embodiments, the Spark master is configured to receive requests (e.g., jobs) from external clients. The Spark master is configured to break down the job into smaller chunks (work portions) and distribute the work to the various Spark workers. When a Spark worker completes its portion of the work, it returns the results to the Spark master. Once all of the workers return their respective results, the Spark master compiles all of the worker results and returns the final result to the requesting client.

In some embodiments, when run in a standalone mode, the Spark master is configured to track the health/status of the workers manage work scheduling.

In some embodiments, both the Spark master and workers use a companion application (e.g., a purpose-built Spark application) to perform the actual work. In some embodiments, the companion application runs on all of the machines that run a Spark process (both Master and workers). The run-time instance of the companion application (also referred to herein as a "pipeline" application) that runs on the worker machine is referred to herein as a Spark "pipeline executor." A Spark worker is configured to perform its job through the executor application.

In this example, while two Spark workers are shown, any number of Spark workers may be established in the cluster. In some embodiments, an application (e.g., data preparation application initiated by a front end such as front end 200) provisions the cluster of nodes to perform a set of sequenced operations comprising a pipeline through which data sets are pushed. In some embodiments, each Spark master or worker is a node comprising either a physical or virtual computer, implemented in various embodiments as a device, a processor, a server, etc.

In this example, the Spark master is designated to communicate with a "pipeline master" (308), and the Spark workers are designated to communicate with pipeline executors (310 and 306). The pipeline masters/executors connect with Spark software residing on their corresponding nodes.

As described above, the pipeline server receives a script that specifies one or more input data sets and a set of sequenced data preparation operations that form a pipeline through which the input data sets are to be processed. The pipeline server, using the distributed computing platform, processes the input data according to the received script.

Data Partitioning

In this example, the pipeline master is configured to perform partitioning of the input data sets. In some embodiments, the pipeline master is used to implement data partitioning engine 208 of FIG. 2. Partitioning includes dividing a data set into smaller chunks (e.g., dividing a data set with one hundred rows into five partitions with twenty rows each). In some embodiments, the set of data is divided into work portions, or pieces of work that are to be performed. The pipeline master is also configured to distribute the partitions to the various established pipeline executors in the provisioned cluster for processing. In a Spark implementation, a division/partition (also referred to as a "portion of work" or "work portion") of the data set is represented as a Resilient Distributed Dataset (RDD). Other partition formats are possible for other distributed platform implementations.

When partitioning data, various tradeoffs exist when determining how many partitions to create and/or how many rows/how much to include in each partition. For example, while an increase in the number of slices of data can lead to an increase in parallelism and computation speed, the increased number of partitions also results in increased overhead and increased communication bandwidth requirement, due to data having to be communicated back and forth between an increasing number of nodes. This can result in inefficiencies. Using the techniques described herein, partitioning can be optimized. For example, an optimal number of partitions and/or an optimal size/number of rows per partition can be determined.

The master node is configured to devise or consume an intelligent strategy to partition a data set by taking into consideration various pieces of information. In various embodiments, the considered information includes information about the data being operated on, the data preparation operations to be performed, the topology/performance characteristics of the distributed computing environment, etc. By considering such information, a partitioning strategy can be devised that optimizes, for example, for reliable throughput throughout the nodes of a cluster so that the nodes can complete processing at approximately the same time. Thus, for example, straggling in the distributed computing environment can be reduced (e.g., where some workers are spending more time performing their portion of the work as compared to other workers, and must be waited upon).

The information about the data being operated on includes metadata information about the data. In one example embodiment, the Spark (pipeline) master queries an input data set (e.g., obtained from a source location described in a received script). The pipeline master probes the data set to determine metadata describing the data set. In various embodiments, the metadata includes the number of rows that are in the data set, the number of columns that are in the data set, etc. In some embodiments, the metadata that is determined/generated includes statistical information, such as histogram information about how data is distributed within the data set. For example, it may be determined that some rows in the data set are denser than others. The metadata determined as a result of the analysis (e.g., statistical analysis) is used in part by the pipeline master to devise an intelligent partitioning strategy.

Example embodiments of partitioning strategies are described below.

Example Strategy 1: Partitioning Based on Row Count

In this example strategy, a data set is divided based on row count, so that in this context-free approach (e.g., where metadata information about the rows or other information is not utilized), each Spark worker/pipeline executor is given a fixed (e.g., same) number of rows. In some embodiments, an assumption is made that each row will take the same amount of resources and time to process.

Example Strategy 2: Partitioning Based on a Size of Rows/Amount of Data

In this example strategy, a data set is divided in part based on the sizes of the rows in the data set. A statistical analysis is performed on the data to determine the density and/or amount of the data in the rows of the data set (e.g., the amount of data may vary from row to row). For example, metadata indicating the amount of space that a row takes is determined. The data set is divided in a manner such that each partition includes the same amount of data (but may include varying numbers of rows).

In some embodiments, the number of rows is utilized as a secondary criterion in addition to the size of the rows. For example, a number of rows that has a data size of a given amount is determined for a partition. If the number of rows exceeds a threshold number of rows (or is more than a threshold number of deviations away from a mean number of rows), then the number of rows in the partitions is trimmed, and capped at the threshold. For example, each partition is assigned 100 MB of data or 200,000 rows, whichever produces fewer rows.

The use of the number of rows as a secondary criterion is based in part on the columnar nature of the data transformation, where data is transformed based on data preparation operations performed with respect to a particular column or columns, and it is those columns which are affected by the data preparation operations which determine the amount of computational effort needed to perform an operation. However, a row includes data cells in every column of a data set, and the size of the row may be concentrated in data cells that are in columns that do not materially contribute to the cost of an operation. By using a number of rows as a secondary criterion, columns that have outlier distributions in terms of size can be eliminated (assuming that most common data preparations are operating on data that is fairly uniform in distribution). This provides a limiter for how much data will ultimately be processed in the distributed computing system.

Figure 4:
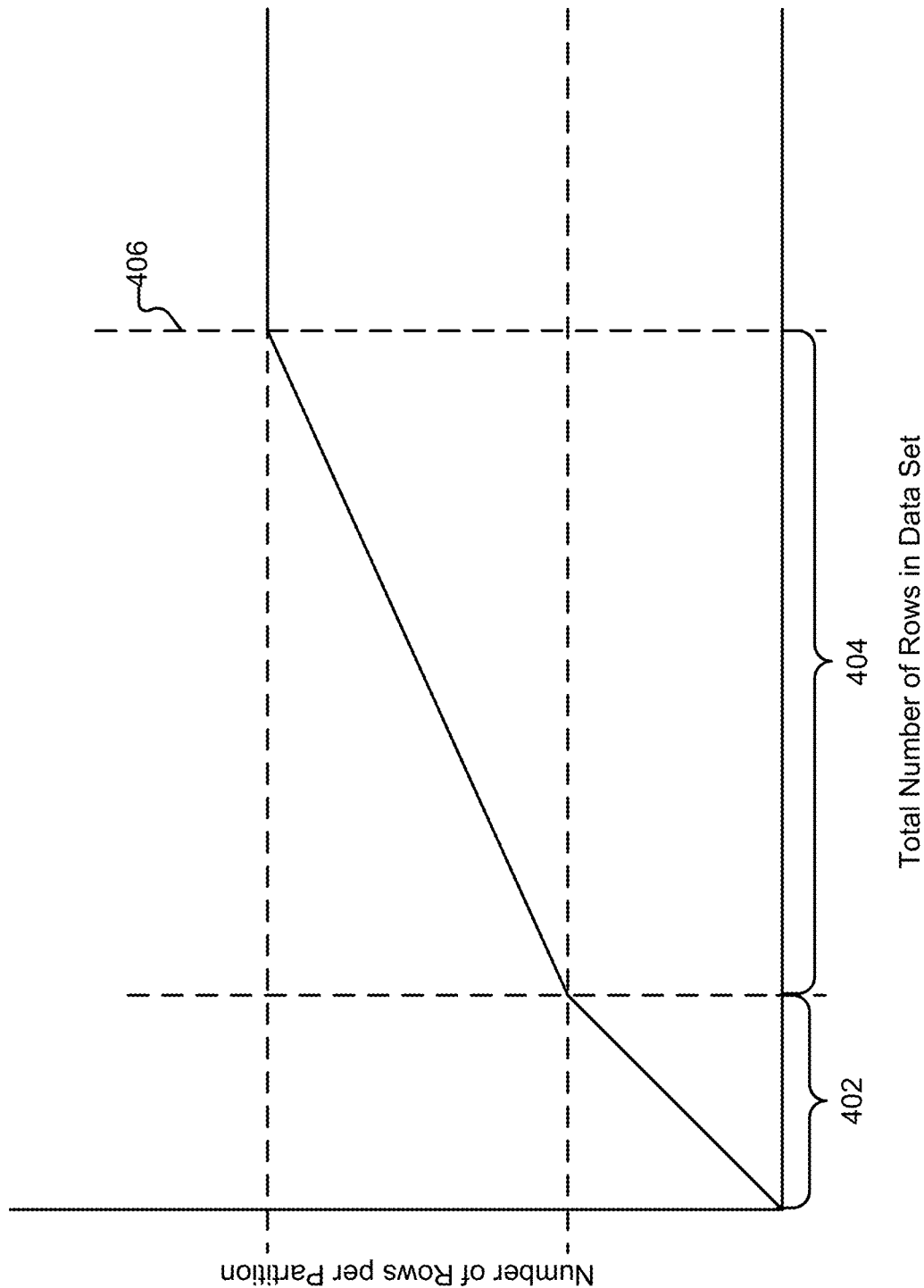
FIG. 4 illustrates an example embodiment of a three-part function.

In some embodiments, the limit/maximum number of rows per partition is determined as a function of the total number of rows for an entire data set. An example plot illustrating an embodiment of a three-part function is shown in FIG. 4. The slopes and transition points of the line segments shown in the figure are empirically determined and may vary in different embodiments. In this example, for data sets whose number of rows falls within range 402, partitions are loaded with a larger proportion of the total number of rows of the data set. For example, for very small data sets, a single partition is loaded with all of the data. By doing so, data will not need to be distributed across partitions (and potentially to different nodes), reducing resource overhead. Thus, in this first region 402, for smaller input data sets, it is more efficient to divide the data set into fewer partitions; in other words, the partitioning technique favors putting more rows into a single partition.

For data sets with a total number of rows in range 404, new partitions are steadily added as the total number of rows are increased, where the size of each partition grows steadily. In comparison to region 402, in region 404, the rate at which rows are added to partitions is slower. For example, in this range, the addition of new partitions is favored over adding rows to those partitions. While rows are still added to partitions steadily, which may sacrifice some partitions' performance on a node (as the node will have to process more row data), they are added at a rate such that the number of partitions to be processed does not expand too much.

For data sets whose total number of rows exceeds threshold 406, the number of rows that can be included in a partition is frozen and does not grow, where the addition of more partitions is favored. Thus, an upper bound on the number of rows that can be included in a single partition is established, allowing for the knowledge that each partition will be able to process a limited (upper-bounded) amount of data in a relatively fixed amount of time.

Example Strategy 3: Partitioning Based on a Size of Active Portions of Rows

In this strategy, as in strategy 2, an amount of data to include in a partition is considered. However, only the data in those columns that are involved (i.e., active) in (or affected by) an operation (or set of sequenced operations) is considered. For example, if, out of four total columns, only three of those columns are involved in a data preparation operation (e.g., a join operation that uses these three columns), then only the data in those three columns is determined. The data set is then partitioned according to the amount of data in the active columns (e.g., as described above in strategy 2). In some embodiments, a density of data in the active portions of rows is used as another factor to determine partitioning.

In some embodiments, strategies 2 and 3 are context aware, and take into account attributes and characteristics of the data set to be processed (e.g., metadata information determined about the rows of the data set). In some embodiments, the context aware strategies also take into account the physical characteristics of the cluster, such as the amount of memory that a partition will require and the amount of memory that a pipeline executor working on a partition can accommodate. For example, the amount (memory size) of data that can be in a partition can be set so that it does not exceed the memory that an executor is allocated to use. Other physical characteristics of the cluster that are taken into account include performance metrics such as an amount of processing power, network bandwidth metrics, etc., as will be described in further detail below.

The nodes in a cluster may be physical machines with varying performance characteristics. For example, suppose that a cluster includes two computing nodes. The first has 8 processor cores, with 10 GB of memory per core (i.e., a total of 80 GB of memory), while a second node has 16 processor cores, also with 10 GB of memory per core (i.e., a total of 160 GB of memory). Based on these memory/processing characteristics of the nodes, and using a heuristic in which a worker is allocated 10 GB per processor core, a number of workers that is a multiple of three should perform the work across the two nodes. This is because the first node has one-third of the total memory, while the second node has two-thirds of the total memory (i.e., the ratio of memory for the two nodes is 1:2), and having a number of workers that is a multiple of three will ensure that the total amount of memory in the cluster is fully utilized.

However, given that the nodes of the cluster may vary in performance characteristics, and that the cluster structure may change, in some embodiments, the creation of partitions is done without explicit knowledge of the actual processing capabilities of the cluster. Rather, each partition is allocated a pre-specified amount of computing resources, such as an amount of memory (e.g., 10 GB) per core. The data set is then divided according to the performance heuristic/characteristic (e.g., into chunks that are some multiple of 10 GB).

Thus, for example, if a partition is allocated a maximum of 10 GB of memory per core, then the first node, with 80 GB of total memory across 8 cores can support 8 partitions/workers (where one partition corresponds to one worker). In this example, the property of an amount of RAM per core has been reduced down to a principle/heuristic that can be applied to tasks (and without explicit knowledge of the actual hardware of the cluster).

In some embodiments, a partition is processed by one worker, and the amount of resources that can be allocated to a partition/worker is embodied in an atomic computing unit, which defines the performance characteristics of a worker unit that can work on a partition. The atomic computing unit is associated with a set of performance metrics whose values indicate the amount of resources that a worker/pipeline executor has to process the partition. In addition to an amount of memory per core, as described above, other properties that can be reduced down into this higher level form include network bandwidth, latency, and core performance. By defining a higher level view of the amount of resources available to a single worker unit (working on a partition), the cost in resources for adding partitions (and more worker units) can be determined. For example, a cost function can be used to determine, given a set of performance characteristics/heuristics, a cost of computing a result. In some embodiments, a unit of cost is computed (e.g., for a worker to process some number of rows/amount of data). The data is then divided based on the computed unit of cost to determine a number of workers needed to process the data.

Thus, using the higher level view of the performance characteristics of an atomic worker unit, a number of workers needed to work on a data set can be determined (i.e., the number of pieces of work/partitions into which the data should be divided). Additionally, the number of partitions/pieces of work to create versus the number of rows to add to a partition can be evaluated based on computation costs.

In some embodiments, the determination of how to partition a data set is based on the characteristics of an operation to be performed. For example, different types of operations will have different computational costs. As one example, a function that takes a single input and provides an output solely based on that input, such as an uppercase operation, has a constant cost. Other types of operations, such as sort, which may require partitions to communicate with each other, may have larger costs (e.g., order of log n divided by the number of partitions for sort). A data set can then be partitioned based in part on the cost to perform the operations specified in a received script.

Any combination of the strategies and techniques described above can be used to determine a strategy for partitioning a data set according to a cost function. In some embodiments, the partitions are contiguous and non-overlapping. As one example, suppose that a data set of 200 rows, indexed from 0 to 199, is divided equally into four logical partitions (e.g., using strategy 1 described above). A first partition will have rows 0-49, a second partition will have rows 50-99, a third partition will include rows 100-149, and a fourth partition will include rows 150-199. In some embodiments, the partitions are ordered as well, such that the rows obtained/read from partition N+1 follow the rows obtained/read from partition N. Thus, a data set can be read in row order by reading each partition in sequential order. The partitions are then distributed to the pipeline executors/Spark workers in the distributed computing deployment architecture. For example, a Spark scheduler determines where (e.g., node) a partition/piece of work is to be assigned and processed.

Figure 5:
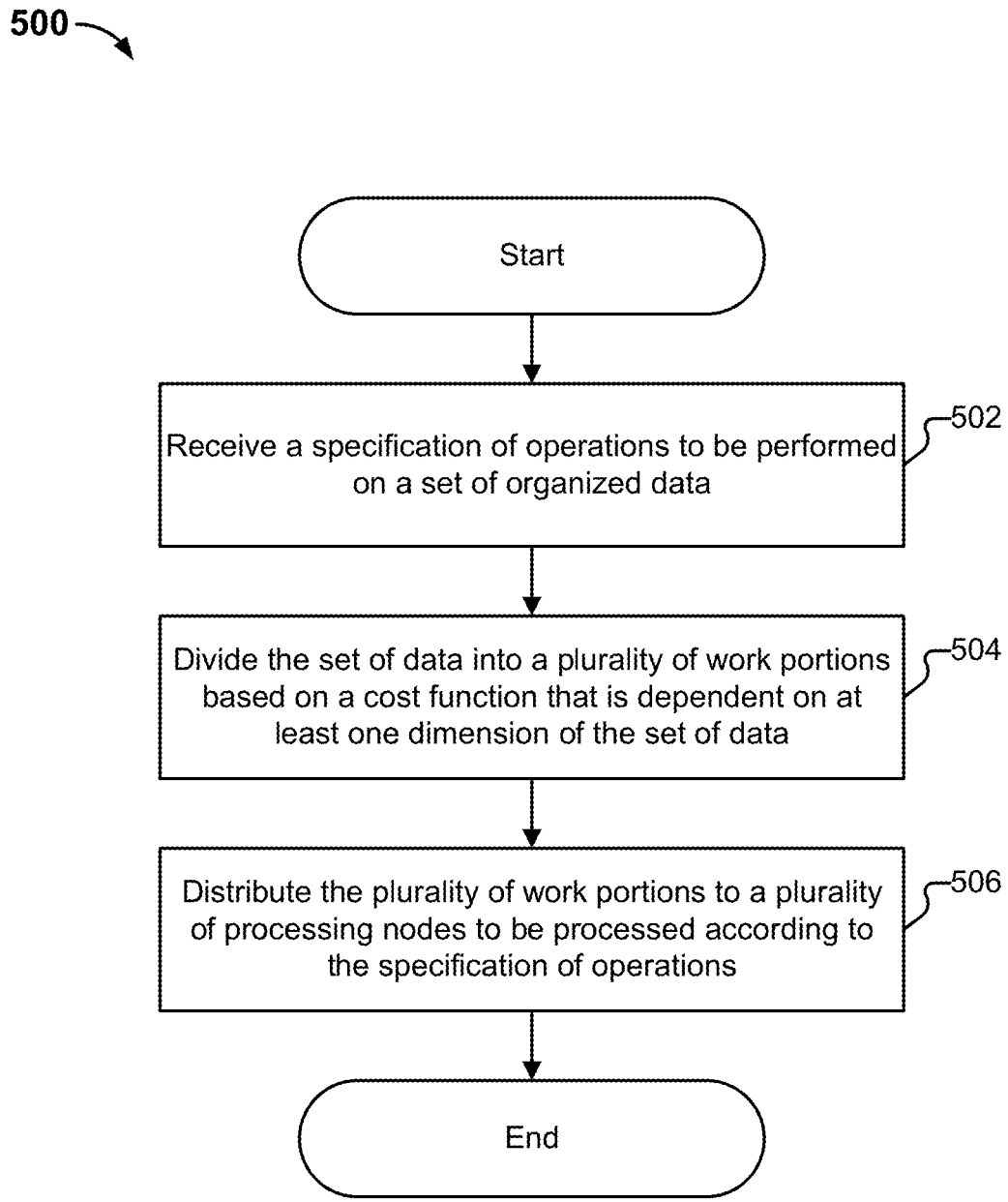
FIG. 5 is a flow diagram illustrating an example embodiment of a process for partitioning.

FIG. 5 is a flow diagram illustrating an example embodiment of a process for partitioning. In some embodiments, process 500 is executed by data partitioning engine 208 of FIG. 2. The process begins at 502 when a specification of a set of sequenced operations to be performed on a set of organized data is received. In some embodiments, the sequenced operations include data preparation operations. As one example, the set of data can be organized into rows and columns, or any other appropriate dimensions. The specification of the set of sequenced operations to be performed on the set of organized data can be received in the form of a script (e.g., generated based on user input via a step editor user interface, imported from a file, etc.), as described above.

At 504, the set of data is divided into a plurality of work portions based on a cost function that is dependent on at least one dimension of the set of data. In some embodiments, the set of data is divided based on a cost function that takes into account a number of rows to include in a work portion. The cost function can take into account various factors, such as an amount of data to be processed, the computational cost of creating additional work portions/partitions, the cost to add rows to a partition/work portion, the computational cost of operations to be performed, etc. Examples of techniques and strategies for dividing a set of data into a plurality of work portions/partitions are described above. If multiple data sets are specified in the specification, the data sets can be divided into logical partitions in their own respective namespaces.

At 506, the plurality of work portions is distributed to a plurality of processing nodes to be processed according to the specification of operations. For example, a scheduler (e.g., Spark scheduler) distributes the determined work portions to processing nodes in a distributed computing cluster. In some embodiments, the determined work portions are sent to the processing nodes via a tree-structured description of dependent operations to be performed on some input data. An example of dependent operations is as follows: making a change to column A that depends on a change to column B that depends on a cache of columns A, B, and C.

The above described strategies and techniques for distributed pipeline optimization provide various benefits. For example, as described above, a data set can be distributed to workers in an intelligent manner that takes into consideration the characteristics of the data itself (e.g., the amount of data in a row, the active columns in the row, etc.). This allows workers, for example, to process similar amounts of data, reducing the amount of time needed to wait for stragglers (e.g., that are taking longer to compute their portion of work). As another example, by considering the physical characteristics of a cluster, work portions can be generated that efficiently utilize the resources of the cluster. As another example, using the strategies described above, an optimal number of work portions and/or number of rows/amount of data to include in a work portion can be determined to minimize additional overhead and maximize parallelism. Thus, distributed computing can be performed more efficiently and predictably.

Data Transformation and Cache Optimization

Once an input data set has been partitioned and distributed, a set of sequenced data preparation operations can be applied to the data set according to the specification of a received script. For example, the pipeline master 308, having divided one or more input data sets and distributed them to workers/nodes in a distributed computing cluster, is configured to cooperate with the pipeline executors to determine transformation results. In some embodiments, each pipeline executor working on a partition/work portion is configured to provide a subset of the overall results of performing a sequenced set of operations. The pipeline master has the responsibility of collating/combining the result subsets into the overall result. In some embodiments, the pipeline master of the cluster is used to implement data transformation engine 210 and caching engine 212 of FIG. 2.

In some cases, distributed computing platforms such as Spark include native functionality for performing various operations. However, the manner in which these platforms execute operations typically requires data to be replicated, which can be resource intensive and inefficient.

Using the techniques described herein, a set of sequenced operations can be performed without replicating data at each stage of the pipeline, thereby increasing the speed and efficiency with which the sequenced set of operations can be performed and data transformation results obtained. An example illustrating how a platform such as Spark replicates data when performing an operation, in contrast to the techniques described herein, will be shown with respect to the sort operation described below in conjunction with FIGS. 10A-10F.

As will be described in further detail below, data fragments including column files and data traversal programs can be generated and executed as data is processed through a pipeline. The data fragments are used to represent the cumulative results at various stages of the pipeline (e.g., the result of having performed a subset of the sequenced data preparation operations). The fragments representing the transformation results can be cached at various stages of the pipeline for reuse. For example, for a given piece of work that was operated on, the cumulative results (or representation of the results) of operations on the piece of work up to a particular stage in the pipeline can be saved to disk or stored to a cache layer. The cached representation can be later used to reconstruct the state of the data as of the particular stage in the sequence of operations. The data fragments/representation can be cached not only at the end of the pipeline, but in the middle as well. This allows for intermediary results at the various stages of a pipeline to be viewed. Further, edits to the sequenced set of data preparation operations defined in a script (e.g., using an editor interface provided by user interface engine 202 of FIG. 2) can reuse the same cached result without having to perform re-computation of the sequenced set of steps that led to the cached result. For example, in some embodiments, the cached representation is identified using a signature that is a function (e.g., hash function such as SHA hash function) of the (e.g., string) description of the sequenced set of operations that led to the results represented by the cached representation. When new data preparation scripts are received (e.g., as a user configures data preparation via an editor interface), signatures can be generated from the operations of the new script and used to determine whether there is an existing cached representation that can be leveraged.

In some embodiments, the cached representation described herein is optimized for columnar workloads. The columnar workloads include data preparation operations that are used to perform columnar data transformations. In some embodiments, the data formats and structures used to generate cached representations are also optimized for speed and efficiency, for example, to limit the flow of data throughout a pipeline server so that as little data as is necessary is worked on as quickly as possible.

(Re)use of the columnar workload-optimized cache, including the generation and reuse of data traversal programs, will be described below in conjunction with various example data preparation operations. While example details of several data preparation operations are provided for illustrative purposes, the list is not exhaustive, and the techniques described herein can be adapted accordingly for any other data preparation operations as appropriate.

Data Preparation Operation Examples

Suppose that a user has specified a data set and a set of sequenced data preparation operations to perform on the data set via a user interface (e.g., provided by user interface engine 202 of front end 200 of FIG. 2), resulting in the script shown in FIG. 6A being generated (e.g., using script generator 204 of FIG. 2). The script is received by a pipeline server (e.g., pipeline server 300 of FIG. 3 from front end 200 of FIG. 2), implemented using a distributed computing platform such as Apache Spark.

FIG. 6A illustrates an example embodiment of a script. As shown, script 600 includes a description of the data set (referred to as "DS1" in this example) to be worked on (and imported) at 602. The contents of the data set to be processed are shown in conjunction with FIG. 6B. The script also includes a set of sequenced operations to perform on the data set. In this example, the set of sequenced operations includes an uppercase operation on column A of the data set (604) and a filter operation on column B of the data set (606) on the values "e" and "h." The sequenced set of operations forms a pipeline through which the data set will be processed. In this example, the logical sequence of the operations is also the physical execution sequence, but need not be (e.g., the physical execution sequence may be different, for example, in the presence of a smart optimization compiler). For example, suppose that a sequence of data preparation operations includes two operations, "f" and "g," in successive positions, in that order. A smart compiler may determine that performing "g" before "f" would result in exactly the same result, and would be faster to compute. For instance, in the example operations specified in script 600, the final result could also be obtained by swapping the uppercase and filter steps. Doing so would result in the uppercase operation being performed on far fewer rows, increasing the speed (and efficiency) of the computation.

As shown in this example, the data preparation operations are columnar in nature, where an operation to be performed on a data set is defined with respect to a particular column. For example, the uppercase operation is performed on column "A" of the data set, and the filter operation is performed based on particular values found in a specific column (column "B"). For such data preparation operations, how an entire data set is transformed is based on how particular columns are affected by an operation, or based on the characteristics of the particular columns implicated in an operation. This will be leveraged to provide techniques for optimized and efficient performance of data preparation operations, as will be described in further detail below.

At 608, the script indicates how the results of the data preparation operations are to be outputted. In this example, the results are to be viewed (e.g., presented to a user in a user interface provided by user interface engine 202 of FIG. 2). Another example of an option for outputting results is to publish the results (e.g., export them to another file).

FIG. 6B illustrates an example embodiment of a data set to be processed. In this example, data set 650 corresponds to the data set specified at 602 of script 600 of FIG. 6A.

The processing performed at each stage of the pipeline formed by the set of sequenced operations defined in script 600 will be described in further detail below. For illustrative purposes, the files written as of each step in the sequenced operations are saved (cached), but need not be.

Import/Start

The first operation of script 600 is Import/Start. After the decision on how rows should be divided and distributed is made (e.g., by data partitioning engine 208 of FIG. 2), the data assigned to the various partitions is imported. In some embodiments, importing the data includes preparing the data such that it can be quickly accessed sequentially (e.g., read a column of data quickly from top to bottom).

Figure 7A:
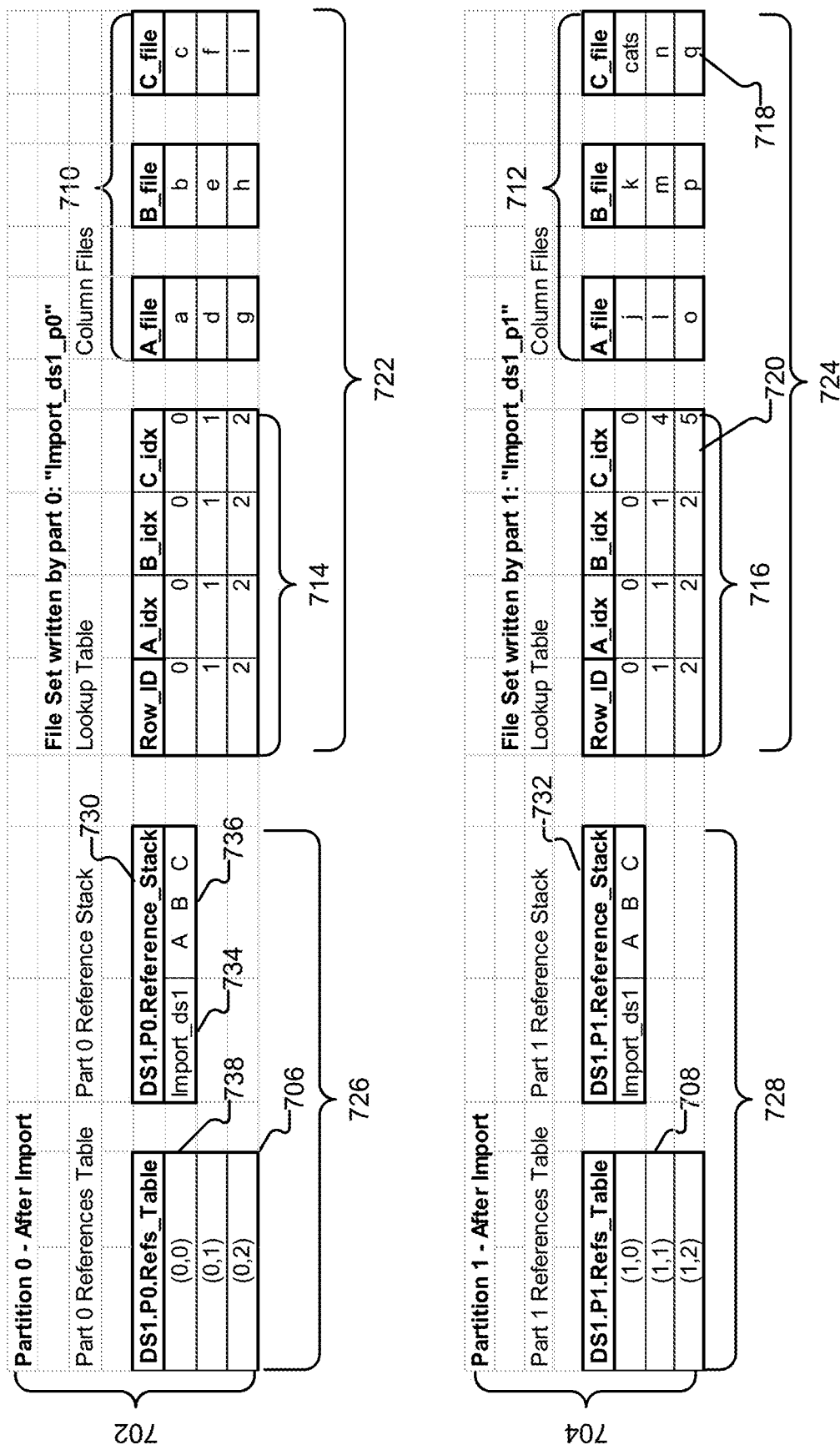
FIG. 7A illustrates an example embodiment of data structures generated during an import operation.

FIG. 7A illustrates an example embodiment of data structures generated during an import operation. In some embodiments, the example of FIG. 7A continues from the example of FIG. 6B. In some embodiments, the data being imported in FIG. 7A is the data from data set 650 (DS1) of FIG. 6B.

Suppose in this example that DS1 has been split into two logical partitions, partition zero (702) and partition one (704). The partitions are each processed by one or more workers (e.g., Spark workers/pipeline executors, as described above). As described above, each partition includes a subset of the rows of DS1, and collectively the two partitions comprise the entire data set. The subsets of rows among the partitions are non-overlapping and are contiguous.

With the work (data) having been partitioned, each row of DS1 is uniquely identified by a set of coordinates. In some embodiments, the coordinates indicate the partition in which the row can be found, and an identifier of the row within the partition. In the examples described herein, the coordinates are organized as follows: (partition number, row identifier). An example of the unique row identifiers is shown in references tables 706 and 708, which correspond to partitions zero and one, respectively.

As shown, data set DS1 has been equally divided into two partitions, with the top three rows of the data set assigned to partition zero, and the bottom three rows assigned to partition one.

In this example, each partition stores the data into sets of files corresponding to the columns, as shown at 710 and 712. For example, at 710, separate column files corresponding to the columns "A," "B," and "C," respectively, of data set DS1 are written (e.g., the contents of the data set DS1 are obtained from their source (specified in a script) and re-written into the column files). Each separate column sequentially describes the cells for all of the rows of DS1 that are in the partition. In some embodiments, the column values that are written are read from the source of the input data set (as specified in a script), and the original source data set is not modified (e.g., the values of the source data set are copied into the column files).

Accompanying column files 710 and 712 are lookup tables 714 and 716, respectively. Each row of the lookup table includes a row identifier ("Row ID") and indices into the column files (indicating the location of the data values for an identified row). In this example, the indices shown in the index columns are byte indices into their respective column files.

The structure of the lookup table and the column files are optimized for sequential access such that, for example, all of the data can be read down a column quickly. The structures shown also allow for efficient non-sequential row probes (e.g., random access probing of a row). For example, to access a specific value in a row of a column, a lookup of the table can be performed by using a row identifier of the row of interest and the column of interest. The index value corresponding to that (row, column) coordinate is obtained from the lookup table and used to access the corresponding column file. The value at the index of the column file can then be retrieved directly, without requiring other data not of interest to be loaded and read.

In this example, the values in the column file are stored sequentially and are indexed by byte order. As the values can be of different types (e.g., char, int, etc.) and can be of different sizes (e.g., in bytes), the indices in the lookup table indicate the location of a cell in a column file by its starting byte location in the file. For purposes of illustration, throughout this and other examples described herein, assume that a character has a size of one byte. The numeric values shown in the examples described herein are, also for illustrative purposes, integers with a size of two bytes.

Take for example the column file (718) corresponding to column "C" written by partition one as part of the import operation. The column file includes the values 'cats,' 'n,' and 'q.' The corresponding byte indices for the column file are shown at 720 of lookup table 716. The starting byte in the "C file" for the value 'cats' is 0, as it is the initial data value written in the column file. The starting byte in the "C file" for the value 'n' is 4. This is because the value 'cats," which is a word including 4 characters, has a size of 4 bytes. Thus, the zeroth byte in column file 718 includes the value for the first row of the "C" column file (in partition one), the fourth byte starts the second row, and the fifth byte starts the third row of the column. Thus, data can be read from the column files by byte index.

By using byte (or any other appropriate data unit of size) indexes, the column values can be tightly packed into a column file, without spaces/gaps between values. This allows for space efficient-storage of column values as well as efficient lookup of those values. As the column files are stored separately and compactly, if an operation requires operating on an entire particular column, the corresponding column file can be read directly (e.g., without indexing) and without reading values from any other columns that are not of interest. Thus, the data structures/formats shown are space-efficient, columnar, and optimized for specific column operations. As described above, the data format shown is optimized for both random and sequential access.

In some embodiments, the set of column files and corresponding lookup table are included together into a file set. In this example, lookup table 714 and column files 710 are included in file set 722. Lookup table 716 and column files 712 are included in file set 724. Each file set is associated with a file name/cache identifier, which can be used to locate the file set including the actual column values. In this example, the file set name/identifier is generated based on the name of the step that resulted in the column files being written, and the partition that wrote the file. For example, the file set 722 written by partition zero is called "import_ds1_p0," indicating that the file set was written by partition zero ("p0") for the step of importing ds1 ("import_ds1"). Similarly, the file set 724 written by partition one is called "import_ds1_p1," indicating that the file set was written by partition one ("p1") for the step of importing ds1 ("import_ds1"). When generating the file sets for an operation that is performed across all of the partitions, the handle/cache id that is generated is consistent across all of the partitions. In this example, for partitions zero and one participating in the import DS1 operation, the handle of the file sets ("import_ds1") written by the partitions is consistent across both partitions, with the difference being the partition number that is concatenated to the end of the file set name. In some embodiments, the file sets are written to a cache/storage and can be obtained using the identifiers described above. The use of such cache identifiers/file set names will be described in further detail below.

While a data set may have been divided across multiple partitions, as shown, the processing performed with respect to only one partition is shown for the remaining steps of script 600, as the specified set of sequenced operations do not require movement of information between partitions (i.e., rows will not move between partitions). Similar processing is performed in the other logical partition(s) into which the input data set has been divided. Examples of operations that result in transfer of rows between partitions will be described in further detail below.

In addition to the file sets that are written, each partition is associated with what is referred to herein as a "data traversal program" (DTP). The data traversal program includes a references table and a reference stack, which together provide information for how to read the state of a portion of the data as of a certain stage of a pipeline (e.g., how to read what is the cumulative result of having performed some portion of the sequenced set of operations on the input data set). A references table includes references of row transformations during a set of sequenced operations, and a reference stack includes a record of the sequenced operations and columns that are changed by the sequenced operations. In some embodiments, as each operation in a sequenced set of operations is performed, the references table and the reference stack of the data traversal program for the partition are updated to reflect the cumulative transformation result after having performed the sequenced set of operations up to a given operation. In some embodiments, the data traversal program is stored in a cache layer. This allows the data traversal program to be quickly accessed and updated as operations are performed, thereby allowing efficient access of the results of the operations (including intermediate results) without having to repeat the operations.

In some embodiments, a data traversal program of a partition, when executed, uses the references table and reference stack of the partition to obtain a sequenced set of rows that are a subset of the data set resulting from a sequenced set of operations having been performed on an input data set. The position of the sequenced subset of rows in the entire resulting data set is based on the position of the corresponding partition in the sequence of partitions. For example, the sequenced subset of rows obtained from the data traversal program for partition "N" is immediately followed by the sequenced subset of rows obtained from the data traversal program for partition "N+1." The sequenced subsets of rows from the various partitions are non-overlapping. The sequenced subsets of rows, when read in this order, collectively form the results of a sequenced set of data preparation operations performed on one or more input sets of data.

In some embodiments, the references table and the reference stack of the data traversal program are updated as each data preparation operation is performed to reflect the cumulative result of having performed the sequenced set of operations up to a given point in the pipeline. As the pipeline includes various stages and intermediary results, which, for example, a user may wish to revisit, in some embodiments, a copy of the data traversal program can be cached at a save point (e.g., before it is updated by the next step in the sequence of data preparation operations). The caching allows, for example, incremental saving of the data that is changing as the data progresses through various points of the pipeline/sequenced set of operations.

As shown in the example of FIG. 7A, partitions zero and one are each associated with their own data traversal programs, 726 and 728, respectively. Data traversal program 726 associated with partition zero includes the references table 706 and reference stack 730. Data traversal program 728 associated with partition one includes references table 708 and reference stack 732. In some embodiments, the data traversal programs (including corresponding references tables and reference stacks) are initialized (created) as a result of the import being performed. As will be described in further detail below, in some embodiments, the data traversal program represents a result of a set of sequenced data preparation operations and indicates how to assemble one or more affected columns to derive the result.

Reference stack 730 of partition zero is now described. In this example, the first row of reference stack 730 (which currently includes only one row after the import step) includes cache identifier ("cache id") 734. The cache identifier projects out the columns "A," "B," and "C," as indicated by the corresponding entry in the row at 736. Cache id 734, when combined with an indicator of the partition (partition 0), will result in a file name corresponding to file set 722 ("import_ds1_p0"). This indicates the location of the data that was written due to the import by part 0. The reference stack is used in conjunction with the corresponding references table to read a sequenced set of rows that is a subset of the overall data set resulting from the import operation having been performed.

An example of reading the result of importing DS1 is as follows. Suppose, for example, that a user would like to see the state of the data set DS1 after it has been operated (which should appear the same, as import does not make modifications to the data set). The files and data traversal programs shown in FIG. 7A can be used as follows to assemble DS1 (e.g., for viewing) as of the import step.

In order to read the imported data in its proper order, the data traversal programs of the partitions are executed in the order of the partitions to which they correspond. Thus, data traversal program 726 of partition zero is executed first (the data traversal programs of the partitions can also be executed in parallel, with the sub-results from each data traversal program placed in their correct order as they are obtained).

Data traversal program 726 is executed as follows. References table 706 includes three rows. This indicates that the data traversal program (which is associated with partition zero), when executed, will provide the first three rows of the imported data set. The first row of the imported data set is obtained as follows. The value of the first (and as yet, only) column in the first row (738) of references table 706, the coordinates (0,0), is obtained. This column of the references table corresponds to the first (and as yet, only) row in the reference stack. The row includes cache identifier 734 and identifies columns "A," "B," and "C" at 736.

The partition number from the obtained coordinates (zero) is appended to cache id 734 to obtain the file name "import_ds1_p0," which corresponds to file set 722 of the same name. File set 722 is then accessed. The row identifier of the obtained coordinates (zero) is then obtained. The obtained row identifier is used in conjunction with the columns "A," "B," and "C" identified at 736 to perform a lookup of lookup table 714 of file set 722. As columns "A," "B," and "C" have been identified, the obtained row number "zero" is used to look up, using the lookup table, the values in the zeroth row of those columns. The corresponding byte indexes in the zeroth row of the index columns of the lookup table are obtained and used to access the column files 710. Thus, the row including the values "a," "b," and "c" for columns "A," "B," and "C" is obtained from corresponding column files 710.

Figure 7B:
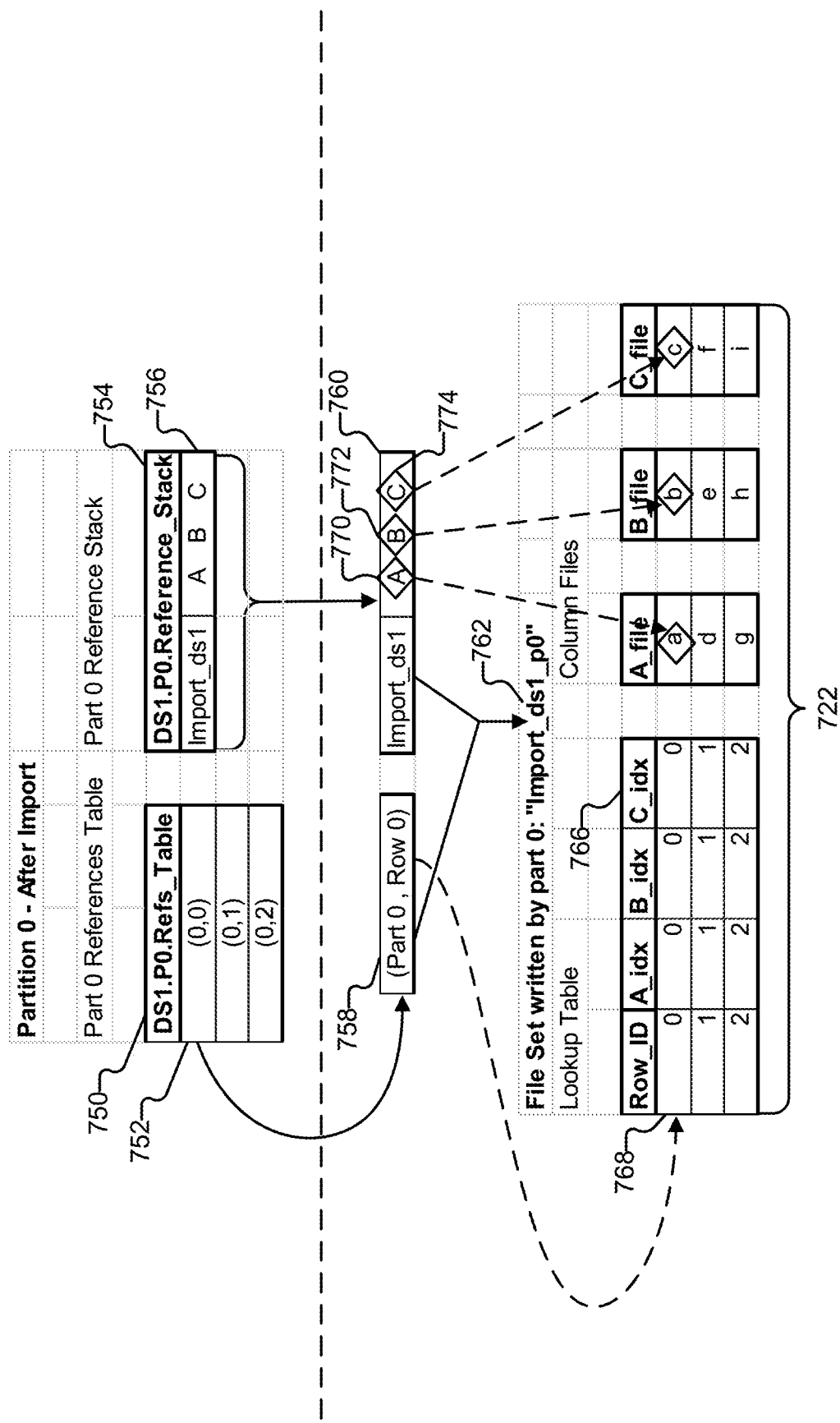
FIG. 7B illustrates an example embodiment of executing a data traversal program.

The processing performed by the data execution program to arrive at the first row of the imported ds1 data set is described again in conjunction with FIG. 7B.

FIG. 7B illustrates an example embodiment of executing a data traversal program. In the example of FIG. 7B, the various references tables, reference stacks, and file sets described correspond to their respective counterparts in FIG. 7A.

The data traversal program (e.g., data traversal program 728 of FIG. 7A) for partition zero is executed. The data traversal program begins by reading the first row (752) of references table 750 (which corresponds to references table 706 of FIG. 7A). The single entry in this row includes the coordinates (0,0), which is a reference indicating partition zero, row id zero.

As shown, row 752 includes a single column, which is mapped/corresponds to the only row in reference stack 754, row 756. In this example, reference stack 754 corresponds to reference stack 730 of FIG. 7A. Row 756 includes two entries, one for a cache identifier. As will be shown below, the cache identifier is combined with the partition number identified in the coordinates obtained from row 752 to locate a file set. The second entry in row 756 includes an indication of the columns whose values are to be obtained using the located file set.

The coordinates obtained from row 752 are shown at 758, and indicate, as shown, a partition number (zero) and a row identifier (zero). The entries obtained from row 756 of reference stack 754 are shown at 760. The obtained values shown at 758 and 760 are used together as follows.

The partition number "zero" extracted from reference 758 is combined with the cache id "import_ds1" value extracted from 760 to generate the file name "import_ds1_p0" (762). The combination is performed, for example, by concatenating strings, generating a hash of the combined values, or by any other appropriate combination function. This is used to locate and access the file set of the same name (file set 722 of FIG. 7A), which was written as a result of the import step, as described above in conjunction with FIG. 7A.

The row identifier "zero" extracted from reference 758 is then used to perform a lookup of lookup table 766 of file set 722. Based on the extracted row identifier "zero," row 768 of lookup table 766 is identified and accessed.

Based on the column titles 770-774 ("A," "B," and "C," respectively) specified in reference stack row 760, the values for those specified column titles corresponding to row 768 are looked up and obtained. This is performed as follows. Because columns "A," "B," and "C," have been specified, the index values for those corresponding columns in row 768 are obtained from lookup table 766. Those indices are then used to lookup actual data values written to respective corresponding column files in the file set. In this example, the corresponding values of the specified column titles "A," "B," and "C" are "a," "b," and "c." Thus, the first row of imported ds1 has been read/obtained.

The next two rows of imported ds1 are then read by moving down the entries in the reference table and performing the same process described above. For example, the entry in the second row of references table 750 (with the reference coordinate (0, 1)) is combined with the first row of reference stack 754 (based on the mapping of the first and only column of the references table with the first and only row of the references stack) using the data traversal program processing described above to obtain the values "d," "e," and "f" from file set 722 The third and last row of imported DS1 (including the values "g," "h," and "i") can also be similarly obtained using the data traversal program of partition zero.

Data traversal program 728 of partition one is then also similarly executed, as described above, to obtain the bottom three rows of DS1, in order.

The two obtained subsets of sequenced rows are then combined together and provided as output. For example, if the user would like to view the results in a user interface, the sequenced subsets of rows are displayed in corresponding partition order (i.e., the subset of sequenced rows obtained using the data traversal program of partition one is displayed below the subset of sequenced rows obtained using the data traversal program of partition zero). If the user indicates that they would like to publish the results, then the sequenced subsets of rows are appended to each other based on corresponding partition order (i.e., the subset of sequenced rows obtained using the data traversal program of partition one is appended to the bottom of the subset of sequenced rows obtained using the data traversal program of partition zero).

In some embodiments, the execution of the data traversal programs is performed in parallel on each partition. The sequenced subsets of rows resulting from the data traversal programs are then placed in the order of the partitions from which they were obtained.

The data traversal programs written as of the import stage (and representing the results of the import operation) can be saved. The cached data traversal program can be used at a later time, for example, to avoid having to regenerate references and reference tables.

In the above example, the references tables include only one column, and the reference stack includes only one row. Additional examples involving references tables with multiple columns and/or reference stacks with multiple rows will be described in further detail below.

Continuing with the example of script 600, example processing involved in performing the uppercase and filter operations is now described. As the uppercase and filter operations do not result in the movement of rows between partitions, and can thus be performed by the partitions independently of each other, the processing that occurs on partition zero is shown below. Similar processing occurs on partition one.

Uppercase

Figure 8A:
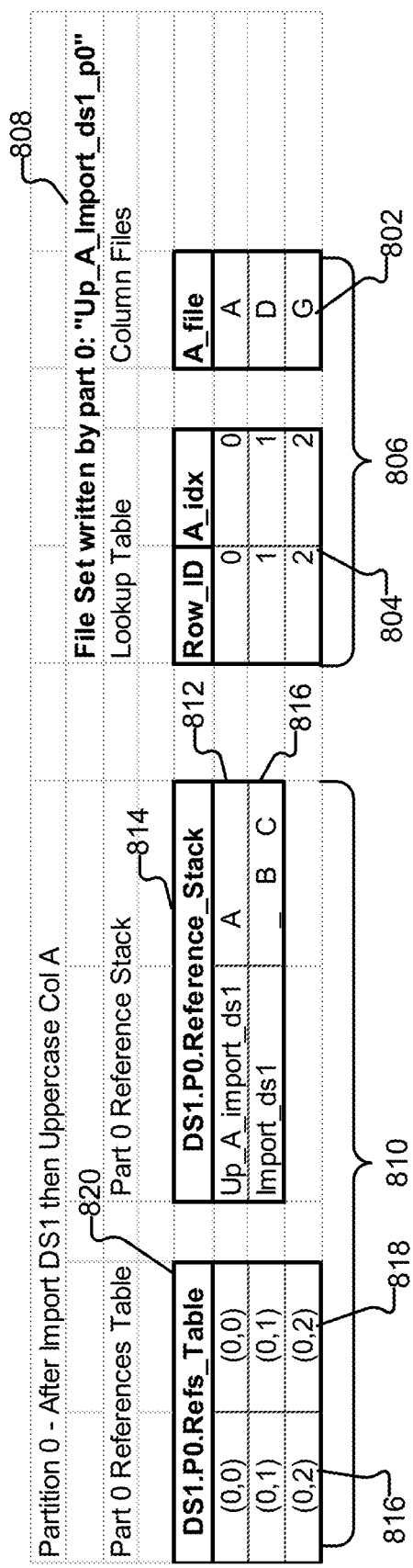
FIG. 8A illustrates an example embodiment of an updated data traversal program.

After importing the data, the next step in script 600's pipeline is to perform an uppercase on the values of column A. Here, the operation is performed relative to a specific column, column A. FIG. 8A illustrates an example embodiment of an updated data traversal program (810) and new file set (806) generated as part of performing the uppercase on column A operation.

In this example, the uppercase operation on column A is performed as follows. Prior to performing the uppercase operation, the state of the data traversal program of partition zero is as shown in the example of FIG. 7A.

The current values of column A are obtained, for example, by performing a reading of column A using the current state of the data traversal program. The uppercase operation is performed on those obtained column values. Because the values of column A are now different as a result of the operation, a new column file for the new, uppercase version of column A is written, as shown at 802 (that includes the uppercase values). A corresponding lookup table 804 is also written so that the values in the new version of column A can be looked up. The new column file 802 and corresponding lookup table 804 are included in file set 806, which, in this example, is given the name "Up_A_Import_ds1_p0," as shown at 808. In this example, the file set name is generated by combining together (e.g., using a string concatenation, hash function, etc.) the operations that have been performed thus far that resulted in the column files in the file set having been written. The partition number that wrote the file set is also added to the name. For example, the name "up_A_Import_ds1_p0" at 808 is generated to reflect that file set 806 was written by partition zero when performing an uppercase operation on column A that was performed after importing DS1.

As shown, because only column A has been specified in the operation, and only the values in column A were modified (i.e., column A is the only active column in this operation), only a file set for the new version of column A need be created at this stage of the pipeline. Thus, no new data needs to be generated/written for other columns in the data set DS1 that were not touched by the uppercase operation. Thus, the data that is changing as of the execution of a data preparation operation can be written incrementally.

Due to a new column file having been written as a result of the uppercase step, the data traversal program of partition zero is updated/amended (e.g., from its state as of the import step) accordingly. The new state of the data traversal program as of the uppercase step is shown at 810.

The new data traversal program is generated as follows. The current data traversal program that partition zero is responsible for is obtained (data traversal program 726 of FIG. 7A as of the import step). A new row 812 is added to ("popped onto") the top of the existing reference stack to produce new reference stack 814 of partition zero. The new row 812 indicates: (1) the cache identifier/handle portion of the newly written file set 806 (without partition number); and (2) the title of the column ("A") that was written. In this example, a new version of the column A file has been written. This new version of column A supersedes the previous version of the column A file that was written as part of the import step. To represent this, the "A" value of row 816 has been marked unavailable to the data traversal program, as indicated by an underscore. When reading the data, the value from the new column A file will be read, and the earlier version of the column A file (found in file set 722 of FIG. 7B) will not be accessed and read. This allows the data traversal program to enforce only the most recent version of a column to be read.

A new column 816 is also added to the left of the existing references table (which included only column 818), resulting in a new references table 820 for partition zero. In this example, the rows of the imported data set did not change position, and thus each of the coordinates in the references included in new column 816 still identify the same partitions and row identifiers as shown in column 818.

The columns in the references table, from left to right, are mapped to corresponding respective rows in the references table, from top to bottom. For example, column 816 of references table 820 is mapped to row 812 of reference stack 814. Column 818 of references table 820 is mapped to row 816 of reference stack 814. This mapping will inform how the data traversal program as of a particular pipeline stage reads values from previously written file sets to assemble rows of a data set as of the particular pipeline stage. Any other appropriate mapping can be performed.

Thus, the data traversal program from the import step is updated/amended to reflect the new result of having performed an uppercase on column A after importing ds1. Data traversal program 810 can be cached to store the representation of the result at the stage in the pipeline at which ds1 has been imported and then column A has been uppercased. In some embodiments, a signature corresponding to the data traversal program is generated. The signature can be generated based on the operations that led to the result represented by the data traversal program to be cached (e.g., by hashing the representations of the operations (e.g., string representations) together, by concatenating the operations together, or through any other combination function). A copy of data traversal program 810 is then cached with its corresponding signature. The cached data traversal program can then be later identified by its corresponding signature, as will be described in further detail below.

Figure 8B:
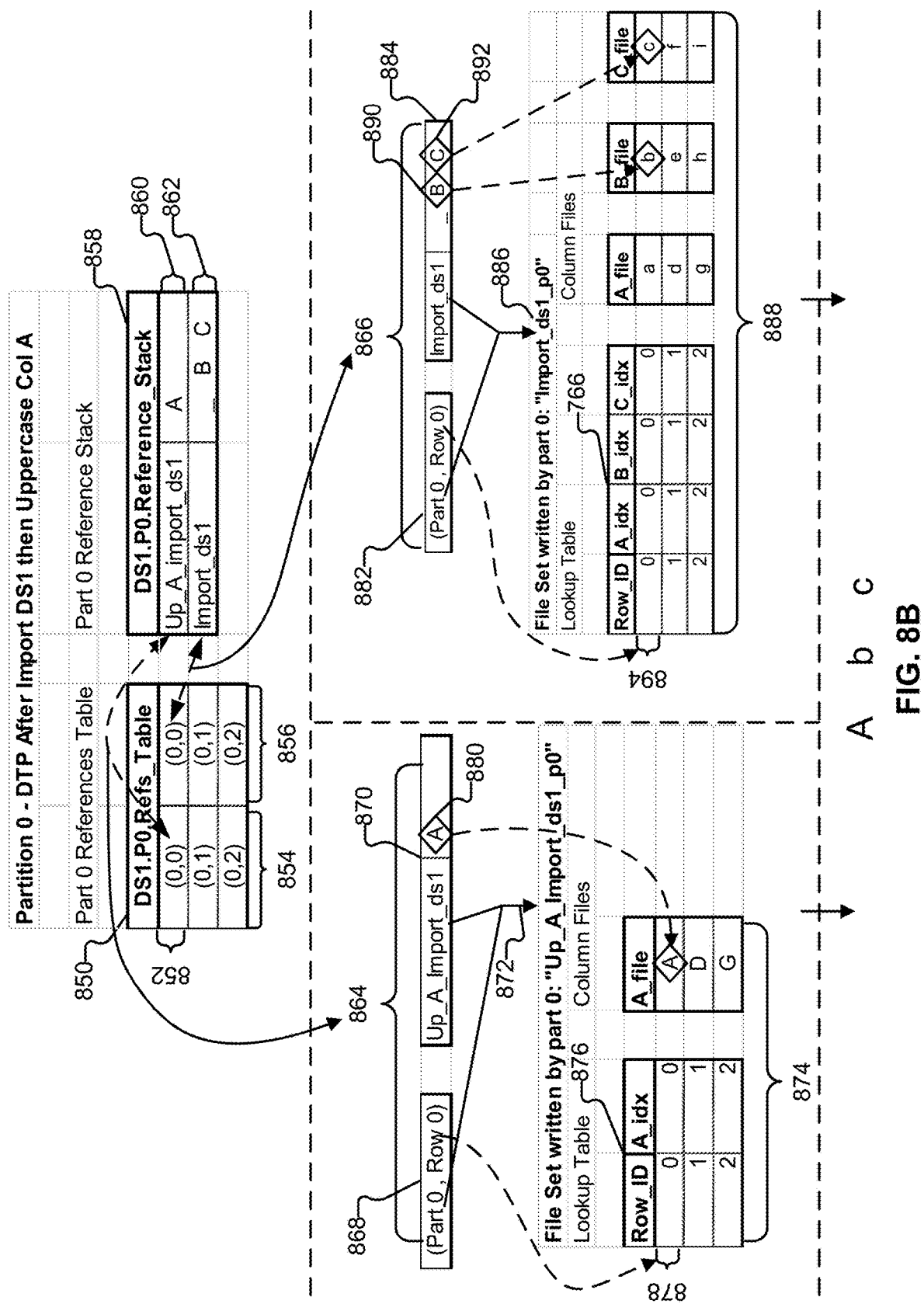
FIG. 8B illustrates an example embodiment of executing a data traversal program.

An example of executing the updated data traversal program 810 to obtain a portion of the results after having performed the uppercase on column A after importing DS1 is described in conjunction with FIG. 8B.

FIG. 8B illustrates an example embodiment of executing a data traversal program. In the example shown, a first row of the data set that results from performing an uppercase on column A after importing data set DS1 is read. The row can be read, for example, when the results of the import and then the uppercase operations are to be outputted (e.g., for viewing in a user interface, for publishing/exporting, etc.). In the example of FIG. 8B, the various references tables, reference stacks, and file sets correspond to their respective counterparts in FIG. 8A.

In this example, the data traversal program (e.g., data traversal program 810 of FIG. 8A) for partition zero is executed. The data traversal program begins by reading the first row 852 of references table 850 (which corresponds to references table 820 of FIG. 8A). The row includes two entries, references/coordinates (0,0) in column 854, and references/coordinates (0,0) in column 856. As described above, the leftmost column (854) of references table 850 is mapped/corresponds to the topmost row (860) of reference stack 858 (which corresponds to reference stack 814 of FIG. 8A). The rightmost column (856) of references table 850 is mapped/corresponds to the bottom-most row (862) of reference stack 858.

The pairing of the reference (0,0) at row 852 and column 854 of references table 850 with the entries in row 860 of reference stack 858 is shown at 864. The pairing of the reference (0,0) at row 852 and column 856 of references table 850 with the entries in row 862 of reference stack 858 is shown at 866.

The processing performed by the data traversal program using pairing 864 is described first (the processing of 864 and 866 may be performed in any order, in parallel, or in any other appropriate manner) The coordinates obtained from row 852 and column 854 of references table 850 are shown at 868, and indicate as shown a partition number (zero) and a row identifier (zero). The entries obtained from row 860 of reference stack 858 are shown at 870. The obtained values shown at 868 and 870 are used together as follows.

The partition number "zero" extracted from reference 868 is combined with the cache identifier "Up_A_Import_ds1" value extracted from 870 to generate the file name "Up_A_Import_ds1_p0" (872). The combination is used to locate and access the file set of the same name (file set 874), which was written as a result of the uppercase on column A operation being performed on imported DS1, as described above in conjunction with FIG. 8A. In this example, file set 874 corresponds to file set 806 of FIG. 8A.

The row identifier "zero" extracted from reference 868 is then used to perform a lookup of lookup table 876 of file set 874. Based on the extracted row identifier "zero," row 878 of lookup table 876 is identified and accessed.

Based on the column title 880 ("A") specified in reference stack row 870, the value for the specified column title corresponding to row 878 is obtained. The value is obtained by looking up the index value for column A in row 878 of the lookup table. This provides the byte index "0." The value at the zeroth byte index of the file for column A (A file) is obtained. This is the value "A." This is the uppercase version of the value prior to the uppercase step ("a"). Thus, the value for the column A in the first row of the data set resulting from the uppercase on column A of the imported data set DS1 is obtained.

The data traversal program is then configured to use pairing 866 to obtain the remaining values for columns B and C. In contrast to the processing described above in which the current value (as of stage of pipeline after the uppercase on A after import_ds1) for column A was obtained from the file set "Up_A_Import_ds1_p0," the current values for columns B and C are obtained from a different file set. In this example, the values for columns B and C are obtained using the file set that was written during the import step ("Import_ds1_p0"). This reflects, in part, that columns B and C were not changed by the uppercase on the column A operation, and thus, their values written at the previous stage are still valid (and are still the most current version) at this stage of the pipeline.

Pairing 866 is used by the data traversal program as follows. The coordinates obtained from row 852 and column 856 of references table 850 are shown at 882, and indicate as shown a partition number (zero) and a row identifier (zero). The entries obtained from row 862 of the reference stack are shown at 884. The obtained values shown at 882 and 884 are used together as follows.

The partition number "zero" extracted from reference 882 is combined with the cache id "import_ds1" value extracted from 884 to generate the file name "import_ds1_p0" (886). The combination is performed, for example, by concatenating strings, generating a hash of the combined values, or by any other appropriate combination function. This is used to locate and access the file set of the same name (file set 888), which was previously written as a result of the import step, as described above in conjunction with FIG. 7A. In this example, file set 888 corresponds to file set 722 of FIG. 7A.

Based on the column titles 890 and 892 ("B" and "C," respectively) specified in reference stack row 884, the values for those specified column titles corresponding to row 894 are looked up in file set 888 and obtained. This is performed as follows. Because columns "B" and "C" have been specified, the byte index values for those corresponding columns in row 894 are obtained. Those indices are then used to look up actual data values written to respective corresponding column files in the file set. In this example, the corresponding values of the specified column titles "B" and "C" are "b" and "c," respectively.

In this example, as described above, because the column A was modified by the uppercase operation, the column title "A" has been removed (indicated by an underscored) from row 862 of reference stack 858 to indicate that the version of column A that is obtained from file set 888 is no longer valid/current and values should not be obtained from that version of the column A file. Thus, the value for column A in file set 888 was not obtained.

As shown above, new column files (and corresponding lookup tables) are only written for columns that are changed by an operation. The reference stack is used in part to indicate where the most current (as of some corresponding stage of a pipeline) version of a column is located (i.e., the location of a file set and what columns should be read from that file set).

The values obtained from the two file sets are combined together to produce the first row of the cumulative result of performing an uppercase on column A after importing data set DS1 ("A," "b," "c").

The remaining rows of the result are determined by going down the rows of the references table in order and performing the same processing as described above. By executing the data traversal program on the references table in this order, the subset of the overall results that are obtained using the data traversal program for partition zero will be in their correct order.

Similar processing is performed on partition one. The sub-results obtained for partition zero and partition one are then combined together to form the overall result, where the subset of results obtained from partition zero precede the subset of results from partition one.

As shown in this example, two different file sets were accessed to determine the values that make up a single row in a data set resulting from multiple operations having been performed on an input data set.

Filter

Continuing with the example of script 600 of FIG. 6A, after performing an uppercase on column A, the next stage of the pipeline/next step in the set of sequenced operations is to filter on column B. In particular, the data is filtered on column B according to attached criteria, namely that the data is to be filtered on the values "e" and "h" in column B. This will potentially reduce the total number of rows in the data set (and the number of rows in each partition).

In the filter operation, no data values are modified. Thus, because no columns are modified, no new file sets are written as a result of the operation. However, the number of rows represented by the data traversal program of a partition may be decreased. Thus, the references table and reference stack of a partition will be updated to reflect this.

In one example embodiment, the state of the data traversal program (and references table and reference stack) is determined/updated as described below in conjunction with FIG. 9A.

Figure 9A:
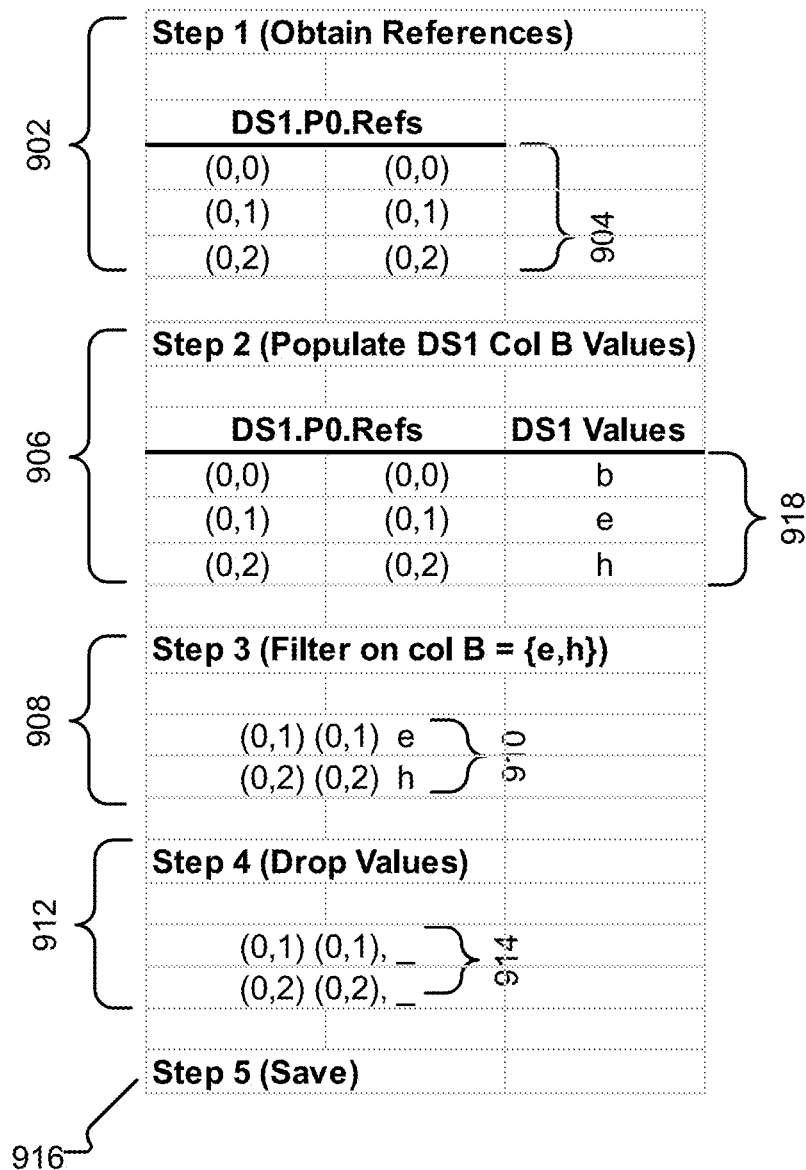
FIG. 9A illustrates an embodiment of a process for updating a data traversal program to reflect the results of a filter operation.

FIG. 9A illustrates an embodiment of a process for updating a data traversal program to reflect the results of a filter operation. In some embodiments, the processing performed in FIG. 9A is performed by one or more pipeline executors (e.g., Spark workers) working on a partition such as partition zero. In some embodiments, each executor operates on its work portion independently (as rows will not move between partitions as a result of the filter operation).

The references table is updated as follows. At step 1 (902), the current references (as of the uppercase on column A having been performed) for the partition are obtained. In some embodiments, obtained references are obtained from references table 820 of FIG. 8A. Each row of references in table 904 represents a particular row in the cumulative results of having performed the sequenced set of operations up to the uppercase on column A operation.

At step 2 (906), the column B values corresponding to the rows represented by table 904 are obtained. In some embodiments, the values are obtained by performing a data traversal using the references and corresponding reference stack as described above. In some embodiments, the corresponding reference stack that is used to obtain the values is reference stack 814 of FIG. 8A. In some embodiments, a column populated using the column B values is added to the right of table 904 to generate modified table 918.

At step 3 (908), table 918 is filtered according to the filter criteria (filter on column B values "e" and "h"). The results of the filter are shown at 910. For example, in a Spark implementation, the Spark filter operation is called on table 918 (represented as an RDD). The filter transformation returns a new RDD with a subset of the rows in table 918, which is shown at 910. At step 4 (912), the column B values are dropped, resulting in table 914 that includes only references. These references represent the rows that remain after the filtering operation. At step 5 (916), table 914 is saved as the updated references table for this stage of the pipeline.

Regarding the reference stack, because no new column data has been written, the reference stack need not be updated for the filter step. In some embodiments, a save is automatically performed after a filter, which includes saving the current references table. When performing the save, in some embodiments, a new entry (row) is popped onto the top of the reference stack. In some embodiments, the new row of the reference stack includes a handle/cache identifier to the saved references table so that it can be retrieved for later use. For example, in some embodiments, the references table is stored as part of a file set that is referenced in part using the handle/cache identifier. In this example, the file set would include only the references table, but no lookup table and column files (as no new column data has been written). The columns portion of the new row of the reference stack is empty. A corresponding column in the references table is also generated.

Figure 9B:
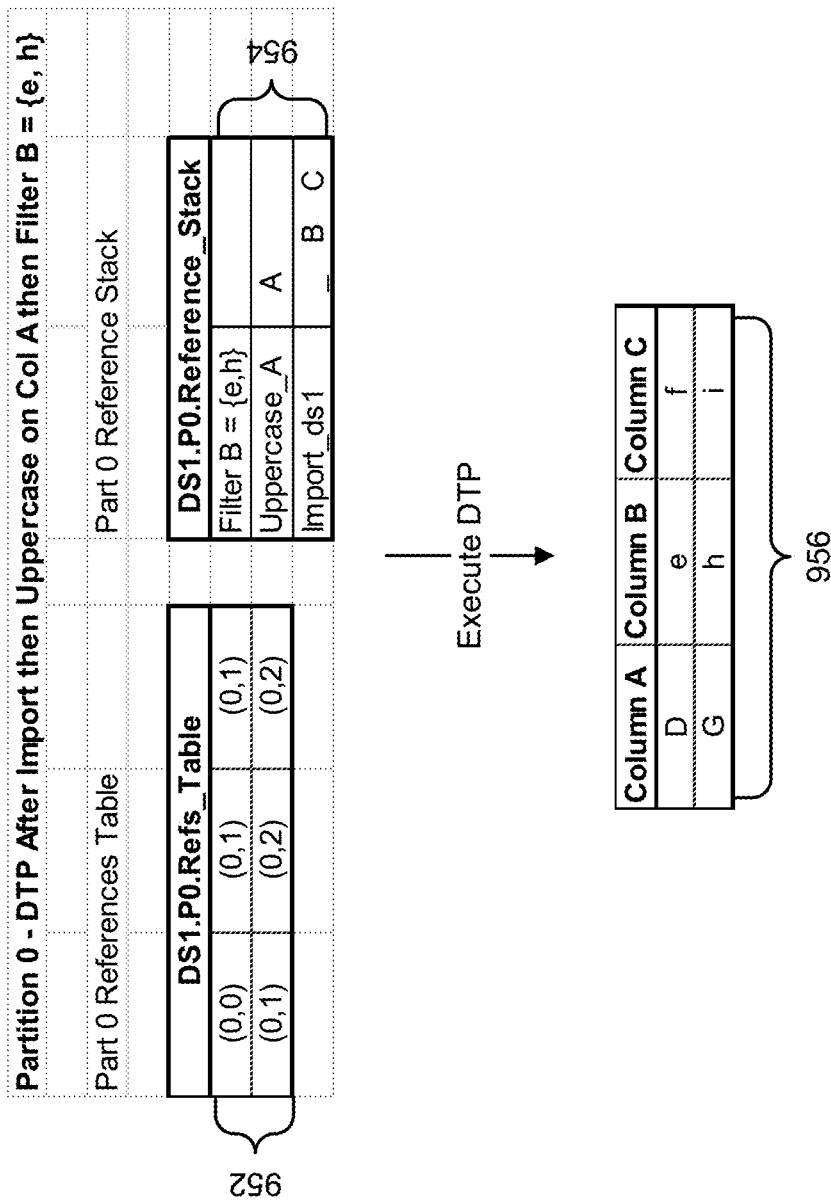
FIG. 9B illustrates an example embodiment of a data traversal program.

This results in the data traversal program shown in FIG. 9B.

FIG. 9B illustrates an example embodiment of a data traversal program. In this example, an updated data traversal program for partition zero representing the result of having done the filter operation on column B on the values "e" and "h" is shown. The data traversal program includes updated references table 952, which was, for example, generated using the processing described in FIG. 9A. As described above, because a save was performed after the operation, even though no data has been modified, the reference stack 954 has been updated from the previous stage of the pipeline.

To read the cumulative results at this stage of the pipeline, the data traversal program for partition zero (and other logical partitions) is executed in a similar manner as described above. For example, the data traversal program shown in FIG. 9B can be executed to obtain a subset of the cumulative results (the first two rows of the cumulative results) of performing the filter operation after the uppercase operation after the import operation. In some embodiments, if there are no columns specified in a row of reference stack entries, then no data values are read (i.e., only the reference stack entries with columns relevant to the data traversal program are read). Thus, by executing the data traversal program shown in FIG. 9B, the results shown at 956 are obtained.

As shown, the result of cumulative operations is reflected in the data traversal program, but there is not necessarily any indication in the data traversal program of what exact operations were performed to achieve those cumulative results. In some embodiments, when caching the data traversal program of a particular stage in a pipeline, a set of one or more signatures is built/generated based on the steps that were performed to achieve the cumulative result. The one or more generated signatures are assigned to the cached data traversal program.

As shown, the processing that was performed to arrive at the state of the data as of a filter operation was to look directly at the values of column B and filter those values to determine what rows remain in the data set. Only those rows that remained are reflected in the updated references table as of the filter step. No new data was written when performing the filtering using this data representation. Rather, the reduction in rows as a result of the filter is captured in the reduced number of rows in the references table, and was accomplished by looking only at the values of column B. This is in contrast to other filtering techniques that write out the results, where the cost of writing an entire filtered data set is a function of the total number of columns of the data set. Here, a compact representation of the results is updated to reflect the cumulative results of a sequenced set of data preparation operations.

The example operations described above with respect to the script of FIG. 6A would not result in movement of information between partitions. In the following example, an operation (sort) which results in movement of references across partitions (e.g., where rows exchange partitions) is shown.

Sort

FIG. 10A is a diagram illustrating an embodiment of a data set to be sorted. Throughout this example sort operation, the data set to be sorted (1000) is referred to as "DS." Data set 1000 includes two columns, C0 and C1, and four rows.

FIG. 10B is a diagram illustrating an embodiment of data traversal programs and file sets. Continuing with the example of FIG. 10A, suppose that data set DS has been divided into two partitions, partition zero and partition one, each with two rows, and imported, as shown at 1010 and 1016. In this example, partition zero has initialized data traversal program 1012 and written file set 1014. In this example, file set 1014 is named "import_ds_p0." Similarly, partition one has initialized data traversal program 1018 and written file set 1020. In this example, file set 1020 is named "import_dsp_1." The cache identifiers for partition zero's reference stack and partition one's reference stack both include the same cache identifier/handle, "Import_ds." In some embodiments, each partition stores its respective written file set local to the place of its computation.

In this example, the sort condition C0 is used to determine where the rows of the data set should move. In some embodiments, a distributed computing platform such as Spark is leveraged to perform the work of moving rows (represented by references) to the correct place (i.e., the movement of rows due to the sort is represented by moving references between partitions).

In this example, the sort is to be performed on C0. FIG. 10C illustrates an example of a sorted result. Data set DS prior to the sort is shown at 1030. The result of the sort operation on data set DS is shown at 1032. As shown, rows 1034 and 1036 of the data set DS swap positions due to the sort operation. The process involved in updating data traversal programs to represent the result of the sort operation will be described in further detail below.

Figure 10D:
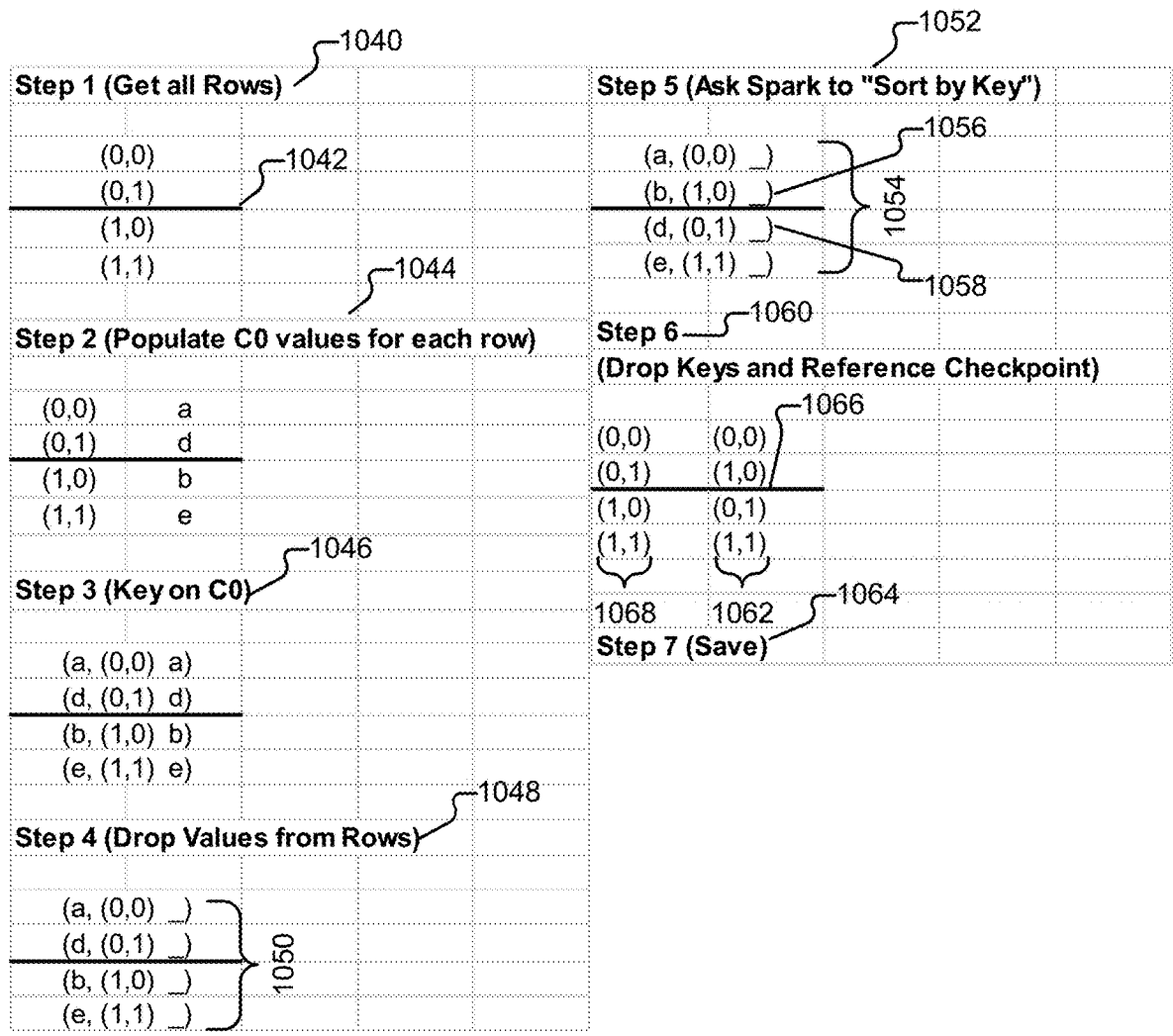
FIG. 10D is a diagram illustrating an embodiment of a process for performing a sort operation.

FIG. 10D is a diagram illustrating an embodiment of a process for performing a sort operation. In this example, the sort operation will be implemented in part by generating and sorting key-value pairs. A key-value pair allows for data to be represented as a value and some key that characterizes that value. In the following example, the key will be what is sorted on. As will be shown in this example, key-value pairs will be generated, wherein the value of the key-value pair is a row (represented by a set of references) and the key is the actual data value of C0 for that row. The key-to-row pairs will then be sorted by key, which will cause the rows (references) to be rearranged (e.g., across the partitions). One embodiment of the sort operation processing is performed as follows. As will be shown below, the result of the processing will be an updated references table for an updated data traversal program that represents the result of the sort operation on the imported data set DS.

At step 1 (1040), all rows of the data set DS are obtained. Each row of the data set DS is represented using a set of one or more references, which are obtained from data traversal programs 1012 and 1018 of FIG. 10B. In this example, the references above line 1042 were obtained from data traversal program 1012 of partition zero. The references below line 1042 were obtained from data traversal program 1018 of partition one. In some embodiments, the references shown at step 1 are the references table for each partition.

At step 2 (1044), C0 values for each row are populated. As will be shown below, the C0 values will be used as keys for each row. A sort will then be performed on the keys. In some embodiments, the C0 values for each row are obtained by executing data traversal programs 1012 and 1018 of FIG. 10B to look up C0 values from respective file sets in the manner described above.

At step 3 (1046) keys on C0 are generated. In this step, the obtained C0 values are used as keys that are paired with their corresponding rows (references) to generate key-to-row pairs. In some embodiments, at step 3, the values that were obtained at step 2 are extracted to the key position. In some embodiments, step 3 is an intermediate step to generating a key-to-row, key-value pair. At step 4 (1048), the values obtained at step 2 are dropped from the rows. This results in a set of four key-value pairs as shown at 1050.

In some embodiments, the key-value pairs are generated by manipulating the reference tables in place. First, the references tables are obtained, as described in step 1. The C0 values are pulled/extracted from file sets at step 2 and added as additional cells of the references table (e.g., in a new column added to the right of the references table). The C0 values are copied to create the key-value pair by copying the C0 values to the left of the references table (as the left position corresponds to the "key" position of the key-value pair). The extracted values that were in the cells to the right of the references table are dropped to save storage space. The key-value pairs are also referred to herein as "key-to-row pairs."

In some embodiments, the key-value pair generation is performed in parallel, by various partitions/workers, as they stream in rows from file sets and obtain corresponding C0 values to be used as keys.

At step 5 (1052), the key-to-row pairs 1050 generated at step 4 are sorted by key (e.g., by issuing the Spark "sortByKey" command on the key-to-row pairs). The result of the "sortByKey" command is shown at 1054, where the key-value pairs have been sorted by the key values (i.e., C0 values). As shown, the position of key-to-row pair 1056 and key-to-row pair 1058 have been swapped due to the "sortByKey" command.

At step 6 (1060), the keys of 1054 are removed so that only references remain. As the keys were added to form key-value pairs for sorting purposes, they are no longer needed and are removed. After removal of the keys, only references 1062 remain. In this example, because a save point is to be created after the sort operation, at step 6, a reference checkpoint is also created (where, in some embodiments, each save creates a reference checkpoint). In some embodiments, creating the reference checkpoint includes, as with the filter operation described above, updating and saving the references tables. As with the filter operation, a new column of references is added (shown at 1068). In this example, column 1068 is added to the left of column 1062. The new entries in column 1068 are assigned reference values based on the updated partition/row identifier of their corresponding references in column 1062. For example, the top two references in column 1062 (above line 1066) will be associated with partition zero. Thus, the top two corresponding values in column 1068 above line 1066 will be (0,0) and (0,1). Similarly, the bottom two references in column 1062 will be associated with partition one. Thus, the bottom two corresponding values in column 1068 below line 1066 will be (1,0) and (1,1). If no save were to be performed after the sort operation, then column 1068 would not need to be added.

In some embodiments, as part of creating the reference checkpoint (because the references table is to be saved), a new row is added to the top of the corresponding reference stacks, as in the filter operation described above. For example, the new row in a references stack includes a handle/cache identifier to the corresponding saved references table, while the columns portion of the row is left empty. This newly added row of the reference stack corresponds to the new column that was added to the references table. In some embodiments, if no save were to be performed after the sort operation, then the new rows would not need to be added to the reference stacks.

Figure 10E:
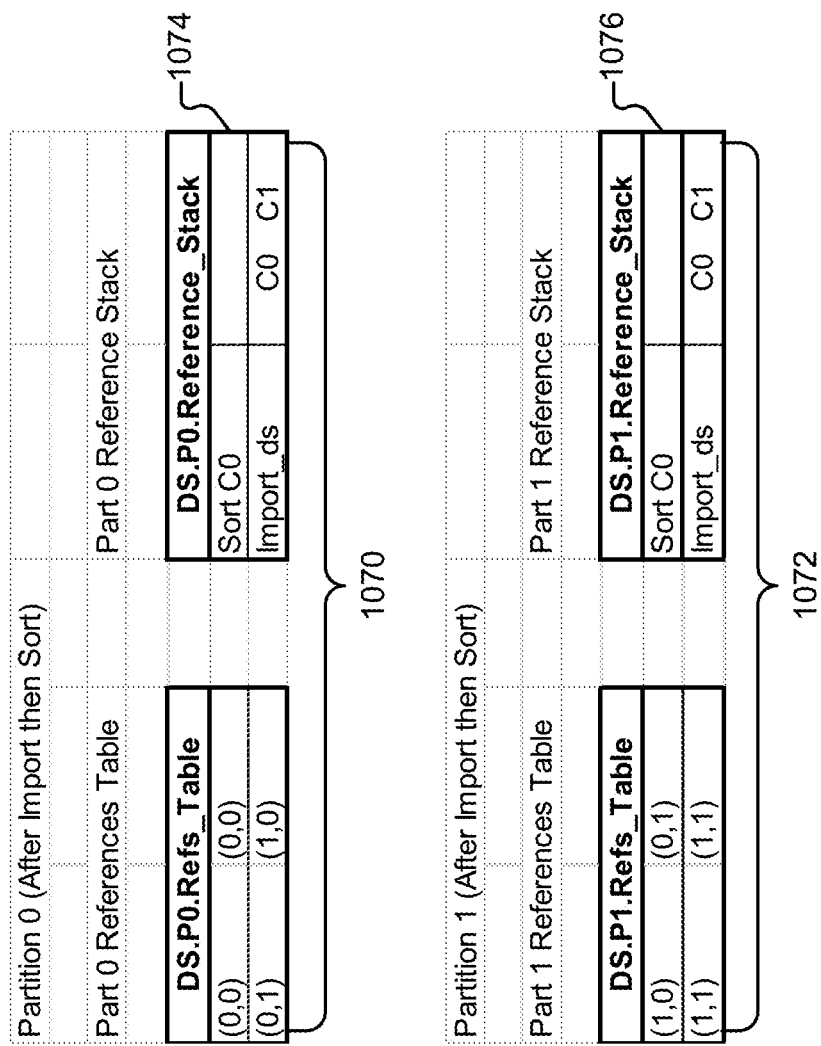
FIG. 10E illustrates an example embodiment of data traversal programs.

Examples of the updated references table and reference stacks are shown in conjunction with FIG. 10E.

At step 7 (1064), the references are saved. In this example, the references above line 1066 are saved as the newly updated reference table for partition zero. The references below line 1066 are saved as the newly updated reference table for partition one.

In one example implementation, steps 1-7 are implemented/performed as follows. Partitions zero and one separately and in parallel perform steps 1-4. In some embodiments, a partition performs steps 1-4 to obtain one key-value pair at a time (i.e., serially). As the key-value pairs are generated by the partitions, which operate in parallel, they are streamed by the partitions to a collector (e.g., Spark collector). For example, the collector is provided, by each partition, an iterator, which the collector uses to read one key-value pair at a time (i.e., by asking the iterator "next" to obtain the next key-value pair (if it exists)). The collector then sorts the key-value pairs as it receives them from the various iterators. Upon completion of the sort, the collector itself returns an iterator, from which the sorted key-value pairs can be streamed serially. The sorted key-value pairs are streamed to their appropriate partitions. This allows the references to be distributed to their appropriate partitions. In some embodiments, a global sort is performed. Key-value pairs are then sent to their appropriate partitions. A local sort is then performed inside a partition to ensure that the key-value pairs are in the correct order.

FIG. 10E illustrates an example embodiment of data traversal programs. In this example, the data traversal programs updated as of the sort on the C0 operation are shown (using the processing of FIG. 10D described above). The data traversal program for partition zero is shown at 1070. The references table for data traversal program 1070 was generated using the references above line 1066 of step 6 (1060) of FIG. 10D. The data traversal program for partition one is shown at 1072. The references table for data traversal program 1072 was generated using the references below line 1066 of step 6 (1060) of FIG. 10D.

In this example, as with the filter operation, no new data (columns) was written after the sort. However, because the results of the sort operation are saved, and a reference checkpoint created in step 6 above, a new entry/row has been popped onto the top of the reference stacks, as shown at 1074 and 1076. No columns were written, so the column portions of the new rows are empty. If no save were done, then the reference stacks for each partition would remain the same.

As shown in this example, as a result of the sort operation processing described above, the references (1,0) and (0,1) have exchanged partitions. Although the data traversal program for a partition includes references in its references table that were from two partitions, execution of the data traversal programs to read the subset of results maintained by those data traversal programs is performed in the same manner as described above.

For example, as the references table for a single partition includes two rows from different partitions, the values for those rows must be obtained from two different file sets (e.g., file sets 1014 and 1020 of FIG. 10B). However, there is only one cache identifier in the reference stack for the partition. By executing the data traversal program in the manner described in the examples of above, both file sets can be accessed. This is due in part to the names of file sets 1014 and 1020 sharing the same base/handle, "import_ds." Thus, when executing the data traversal program, the appropriate file set will be obtained by combining the partition identifier of the reference/coordinates being evaluated to the base/handle "import_ds" cache identifier from the reference stack. In some embodiments, the file sets are stored locally to the partition that wrote them. When a row exchanges partitions, in some embodiments, its corresponding file set is replicated locally on the node to which the row has moved. This allows the file sets to be locally accessible, improving speed in obtaining values, as well as reducing network bandwidth (e.g., in transferring data between nodes). In other embodiments, the file set is not replicated, and is referenced.

As shown in the above example sort processing, portions of the sort operation are performed in place, such as the generation of key-value pairs which will be sorted by key. This provides memory optimization, where a new memory space does not to be created to store key-value mappings. Rather, existing data entities are modified until they are in a format that is able to be sorted. Additionally, the only values that were read from the file sets were C0 values. The movement of the rows of the data set, represented by the references, was determined based on the sorting of just the C0 values. References were then moved to different partitions to create updated data traversal programs that reflect the result of the sort.

This is in contrast to the manner in which sort operations are handled natively in computing platforms such as Spark. For example, in Spark, actual data is moved and written, which involves a greater amount of data than writing references as described above, and is therefore more costly.

Figure 10F:
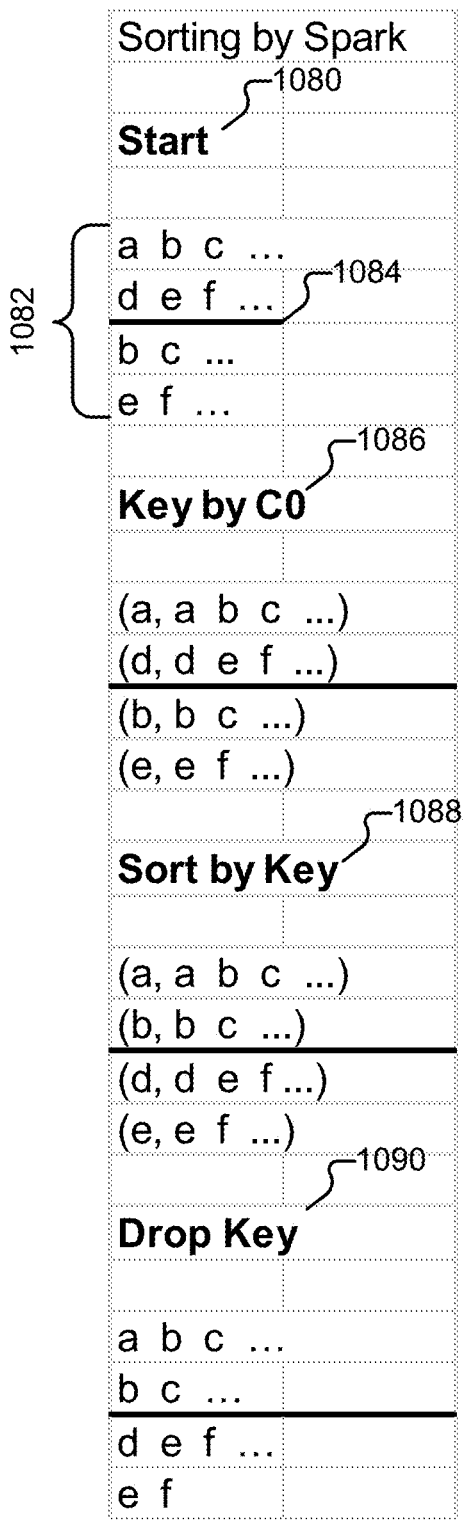
FIG. 10F illustrates an example embodiment of a native Spark sort.

FIG. 10F illustrates an example embodiment of a native Spark sort. Suppose in this example, that at start 1080, a data set 1082 has been divided into two partitions by Spark, as indicated by dividing line 1084. In this example, each row in the data set may have a large number of values, all of which will be operated on by Spark. This is in contrast to the techniques described herein, where references representing the rows of the data set are manipulated, rather than performing operations on entire sets of actual data. At 1086, keying by C0 values is performed to generate key-value pairs. At 1088, the key-value pairs are sorted by key. The keys are then dropped at 1090 to obtain the resulting data set. As shown in this example, the operation starts with all of the data of the entire data set, which is carried throughout the operation. This results in a potentially large consumption of resources, such as central processing unit (CPU) resources, memory resources, disk resources, bandwidth (e.g., to move entire data sets between partitions), etc. in order to accommodate the entire data set. Using the techniques described herein, rather than operating on actual data sets, a compact representation of the data set (e.g., data traversal program) is operated on, and data values are obtained only as necessary. This allows for a much smaller amount of data to be processed through a pipeline of sequenced operations, improving the efficiency of performing data preparation.

In the above, operations with respect to a single data set were performed. In the following example data preparation operations of append and join, multiple data sets are combined. The data sets before combining could have each potentially been processed through their own pipelines before being combined. As will be shown below, the resulting data traversal programs for the combined data sets will comprise partitions with multiple histories of what has happened to them.

Append

Figures 11A, 11B:
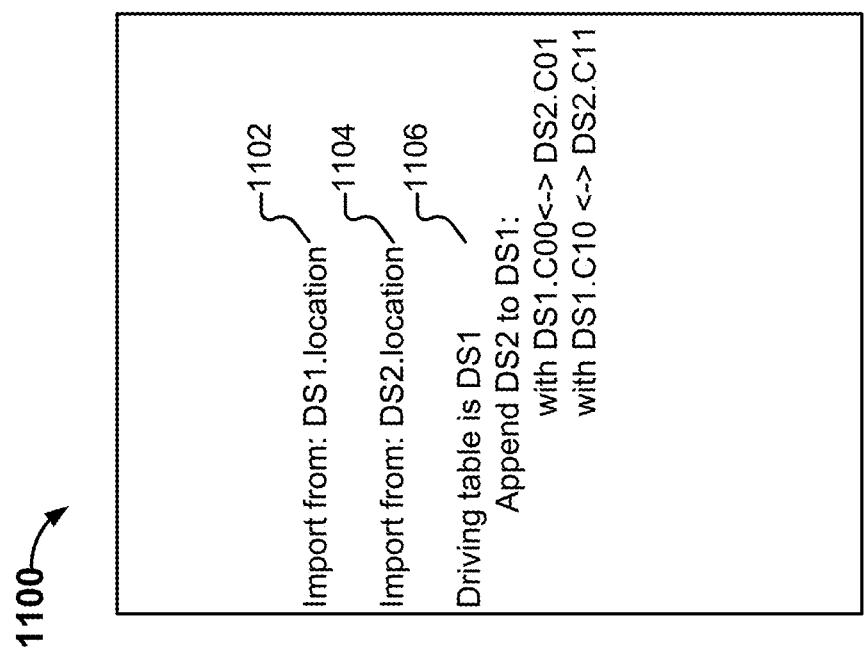
FIG. 11A illustrates an example embodiment of a script including an append operation.
FIG. 11B illustrates an example embodiment of data sets to be appended.

FIG. 11A illustrates an example embodiment of a script including an append operation. At 1102, the location of a first data set (referred to as "DS1" in these examples) to be imported is specified. At 1104, the location of a second data set (referred to as "DS2" in these examples) to be imported is specified. At 1106, the append operation is specified. As part of specifying the append operation, one of the data sets to be appended is designated as the driving (anchor) table, to which the other table will be appended (referred to as the "append table"). In this example, DS1 is the driving table, and DS2 is the append table. In example script 1100 a specification of what columns in DS1 and DS2 to append on is also shown. In this example, column C00 of DS1 is mapped to column C01 of DS2. Column C10 of DS1 is mapped to column C11 of DS2. The example data sets DS1 and DS2 and the resulting appended data set based on the conditions specified in script 1100 are described in conjunction with FIG. 11B.

FIG. 11B illustrates an example embodiment of data sets to be appended. In this example, data set DS1 is shown at 1110. Data set DS2 is shown at 1112. The resulting appended data set is shown at 1114. As shown, as DS1 has been designated as the driving table according to script 1100 of FIG. 11A, DS2 has been appended to the bottom of DS1, where column C01 of DS2 has been appended to column C00 of DS1, and column C11 of DS2 has been appended to column C10 of DS1, the mapping of which was described in script 1100 of FIG. 11A. Also shown is a renaming of the columns for the appended data set. For example, the new column that includes column C01 of DS2 appended to column C00 of DS1 has been renamed to column "C0." Similarly, the new column that includes column C11 of DS2 appended to column C10 of DS1 has been renamed to column "C1."

Figure 11C:
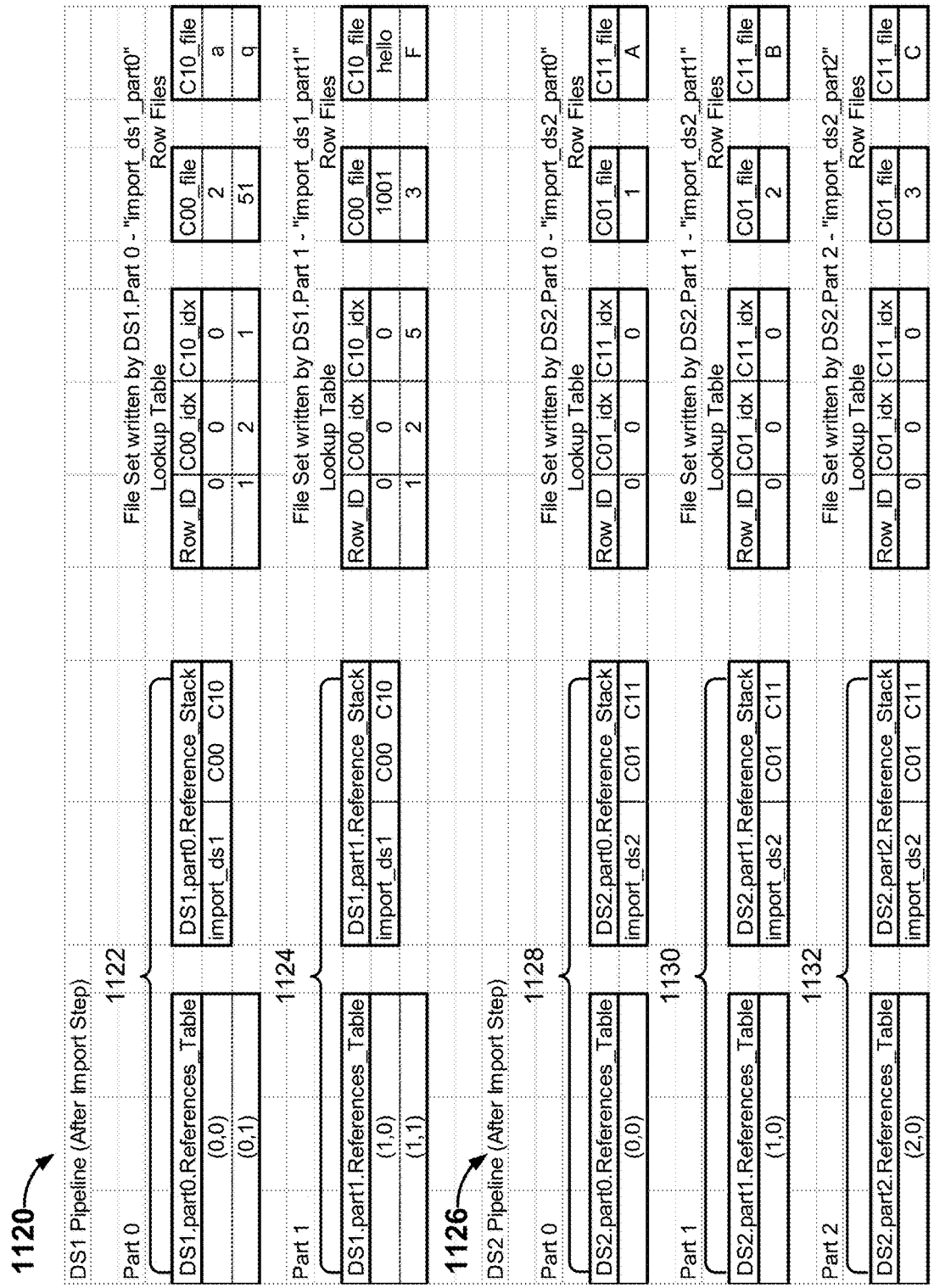
FIG. 11C illustrates an example embodiment of logical file/name spaces associated with pipelines for two different data sets.

FIG. 11C illustrates an example embodiment of logical file/name spaces associated with pipelines for two different data sets. Shown in this figure are DS1 and DS2, which have been imported prior to the append operation. In the example shown, DS1 and DS2 have been imported in their own respective pipelines (where a pipeline has been declared for DS1 and a separate pipeline has been declared for DS2). In some embodiments, declaring a pipeline includes importing the data set (e.g., as described above) and declaring the transformation steps that will be applied to the data set. In the DS1 pipeline 1120, DS1 has been divided into two partitions, partitions zero and one, each with two rows of DS1. The data traversal program for the partitions zero and one are shown at 1122 and 1124, respectively. The top two rows of DS1 are represented by data traversal program 1122 of partition zero, and the bottom two rows of DS1 are represented by data traversal program 1124 of partition one. In the DS2 pipeline 1126, DS2 has been divided into three partitions (partition zero, partition one, and partition two), each including one row of DS2. The data traversal program for the partitions zero, one, and two are shown at 1128, 1130, and 1132, respectively. The top row of DS2 is represented by data traversal program 1128 of partition zero, the middle row of DS2 is represented by data traversal program 1130 of partition one, and the bottom row of DS2 is represented by data traversal program 1132 of partition two. The corresponding file sets written by the partitions are also shown. In some embodiments, the data sets DS1 and DS2, being in different pipelines, were partitioned independently.

In this example, as independent pipelines have been declared for DS1 and DS2, the numbering for the logical partitions for each pipeline both start from zero. In some embodiments, each pipeline is associated with its own name/file space.

FIGS. 11D and 11E illustrate an example embodiment of data traversal programs before and after the append operation, respectively. The partitions and corresponding data traversal programs in the DS1 space and DS2 space shown in FIG. 11D correspond to the partitions and corresponding data traversal programs in the DS1 space and DS2 space shown in FIG. 11C.

In some embodiments, appending the two data sets includes creating a new pipeline for the appended result (e.g., a new pipeline is declared for the new appended data set). The pipeline includes its own file/namespace and partitions. In this example append, the number of partitions in the new pipeline equals to the total number of partitions across the two pipelines for the data sets being appended together. For example, if DS1 included M partitions, and DS2 included N partitions, the new pipeline would include M+N partitions. Thus, in this example, as the DS1 pipeline includes two partitions, and the DS2 pipeline includes three partitions, the resulting pipeline (referred to herein as the "project" pipeline) includes five partitions.

The append operation effectively places the rows of DS2 under the rows of DS1. As will be shown below, this result is represented by placing all of the partitions of DS1 and DS2 under a single pipeline (the new "project" pipeline). By doing so, the partitions are treated as one single data set (rather than two separate data sets, as they were prior to the append). When placing the partitions under the single pipeline, the partitions (which include their corresponding data traversal programs) are renumbered so that their ordering reflects the new arrangement of rows in the appended data set (i.e., the partitions have been remapped from their original pipeline space to the new project pipeline space). An example of the resulting "project" pipeline space is described in conjunction with FIG. 11E.

FIG. 11E illustrates an example of partitions in a pipeline file/namespace. In this example, "project" pipeline 1140 was declared as part of the append operation. Project pipeline 1140 includes five logical partitions.

As shown, each partition of the new pipeline corresponds to an existing partition in the DS1 and DS2 pipeline spaces. In this example, project pipeline partition zero corresponds to partition zero of the DS1 space. Project partition one corresponds to partition one of the DS1 space.

Because DS2 is appended below DS1, partition zero of DS2 pipeline space corresponds to partition two of the new project pipeline space. Partition three of the project pipeline space corresponds to partition one of the DS2 pipeline space. Partition four of the project pipeline space corresponds to partition two of the DS2 pipeline space.

As shown, the partitions of the DS1 pipeline space and the DS2 pipeline space have been effectively repartitioned under the new space of the project pipeline. As part of the repartitioning, the partitions from DS1 and DS2 are renumbered in a manner representing that the rows of DS2 follow from the rows of DS1 (e.g., the append table DS2 partitions are numbered to follow from the anchor table DS1 partitions).

As shown, each new partition inherits the data traversal program from its corresponding DS1 or DS2 partition. For example, the references tables and reference stacks are inherited. Because no data is moved or changed, the reference stacks, which include references to the existing file sets, remain the same in structure (e.g., where no new entry is popped onto the top of the reference stack because of the append operation processing). One change is in the naming of the columns to be found in the file sets referenced by the reference stack. The column names, which originally referred to their original names in DS1 and DS2, are renamed to indicate the new common name for the appended columns that are mapped to each other. In some embodiments, a record/bookkeeping is maintained of the mapping between original column names and their corresponding new names to which they refer. In this example, column C01 of DS2 is appended to column C00 of DS1. Both columns are mapped to a common column name, "C0." Similarly, column C11 of DS2 is appended to column C10 of DS1. Both columns are mapped to a common column name, "C1."

In the above examples, the partitions were added under a newly declared pipeline. In some embodiments, the partitions of the append table are pulled/incorporated into the pipeline of the anchor table, and renumbered accordingly (i.e., the partitions of DS2 are repartitioned so that they are consumed by DS1). For example, the partitions of DS2 are reassigned and incorporated into the DS1 pipeline, and are numbered such that they follow sequentially from the last partition number of the DS1 partitions. In some embodiments, rather than creating a new name for the columns that are mapped to each other in the append, a column in the append table assumes the name of the corresponding column in the anchor table (e.g., column C01 of DS2 assumes the name of column C00 of DS1 when it is integrated into the DS1 pipeline).

The data from this new appended data set in the new pipeline is read using the same techniques described above. In this example, the data traversal program of each partition of the project space is executed to obtain an ordered subset of the appended results. The subsets are combined together and ordered by corresponding partition numbers to arrive at the overall appended result. As shown, when assembling the overall result, data values will be pulled from file sets that were originally written for two different data sets (e.g., the file sets shown in FIG. 11C). While the appended result will have new column names "C0" and "C1," when performing a lookup of the file sets, the maintained mapping of the new column names to the original names in DS1 and DS2 will be used to perform the lookup and obtain the appropriate column values.

Thus, in the append operation, the processing described above creates a virtual representation of the appended data set, where the partitions (and corresponding data traversal programs) of the appended data sets have now been brought under a single logical space so that they will be treated altogether as a single data set. Further operations (e.g., sequenced set of data preparation operations) can be performed on the new logical single data set, an example of which will be described below.

Append Example—Lowercase on DS2.C11 Prior to Append

As shown in the above examples, separate pipelines were originally declared for DS1 and DS2. In the following example, suppose that prior to performing the append, a lowercase operation was performed on column C11 of DS2, while no further steps were performed on DS1 after being imported.

Shown in the example of FIG. 11F is the state of the partitions and corresponding data traversal programs of the DS1 pipeline space as of the import operation. Not shown are the corresponding file sets that were written when importing DS1.

Also shown in the example of FIG. 11F is the state of the partitions and corresponding data traversal programs of the DS2 pipeline space as a result of performing a lowercase on column C11 of DS2 after having imported DS2. The file sets written due to the lowercase operations are also shown. Not shown are the file sets written when importing DS2. In some embodiments, the data traversal programs and file sets shown are generated using techniques similar to those described in conjunction with FIGS. 7A-8B.

DS1 and DS2, whose virtual representations prior to the append are shown in FIG. 11G (which correspond to their counterpart representations shown in FIG. 11F), are virtually appended by remapping/repartitioning, as described above, the partitions in the DS1 and DS2 pipeline spaces to a new third "project" pipeline. The virtual representation of the results of the append operation are shown in FIG. 11H. Also shown is the renaming of columns in the reference stacks, whose structure, again, did not change, as no data values were written or moved.

As shown in this example, partitions zero through one of the DS1 pipeline were remapped to partitions zero through one, respectively of the new project pipeline. Partitions zero through two of the DS2 pipeline were remapped to partitions two through four, respectively, of the new project pipeline. Because an additional lowercase operation has been performed on column C11 of DS2 prior to the append, the reference stacks of partitions two through four have more entries than in project partitions zero through one. Additionally, the references tables for partitions two through four include an additional column as compared to the references tables for partitions zero through one. Thus, the partitions in the same pipeline have different reference stacks and references tables. This reflects the histories of the data sets prior to having been appended.

When reading the result of the append, the partitions of the project pipeline space are read using the same techniques described above (e.g., in conjunction with FIGS. 7B and 8B). For example, a partition of the project pipeline (representing operations on a single (virtual) data set) is accessed. The data traversal program for the partition is obtained. References, file handles, and columns to look up are obtained from the data traversal program. These items are used together to determine a file hash (or any other file name representation) to locate a file set. A lookup is performed on the found file set to obtain the values for the specified columns. By doing so, a subset of the cumulative results represented by the data traversal program of a partition is obtained. Subsets of the cumulative results obtained from various partitions are combined together according to partition order.

Append Example—Lowercase on Proj.C1 (after Append)

In the above example of FIGS. 11F-H, a lowercase on column C11 of the DS2 operation was performed on DS2 before it was appended to DS1. The following is an example that continues from the example of FIGS. 11A-11E, in which DS1 and DS2 were appended directly after having each been imported. In this example, a lowercase operation on the new project's column C1 is performed after DS1 and DS2 have been appended.

Figure 11I:
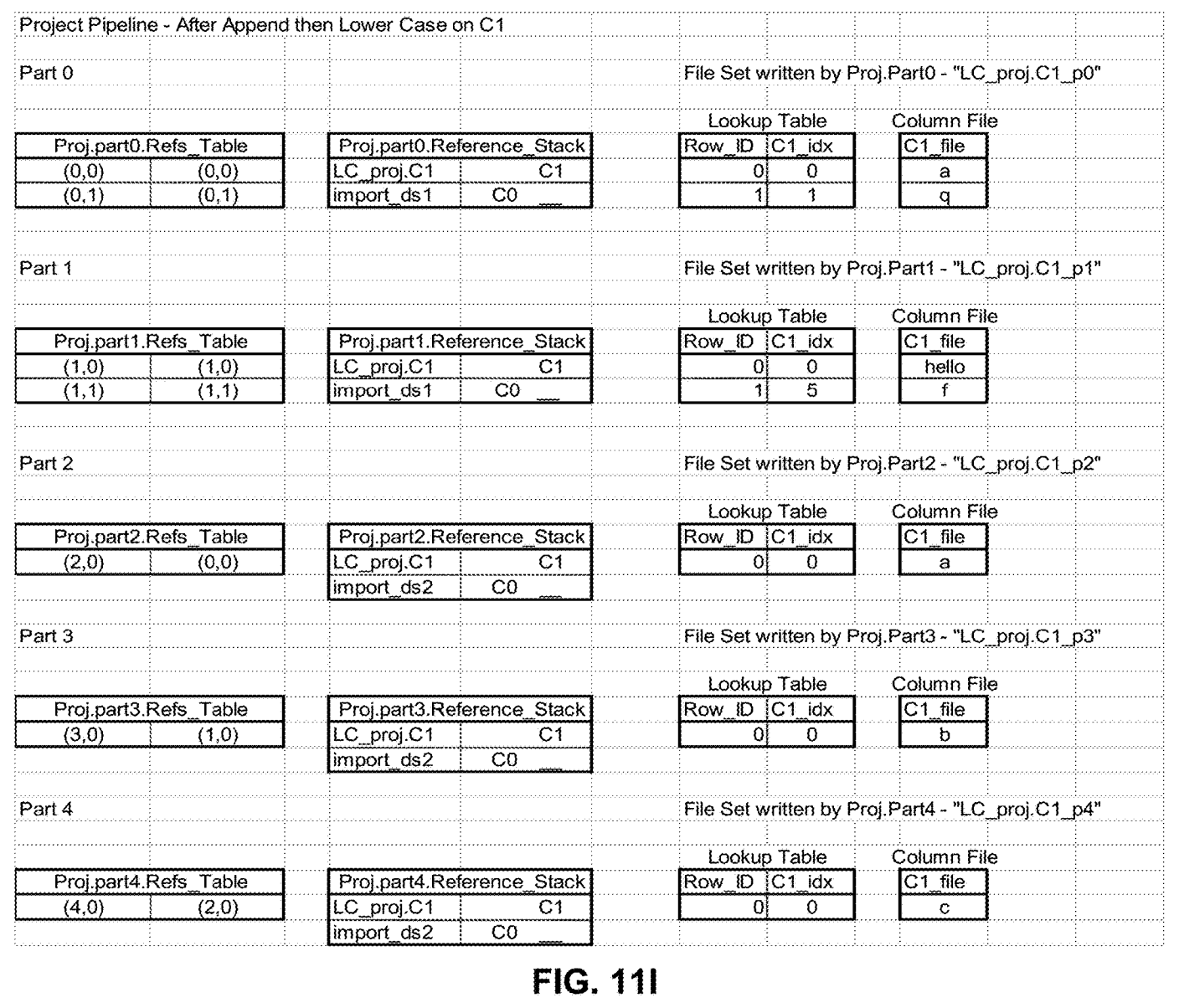

The representation of the result of performing the lowercase on column C1 of the project is shown in FIG. 11I. In this example, all of the partitions of the project were affected by the lowercase operation, and thus all of the data traversal programs (including the references tables and references stacks) were updated (from the state of the virtual representation in FIG. 11E) to reflect the result of the lowercase operation.

Cache Fingerprint Example

Suppose, for example, that a first user had previously performed and saved/cached the results of having performed the lowercase on DS2.C11, prior to append, as shown in FIGS. 11F-H. Suppose, for example, that the signature/fingerprint attached to the cached representation indicates the steps that were performed that lead to the cached results (e.g., the signature is a hash of the operations, or a concatenation of the string representations of the operations that led to the cached results, etc.). In some embodiments, the fingerprint can be used to produce the tree structure 1150 shown in FIG. 11J, which shows the pipeline of an import DS2 step followed by a lowercase on column C11 of DS2.

Suppose that the next day, a second user uses a step editor interface to specify that they would like to append DS2 to DS1 and then perform a lowercase on the resulting C1 column, which is the sequenced set of data preparation operations that resulted in the generation of the representations described in conjunction with FIG. 11E.

Although the ordering of operations and the results of the different sequences of operations specified by the two users differs, before performing the second sequenced set of operations specified by the second user, it can be determined whether the previously cached representation can be leveraged to provide at least some or all of the results.

The following is an example of using signatures/fingerprints to determine whether an existing cached representation can be reused. Suppose, for example, that the second sequenced set of operations specified by the second user is used to derive a signature that corresponds to tree 1160 of FIG. 11K. The tree representation 1150 of the previously cached representation is also obtained. The trees can be compared to determine whether the graph or any subgraphs/paths match between the two. A match indicates that a cached representation for some portion of the second sequenced set of operations exists.

In this example, no direct match is found between 1160 and 1150. In some embodiments, tree 1160 can be further manipulated to determine an equivalent tree that can then also be compared to 1150. For example, an operator push down can be performed on 1160. In this example, the lowercase operation of 1160 is pushed down below the append to produce tree 1170. Trees 1160 and 1170 are functionally/semantically equivalent, in that performing a lowercase on column C1 of the data set resulting from appending DS1 and DS2 is the same as having performed the lowercase operation on C10 of DS1 and C11 of DS2 first before performing the append.

When comparing trees 1170 and 1150 together, it is determined that subgraph 1172 of 1170 matches to 1150. For example, a signature for portion 1172 (e.g., hash of the operations in portion 1172) matches to the signature for the cached results 1150 (e.g., an equivalent hash has been identified).

The cached result associated with the signature representing tree 1150 can then be obtained. In this example, the cached result associated with signature 1150 is associated with performing a lowercase operation on the values in column C11 of DS2. The cached result can then be leveraged to reduce the amount of computation to perform the second sequenced set of operations. For example, because a cached result associated with performing a lowercase operation on the values in column C11 of DS2 exists, a lowercase operation need only be performed on the values in column C10 of DS1, rather than computing the lowercase on all values in C10 of DS1 as well as the values in C11 of DS2. This reduces the amount of writing that needs to be performed. The results of the lowercase operation on C10 of DS1 can then be appended with the cached results to obtain the result desired by the second user.

Join

Described below is an example embodiment of processing associated with a join operation. While a full outer join is shown in the following examples, the techniques described herein can be adapted accordingly to perform any other type of join (e.g., Cartesian joins).

Figure 12A:
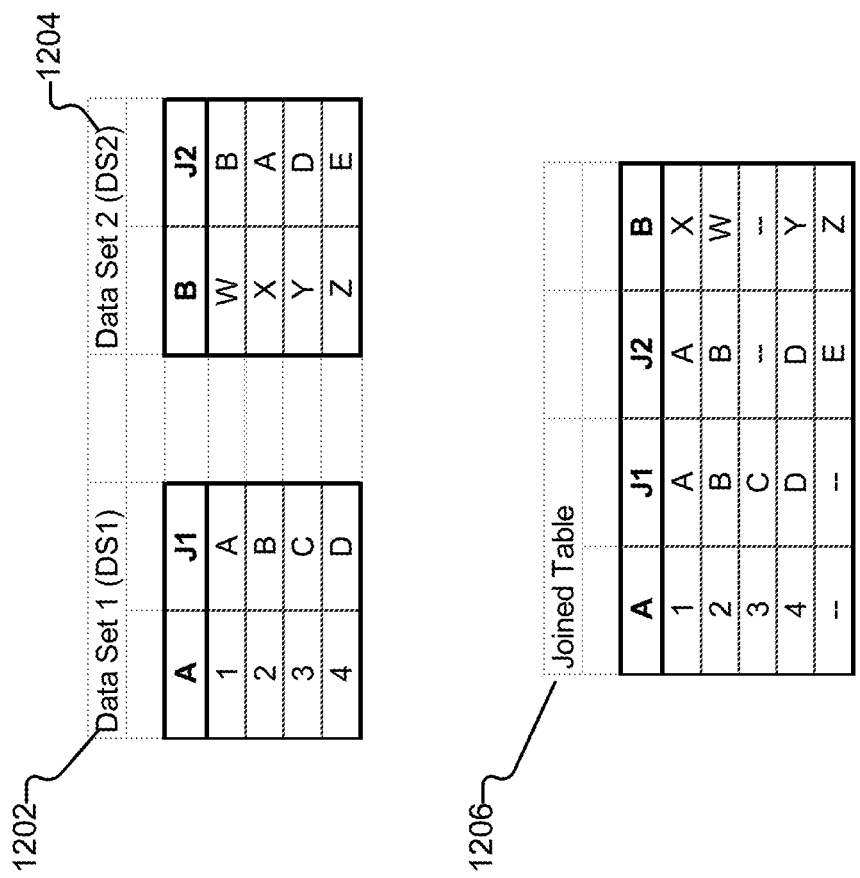
FIG. 12A illustrates an example of data sets to be joined.

FIG. 12A illustrates an example of data sets to be joined. In this example, suppose that a user would like to perform a full outer join of data set DS1 (1202) and data set DS2 (1204) on columns J1 and J2, with DS1 as the anchor/driving table and DS2 as the lookup table (i.e., DS2 is joined to DS1), which will result in joined table 1206. The join operation can be specified, for example, by a user via a step editor user interface, examples of which will be described below.

Figure 12B:
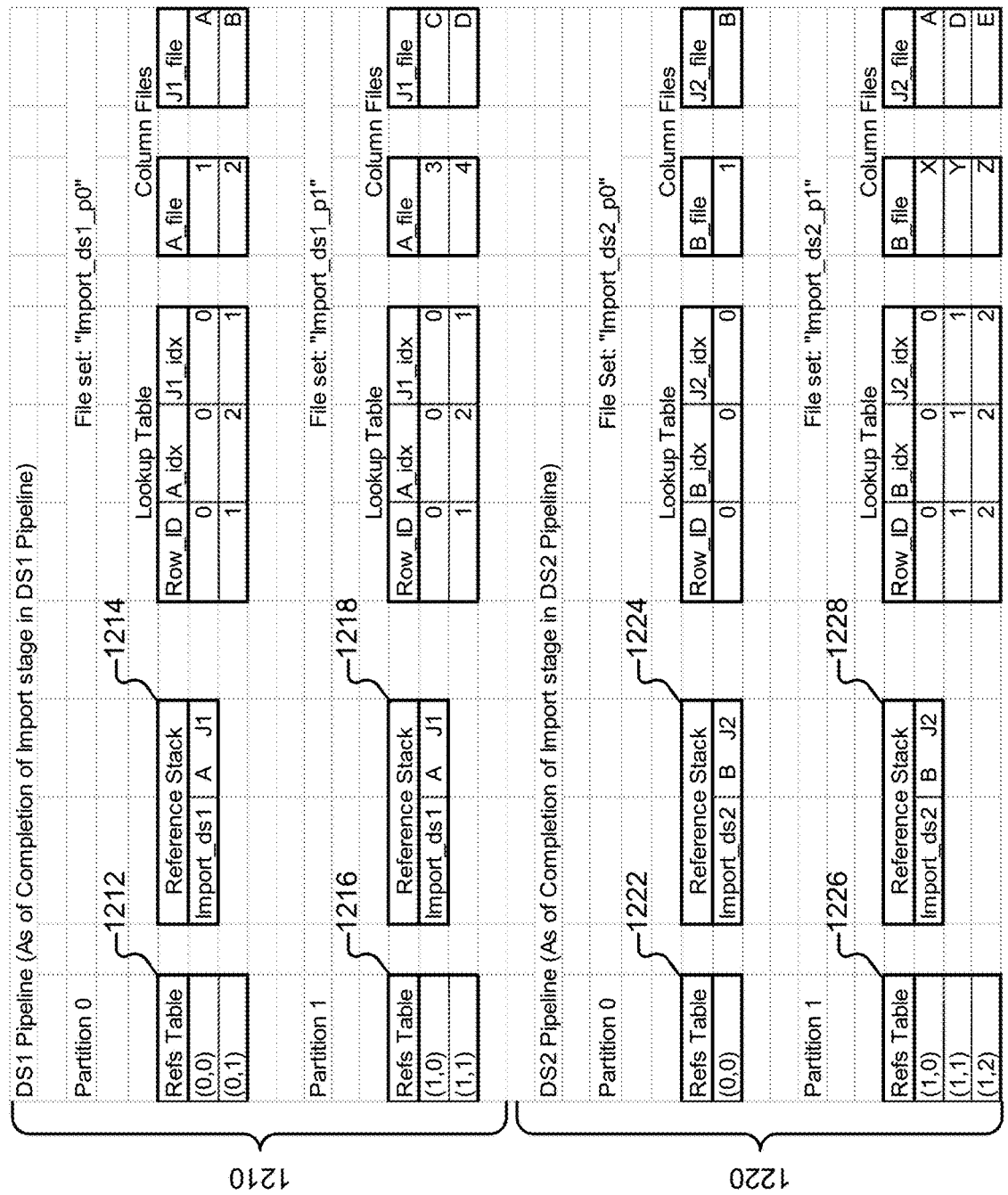
FIG. 12B illustrates an example of data traversal programs and file sets generated for imported data.

FIG. 12B illustrates an example of imported data. Continuing with the example of FIG. 12A, data sets DS1 and DS2 have been partitioned and imported into respective DS1 and DS2 pipeline spaces as shown at 1210 and 1220. Corresponding file sets written by each partition are also shown. Also shown are the current states (as of the import operation) of the data traversal programs (including references tables and reference stacks) for the partitions.

In this example, DS1 has been partitioned into two partitions, partition zero and partition one, as shown. Partition zero of the DS1 pipeline 1210 includes references table 1212 and corresponding reference stack 1214. The data traversal program including references table 1212 and corresponding reference stack 1214 represents the top two rows of DS1. Partition one of the DS1 pipeline 1210 includes references table 1216 and corresponding reference stack 1218. The data traversal program including references table 1216 and corresponding reference stack 1218 represents the bottom two rows of DS1.

In this example, DS2 has been partitioned into two partitions, partition zero and partition one, as shown. Partition zero of the DS2 pipeline 1220 includes references table 1222 and corresponding reference stack 1224. The data traversal program including references table 1222 and corresponding reference stack 1224 represents the top row of DS2. Partition one of the DS2 pipeline 1220 includes references table 1226 and corresponding reference stack 1228. The data traversal program including references table 1226 and corresponding reference stack 1228 represents the bottom three rows of DS2.

As in the example of append, a new pipeline is declared to represent the combined result of the join. In the example of the full outer join, the new pipeline space (referred to herein as the "project" pipeline) will include the same number of partitions as the aggregate number of partitions across the DS1 and DS2 pipeline spaces. An example embodiment of a process for arriving at the full outer join will be described below in conjunction with FIGS. 12C-E.

Figure 12C:
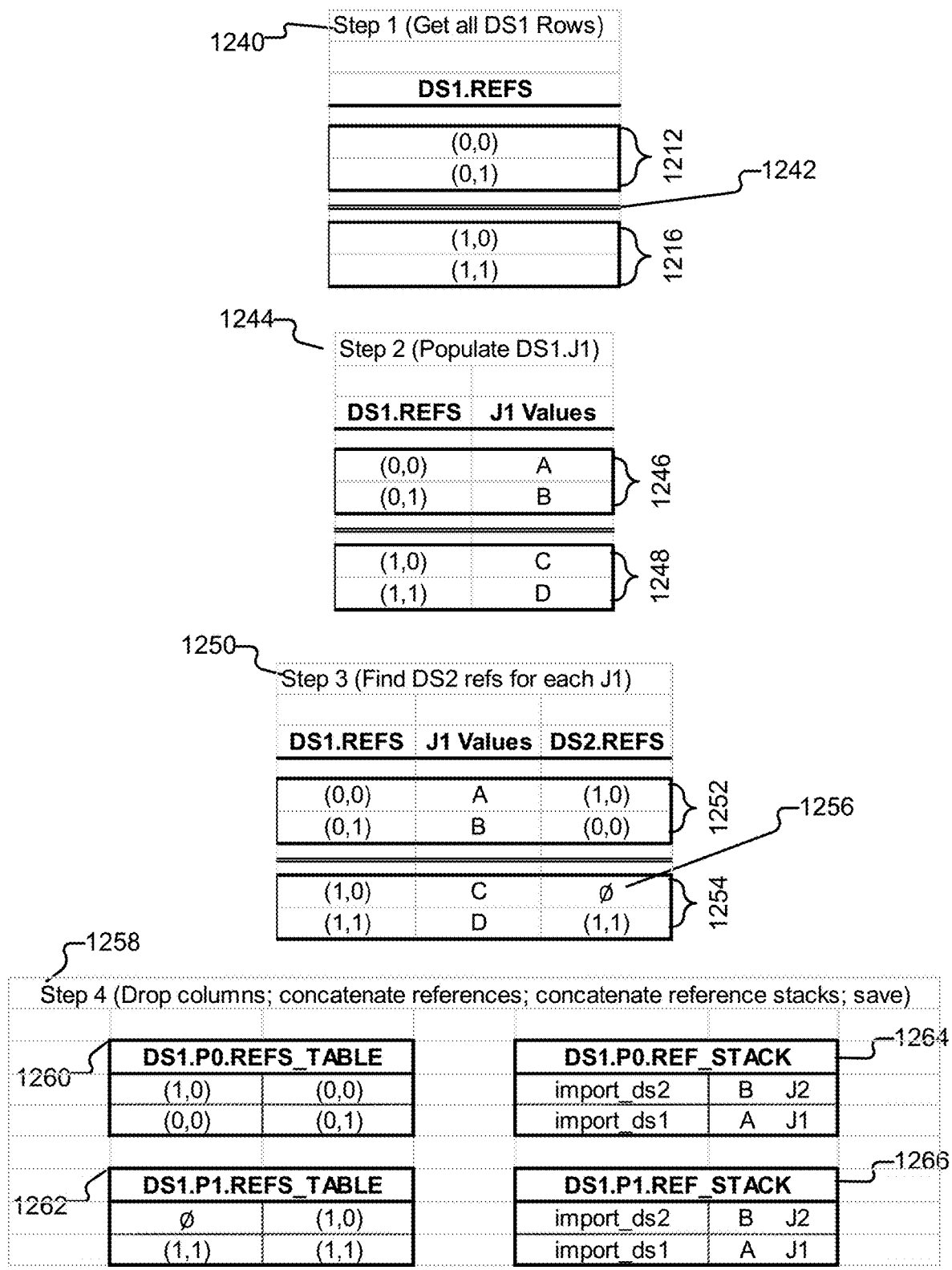
Figure 12D:
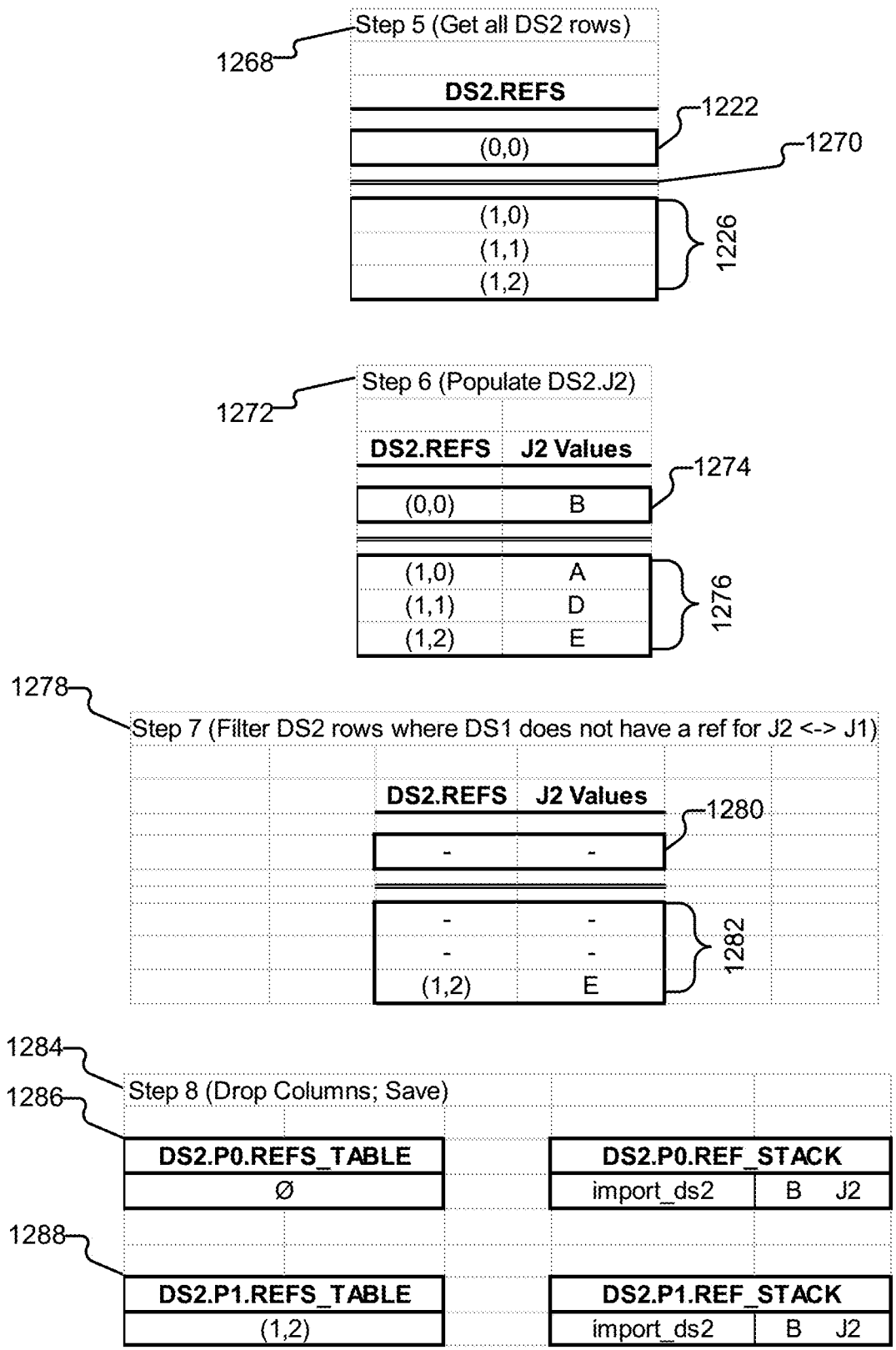

FIGS. 12C-E illustrate an example embodiment of a process for performing a full outer join. In some embodiments, the full outer join is performed by performing a left outer join and a right anti-join, with the results appended together to generate the virtual representation of the full outer join result. In the following nine steps described below, the first four steps are used to perform the left outer join. Steps five through eight are used to perform the right anti-join. Step nine is used to combine the results of the left and right joins to produce the representation of full outer join. The steps are described as follows.

Left Outer Join

FIG. 12C illustrates an example embodiment of a process for performing a left outer join. In some embodiments, the results of the left outer join are determined (and represented) by modifying/amending the data traversal programs (i.e., the references tables and reference stacks) of partitions zero and one of the DS1 pipeline 1210 shown in FIG. 12B. The processing performed in steps one through four is performed separately on each of the data traversal programs, but is shown together here for illustrative purposes.

At step one (1240), all DS1 rows are obtained. The rows of DS1 are represented by the references included in the references tables of the partitions of the DS1 space (e.g., references tables of partitions zero and one in DS1 pipeline space 1210 of FIG. 12B). In some embodiments, obtaining all DS1 rows includes obtaining the current references tables for each of the partitions of DS1.

For example, references table 1212 of partition zero of the DS1 pipeline space 1210 of FIG. 12B is obtained and shown above double line 1242. Similarly, the references table 1216 of partition one of the DS1 pipeline space 1210 is obtained and shown below line 1242.

At step two (1244) a column of J1 values corresponding to the rows/references obtained at step one is populated. For example, a column is added to the right of each of references tables 1212 and 1216 and is populated with corresponding J1 values, resulting in tables 1246 and 1248, respectively. In some embodiments, the J1 values are obtained by executing the data traversal programs shown in partitions zero and one of the DS1 pipeline space 1210 as shown in FIG. 12B.

At step three (1250), DS2 references for each J1 value are shown. In this step, the rows of DS2 (represented by their corresponding references) that include, in the J2 column, values matching to those in column J1 of DS1 are found. The identified rows are represented by references as indicated in the references tables of the partitions of the DS2 pipeline space 1220 of FIG. 12B.

In this step, the rows in DS1 and DS2 that share the same value in their respective J1 and J2 values are identified and mapped together. These rows will be concatenated together horizontally to create a joined row. In this example, the mapping is performed in part by adding an additional column (or columns if a row in DS2 is represented using multiple references) to the right of tables 1246 and 1248 to produce tables 1252 and 1254, respectively. The columns are populated with the appropriate DS2 references that have been identified as described above.

As shown at 1254, there is no row in DS2 in which the J2 column has the value "C" (i.e., the top row of references table 1216 in partition one of DS1 that is associated with the value "C" in its J1 column has no matching counterpart in DS2). In this example, the absence of a matching row is represented by the "0" symbol (1256).

At step four (1258), the J1 values columns are dropped from tables 1252 and 1254. For each of table 1252 and 1254, this leaves only the column of DS1 references and the column of corresponding/matching DS2 references remaining. The columns are concatenated together. In this example, the column containing DS2 values is concatenated to the left of the column containing DS1 values.

Thus, table 1252 is modified into table 1260, which is saved as the new, updated version of the references table for partition zero of the DS1 pipeline. Similarly, table 1254 is modified into table 1262, which is saved as the new, updated version of the references table for partition one of the DS1 pipeline. As each of the references tables for partitions one and zero of the DS1 pipeline have been updated to include a new column of corresponding DS2 references (that match according to the left outer join condition as determined in steps one through three, above), the corresponding reference stacks are updated as well. In this example, the reference stacks of DS2 (shown at 1224 and 1228 of FIG. 12B) are concatenated to the tops of reference stacks 1214 and 1218 of FIG. 12B to generate updated reference stacks 1264 and 1266, respectively.

Thus, the data traversal programs of partitions zero and one of the DS1 pipeline have been modified to represent the result of performing the left outer join. As will be described in further detail below, as the left outer join is an intermediary step in performing the full outer join, the updated partitions zero and one of DS1 will be repartitioned into the new project pipeline via an append.

Right Anti-Join

FIG. 12D illustrates an example embodiment of a process for performing a right anti join of the full outer join. In some embodiments, the process of FIG. 12D continues from the process of 12C. In some embodiments, the results of the right anti join are determined (and represented) by modifying/amending the data traversal programs (i.e., the references tables and reference stacks) of partitions zero and one of the DS2 pipeline 1220 shown in FIG. 12B. The processing performed in steps five through eight is performed separately on each of the data traversal programs, but is shown together here for illustrative purposes.

At step five (1268), all DS2 rows are obtained. The rows of DS2 are represented by the references included in the references tables of the partitions of the DS2 space (e.g., references tables of partitions zero and one in DS2 pipeline space 1220 of FIG. 12B). In some embodiments, obtaining all DS2 rows includes obtaining the current references tables for each of the partitions of DS2.

For example, references table 1222 of partition zero of the DS2 pipeline space 1220 of FIG. 12B is obtained and shown above double line 1270. Similarly, the references table 1226 of partition one of the DS2 pipeline space 1220 is obtained and shown below line 1270.

At step six (1272) a column of J2 values corresponding to the column of DS2 rows/references obtained at step five is populated. For example, a column is added to the right of each of references tables 1222 and 1226 and is populated with corresponding J2 values, resulting in tables 1274 and 1276, respectively. In some embodiments, the J2 values are obtained by executing the data traversal programs shown in partitions zero and one of the DS2 pipeline space 1220 as shown in FIG. 12B.

At step seven (1278) tables 1274 and 1276 are filtered to identify DS2 rows where there is no corresponding DS1 row (represented using references) whose J1 column value matches to a DS2 J2 column value. In this example, no references in table 1274 survived, resulting in an empty table 1280. Only one row of table 1276 remains, resulting in table 1282.

At step eight (1284), the J2 values column of tables 1280 and 1282 are removed, leaving in each table only the DS2 references that remained (if any) as a result of the filtering operation in step seven. Thus, table 1280 is modified into empty table 1286, which is saved as the new, updated version of the references table for partition zero of the DS2 pipeline (represented with a "0" symbol). Similarly, table 1282 is modified into table 1288, which is saved as the new, updated version of the references table for partition one of the DS2 pipeline. In this example, the newly updated references for partitions zero and one of DS2 still obtain DS2 references, and the reference stacks for those partitions are not modified (e.g., are the same as shown at 1224 and 1228 of FIG. 12B).

Thus, the data traversal programs of partitions zero and one of the DS2 pipeline have been modified to represent the result of performing the right anti-join. As will be described in further detail below, as the right anti join is an intermediary step in performing the full outer join, the updated partitions zero and one of DS2 will be repartitioned into the new project pipeline.

Determining the Representation of the Full Outer Join Result

FIG. 12E illustrates an example embodiment of a process for performing a full outer join. In some embodiments, the process of FIG. 12E continues from the process of 12D.

At step nine (1290), the results of step four and step eight described above are appended together. In some embodiments, the appending is performed similarly to as described in conjunction with FIGS. 11A-I. For example, the partitions of DS1 and DS2 are repartitioned into a newly declared pipeline (referred to as the "project" pipeline), which also includes renumbering the partitions in sequential order in the new pipeline.

In this example, because DS1 is the driving table, partition zero of DS1 as of step four is repartitioned as partition zero of the new project pipeline, and includes the data traversal program including references table 1260 and corresponding reference stack 1264 as shown in FIG. 12C. Partition one of DS1 as of step four is repartitioned as partition one of the new project pipeline, and includes references table 1262 and corresponding reference stack 1266 as shown in FIG. 12C.

In this example, because DS2 is the lookup table, partition zero of DS2 as of step eight is repartitioned as partition two of the new project pipeline, and includes the data traversal program including references table 1286 and corresponding reference stack as shown in FIG. 12D. Partition one of DS2 as of step eight is repartitioned as partition three of the new project pipeline, and includes the data traversal program including references table 1288 and corresponding reference stack as shown in FIG. 12D.

In the above, the processing of FIGS. 12C (left outer join) and 12D (right anti-join) was described sequentially. In some embodiments, the processing of FIGS. 12C and 12D is performed in parallel. The results of the left outer join and right anti join are then appended together to determine the representation of the full outer join result as described above in conjunction with FIG. 12E.

As shown in the example virtual representation of the result of the full outer join shown in FIG. 12E, the reference stacks for partition zero and one of the project pipeline each include references to file sets and steps from disjoint sources. For example, the reference stacks for the project partitions zero and one each include handles for file sets that were generated both for the DS1 pipeline as well as the DS2 pipeline.

As described above, using the techniques described herein, a set of sequenced operations on one or more input data sets results in a virtual representation of the results of the operations on the data sets. The virtual representation includes data traversal programs, which when executed, output the actual data values of the results.

Additional Join Example—Lowercase on J2 of DS2 Before Join

In the following example, suppose that a user decides to perform a lowercase on column J2 of DS2 before it is joined with DS1. The state of the data traversal programs of the partitions of the DS1 and DS2 pipeline spaces prior to the join are shown in FIG. 12F.

In this example, no rows in DS2 will have J2 values that match to J1 values in the DS1 rows. By performing steps one through nine as described above in conjunction with FIGS. 12C-E, the result of the full outer join is represented as shown in FIG. 12G.

As shown above, the techniques described herein, such as the use of a representation such as a data traversal program, have various benefits. One example is an increase in the efficiency of storage, where the amount of storage needed to represent the results of operations is reduced. This is for example due to a compact data traversal program representation of the results being maintained, rather than actual values of a data set. As another example, the efficiency in processing speed is also increased, as only data that is modified by operations is written. Furthermore, by performing operations on references that represent data, rather than the actual data itself, further efficiency gains can be realized, as the references are more compact than the data itself (e.g., a set of references representing a row of data takes less space than the data values that make up the row). Additionally, by performing caching, as described above, as well as identification of caches, as described below, redundancy can be avoided, where, for example, existing cached results can be leveraged to avoid repeating computations.

Figure 13:
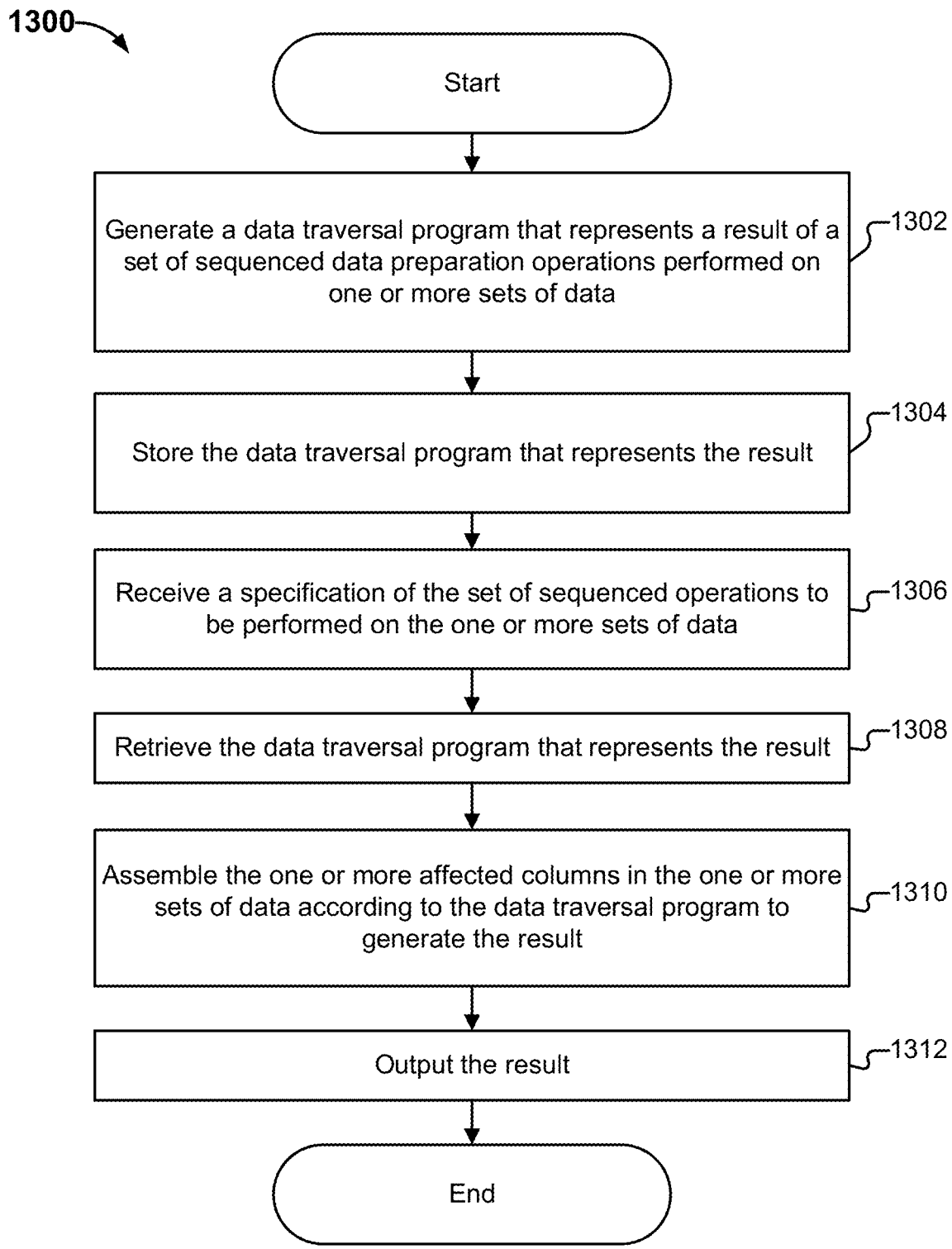
FIG. 13 is a flow diagram illustrating an embodiment of a process for caching transformation results.

FIG. 13 is a flow diagram illustrating an embodiment of a process for caching transformation results. In some embodiments, process 1300 is executed by data transformation engine 210 and caching engine 212 of FIG. 2. The process begins at 1302 when a data traversal program that represents a result of a set of sequenced data preparation operations performed on one or more sets of data is generated. In some embodiments, the set of sequenced data preparation operations form a pipeline through which the input data is pushed. In some embodiments, the data traversal program indicates how to assemble one or more affected columns in the one or more sets of data to derive the result. In some embodiments, the one or more sets of data are re-written as an addressable data set. For example, the one or more sets of data are re-written as column files, as described above, which are columns of cells stored in a file. In some embodiments, the values of the column files are obtained from the sources of the one or more data sets. As operations are performed, new versions of column files are written for those columns that are affected (e.g., modified/changed) by an operation. In some embodiments, the set of sequenced data preparation operations is received in the form of a script (e.g., generated by script generator 204 of FIG. 2). In some embodiments, the script is generated based on user input received via a step editor user interface (e.g., provided by user interface engine 202). The step editor user interface provides a user interface by which a user can configure a sequenced set of data preparation operations to be performed on one or more input sets of data.

The data traversal program records the cumulative effects of performing the set of sequenced data preparation operations. In some embodiments, as described above, the data traversal program includes references (e.g., stored in references tables). The references are references to mappings of row transformations that occurred during the set of sequenced data preparation operations. In some embodiments, the references refer to data values (e.g., in column files) that are used to describe/define a row in the result. In some embodiments, the data traversal program includes a reference stack. The reference stack includes a record/history of the sequenced operations and columns that were changed by the sequenced set of operations. In some embodiments, the reference stack includes references to file sets that store column files of data values that were written due to data preparation operations that were performed.

In some embodiments, the data traversal program requires less storage/memory than what is required to store the result. In some embodiments, the data traversal program is generated without moving the set of data. In some embodiments, the data traversal program is generated without generating the result.

In some embodiments, the manner in which the data traversal program is generated/updated throughout a sequenced set of operations is operation dependent, as described in the various data preparation operation examples above. Example techniques for generating and executing data traversal programs are described in the examples above.

At 1304, the data traversal program that represents the result is stored. For example, the data traversal program is cached to a cache layer. In some embodiments, data pertaining to the data traversal program, such as a references table is stored. In some embodiments, the decision of whether to store/cache a data traversal program can be based on a variety of factors. For example, a user can explicitly indicate (e.g., via an editor user interface) where in a sequenced set of operations that they would like to create a save point. The cache representation corresponding to that save point location will then be stored. In some embodiments, rather than storing the data traversal program, the data traversal program is maintained in memory.

In some embodiments, the decision of whether to cache a representation is based on the data operation that was performed. For example, the complexity/computational cost of an operation/set of operations can be considered. As one example, for costly/expensive operations, such as sort, filter, or join that affect an entire set, the resulting data traversal program can be cached. As another example, the cost of an aggregate set of operations can be considered. For example, while the cost of an individual operation, such as performing an uppercase, may be inexpensive, performing multiple of the operation (e.g., uppercases on twenty columns) may be costly. Thus, the contents of a script can be evaluated to determine where caching should be performed.

Another example factor that can be considered includes a measure of the likelihood that a user may revise an operation. For example, by observing, over time, various users' behaviors, the types of operations that are often changed or swapped out in scripts can be identified and learned.

By caching the representations at various stages of the pipeline, users can, for example, return to view the results of a certain point in a pipeline without recomputing the sequenced set of operations that led up to that point.

In some embodiments, the data traversal program is stored with a set of one or more corresponding signatures. In some embodiments, the set of one or more signatures is derived based on the set of sequenced operations that were performed. For example, each signature is generated using a hash function (e.g., a cryptographic hash such as MD5, SHA-1 or some other signature generating function). of the operations that were performed, where the operations are combined in a manner that preserves the order in which they were applied. Signatures are described in further detail below with respect to process 1400 of FIG. 14.

In some embodiments, the data traversal program representing the result can be recomputed and updated. For example, suppose that the user has performed a set of sequenced operations on a source dataset DSX. The next morning, another user makes a change to the source dataset DSX. In response to an indication that the source dataset DSX has been changed, the data traversal program can be updated by re-performing the set of sequenced operations on the modified source dataset (i.e., a new cache is built using the newer version of the data, allowing for automatic updating of caches).

At 1306, a specification of the set of sequenced operations to be performed on the one or more sets of data is received. At 1308, the data traversal program that represents the result is accessed. In some embodiments, a stored copy of the data traversal program that represents the result is accessed. In some embodiments, the data traversal program (or copy of) is accessed in response to receiving the specification at 1306. As one example, a user further performs data preparation steps beyond those that result in the data traversal program being generated. The user decides that they would like to go back to the stage in the pipeline at which the generated data traversal program was stored/cached. This indicates that the user would like to perform the same set of sequenced operations. The cached data traversal program is then retrieved.

As another example, another user happens to configure (e.g., via a step editor user interface) a same (or equivalent) sequenced set of data preparations as was performed to generate the cached data traversal program. A signature is derived from the received specification of the set of sequenced operations. The signature is determined to match to the signature of the cached data traversal program. The matching cached data traversal program is then obtained. Further details regarding the use of signatures to obtain cached results are described in conjunction with process 1400 of FIG. 14.

At 1310, the one or more affected columns in the one or more sets of data are assembled according to the data traversal program to generate the result. Examples of executing data traversal programs are described above in conjunction with FIGS. 7B and 8B. At 1312, the result is outputted. In some embodiments, outputting the results includes publishing or exporting them to another file. In some embodiments, outputting the results includes displaying the results. In some embodiments, only those results that are viewable in a current window of a UI are displayed. For example, if a result includes one thousand rows, but only three hundred rows are viewable in a UI, only those three hundred rows are assembled using the data traversal program. (More rows can be assembled to accommodate for potential scrolling by the user through the results). In some embodiments, the rows that are visible to the user determine the amount of computation to be performed. For example, rather than performing data preparation operations on all of the data, the operations are performed only on those rows that are visible to a user. As one example, a determination is made as to what rows are viewable to the user (e.g., what rows are viewable in a user interface). Data preparation operations are only performed on those partition(s) that include (references to) the rows currently viewable by the user. This reduces the amount of calculation load while still providing the results that the user desires.

In some embodiments, as described above, process 1300 is performed in the context of a distributed computing environment (e.g., Spark distributed computing platform), where the one or more data sets to be operated on (transformed through a pipeline/sequenced set of data preparation operations) are divided into partitions (e.g., using process 500 described in FIG. 5) to be worked on (e.g., by pipeline executors, as described above).

In some embodiments, each partition includes its own data traversal program, which when executed provides a subset of the overall results of applying a set of sequenced data preparation operations to one or more sets of data.

One example embodiment of the processing performed at 1310 to assemble a result in such a distributed computing platform using data traversal programs is as follows. A subset of the cumulative results at a stage in the pipeline is obtained by accessing a partition. The data traversal program for the partition is obtained and executed. A set of references representing a row of the subset of results is obtained from a references table of the data traversal program. Each reference comprises a coordinate identifying a partition number and a row identifier. A coordinate is used in conjunction with an entry of a reference stack to identify and access a previously written file set. The file set includes a set of columns that were modified as a result of performing an operation. The row identifier is used to identify the row in a specified subset of the columns that was written to the file set. The values in that row for the specified subset of columns are obtained. The columns to be looked up are specified in the reference stack entry. Thus, one or more affected columns in the one or more sets of data are assembled according to the data traversal program.

The overall results as of the stage of the pipeline are determined by aggregating and collating the different subsets of results (e.g., by a pipeline master, as described above), where the various subsets of results obtained from the partitions are organized in a particular order (e.g., by partition order, as described above).

Knowledge of the location of different subsets of the result can be managed by a pipeline master. This can be used to perform optimizations when providing output. For example, when determining what window of results to provide in the UI to a user (e.g., as they are scrolling through a result), only those subsets of results corresponding to the current position of the user in the overall results are obtained from their corresponding partitions.

Figure 14:
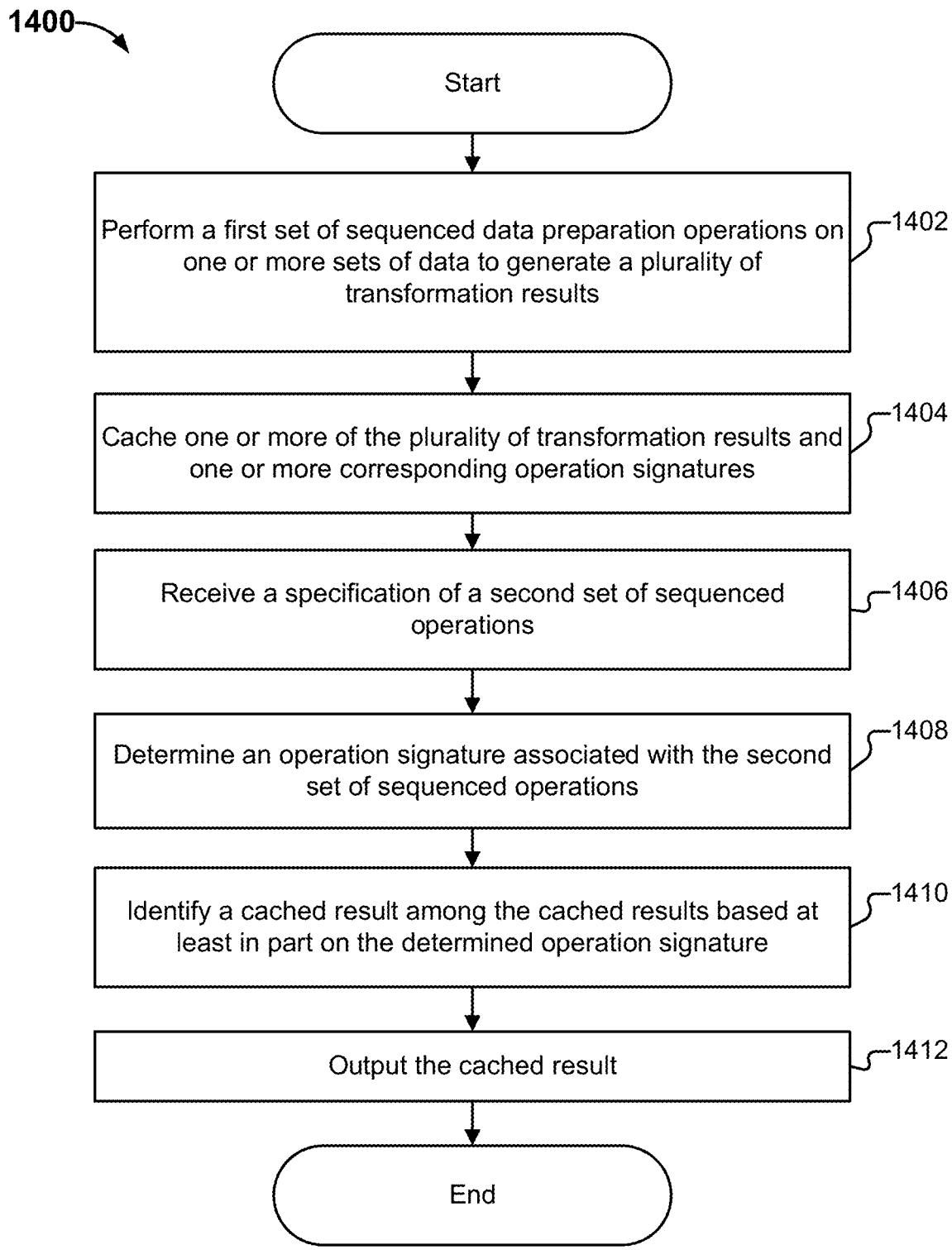
FIG. 14 is a flow diagram illustrating an embodiment of a process for cache reuse.

FIG. 14 is a flow diagram illustrating an embodiment of a process for cache reuse. In some embodiment, process 1400 is executed by data transformation engine 210 and caching engine 212 of FIG. 2. The process begins at 1402 when a first set of sequenced data preparation operations is performed on one or more sets of data to generate a plurality of transformation results. In some embodiments, a data preparation operation is an operation that transforms/mutates an input data. In some embodiments, the data is accessible dynamically upon execution of the set of sequenced operations, where the data is not necessarily stored, but may be computed on-the-fly, as needed. This is in contrast to operating against data stored at a fixed and known location. Further, the first set of sequenced operations is performed without the advantages of the input having been previously indexed and partitioned. In various embodiments, data preparation operations include clustering, joining, appending, sorting, uppercase, lowercase, filtering, deduplicating, grouping by, adding or removing columns, adding or removing rows, pivoting, depivoting, order dependent operations, etc. In some embodiments, the plurality of transformation results includes data traversal programs, such as those described in the examples above and in process 1300 of FIG. 13.

At 1404, one or more of the plurality of transformation results and one or more corresponding operation signatures are cached. In some embodiments, a cached operation signature is derived based at least in part on a subset of sequenced operations that generated a corresponding result. One example of a signature is a hash of the subset of sequenced operations. In some embodiments, the cached operation signature comprises an order independent grouping of representations of the subset of sequenced operations that were performed to arrive at the corresponding result. For example, the signature is a grouping of (hashed) identifiers (e.g., serial numbers, string representations, etc.) representing the subset of sequenced operations. In some embodiments, the grouping can be order-dependent. In some embodiments, having a signature based on a grouping of operation representations allows for collective comparisons with other groupings of operation representations, for example, to determine if there is any overlap between different groups of data preparation operations (e.g., specified in different sets of sequenced operations). In some embodiments, the cached operation signature is also derived based on a reference to the set of data that was operated on. For example, the cached operation signature can also be generated based on an identifier and/or version number of the set of data that is operated on. In some embodiments, the transformation results include data traversal programs, such as those described above.

At 1406, a specification of a second set of sequenced operations is received. For example, via a user interface, a user creates the new second set of sequenced operations or manipulates an existing set of sequenced operations. At 1408, an operation signature associated with the second set of sequenced operations is determined.

At 1410, a cached result among the cached results is identified based at least in part on the determined operation signature. For example, in some embodiments, the determined operation signature is compared with the signatures corresponding to stored results. For example, the groupings of operation representations associated with the signatures can be collectively compared with each other to determine any overlap (e.g., partial or complete overlap) between the operations of the determined operation signature and the operations associated with the stored results.

Figures 11J, 11K:
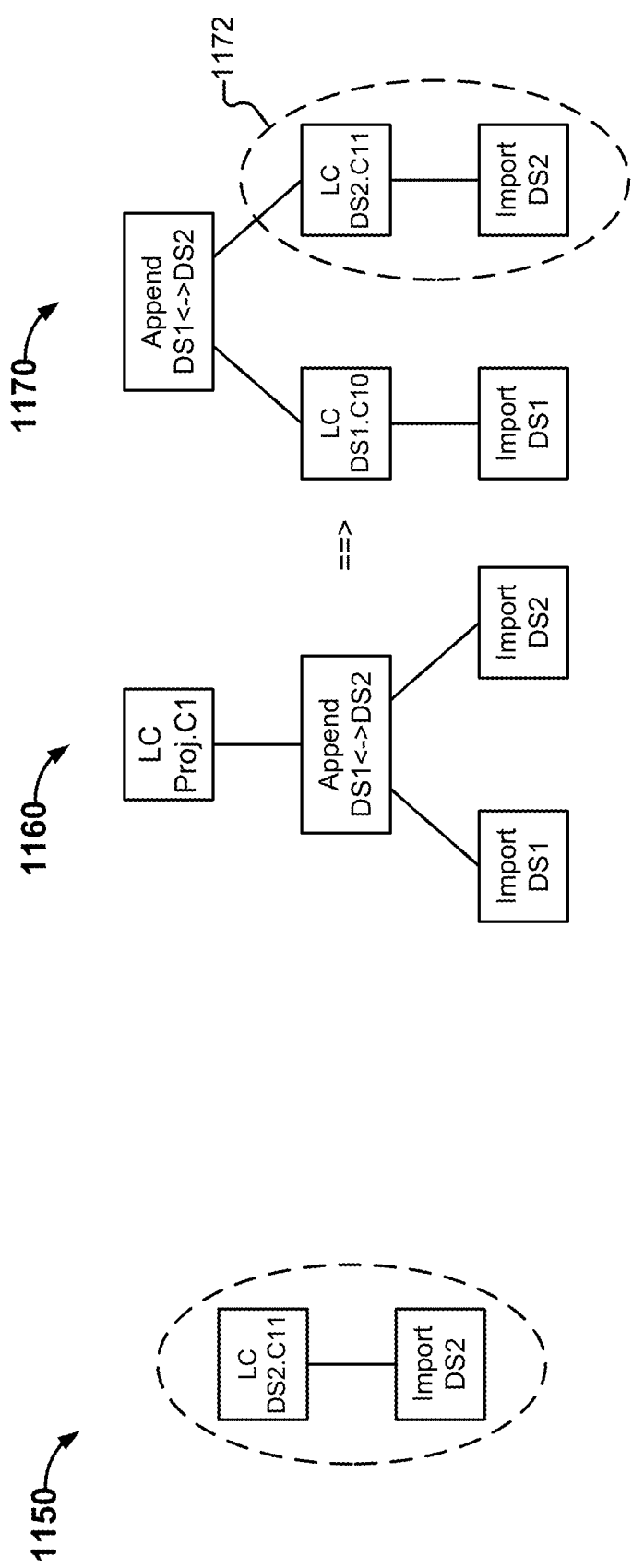
FIG. 11J illustrates an example embodiment of a tree representation of a set of sequenced operations.
FIG. 11K illustrates an example embodiment of a tree representation of a set of sequenced operations.

In some embodiments, the signatures correspond to graph structures such as those shown in FIGS. 11J-K that represent the flow of a set of sequenced operations. Comparing different signatures includes comparing different graph structures. In some embodiments, it is determined whether any or all of the signatures being compared match or are otherwise equivalent (e.g., sub-signatures can be identified). In some embodiments, operator push down, such as described above in conjunction with FIG. 11K, can be used to find matches. In some embodiments, the operator push down generates functionally (semantically) equivalent signatures. Thus, stored results that match to portions of the second set of sequenced operations can be identified and leveraged as well.

At 1412, the cached result is outputted. In some embodiments, if the stored result is equivalent to the result of having performed the second set of sequenced operations, then the identified stored result is outputted directly (e.g., displayed in a UI or published/exported). In some embodiments, if the identified stored result is a partial match and an intermediary result usable to obtain a desired final result, then that portion of the results is obtained and need not be computed. This reduces the amount of computation required to perform the second set of sequenced operations, which can incorporate the identified stored result to arrive at a final result.

Step Editor

FIGS. 15A-E illustrate example embodiments of user interfaces of a step editor usable to configure a sequence of data preparation operations and to view corresponding results. In some embodiments, the user interface examples of FIGS. 15A-E are implemented by user interface engine 202 of front end 200 of FIG. 2.

Figure 15A:
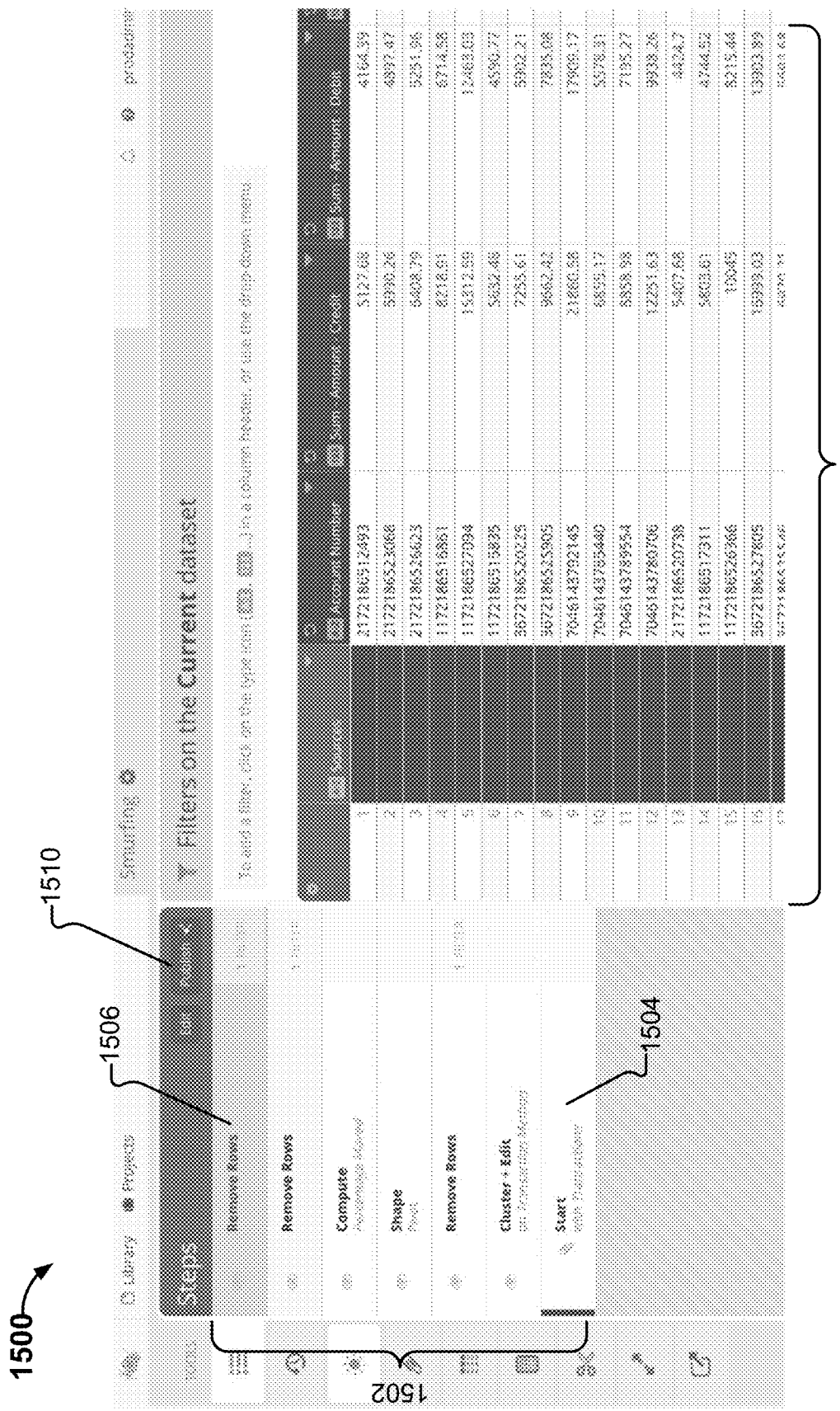

Suppose for example that a user, via step editor UI 1500 of FIG. 15A, specifies a set of sequenced data preparation operations 1502. The set of sequenced operations starts at 1504, where a data set (called "Transactions" in this example) is specified. In some embodiments, the data set is partitioned and imported using the techniques described above. A step in the set of sequenced operations can be edited to specify criteria on which the step/action is performed. For example, at step 1506, rows can be removed based on configurable filtering criteria. In some embodiments, the specified steps are used to generate a script (e.g., using script generator 204 of front end 200 of FIG. 2). The operations specified in the script are then performed, for example, by pipeline server 206 of FIG. 2 and/or pipeline server 300 of FIG. 3.

At 1508, results as of a particular step can be viewed. In this example, the result of having sequentially performed steps 1504-1506 is shown. The results can be determined using the techniques described above, where, for example, data traversal programs representing the result are generated. The data traversal programs can then be executed to output the corresponding results. By using such data traversal programs and operating on references that are intermediate representations of the actual data set (rather than operating on the actual data itself), the resulting increase in computational efficiency as described above can improve application response time, where for example, the results are provided to the user in real-time, without the user having to wait long periods of time for the operations to be performed. In some embodiments, only those results that are viewable in portion 1508 of the UI are computed and displayed, as described above. At 1510, the results as of a particular step can also be published (e.g., exported).

The step editor user interface also provides the ability to go backwards and forwards through the sequenced set of steps. Continuing with the example of FIG. 15A, suppose that the user would like to go back to the third step 1512 of FIG. B to see the data at that step. If the result at that step was previously cached (e.g., at a corresponding save point), then the cached result can be retrieved and displayed at display region 1514. For example, as the sequenced set of operations is performed, the results as of step 1512 can be saved by the user (e.g., by pressing a "save" button corresponding to that stage of the pipeline), or automatically saved (e.g., by a pipeline server such as pipeline server 300 based on various cost functions and criteria as described above).

In some embodiments, if there was no save point for that step, it is determined whether there are any existing cached results that can be leveraged. For example, as described above, operation signatures (e.g., hashes) can be generated for the current set of steps of interest and compared against the signatures associated with cached results. If a match is found, the matching cached result can be obtained so that the computations to arrive at the cached result need not be performed. In some embodiments, matches that identify cached results that are intermediary results on the path to determining a final result can also be leveraged. For example, the intermediary result need not be recomputed, reducing the total amount of computation needed to arrive at a desired result. If no matches are found, then the current set of steps can be executed to arrive at the desired result.

The user can also move forward again through the steps (e.g., to return to some point in the pipeline after having previously traversed backwards). Similarly to as described above, if the forward result has been saved/cached, then it can be retrieved and provided as output. If a cached result does not exist, then the results can be recomputed (e.g., by determining a new data traversal program).

Figure 15B:
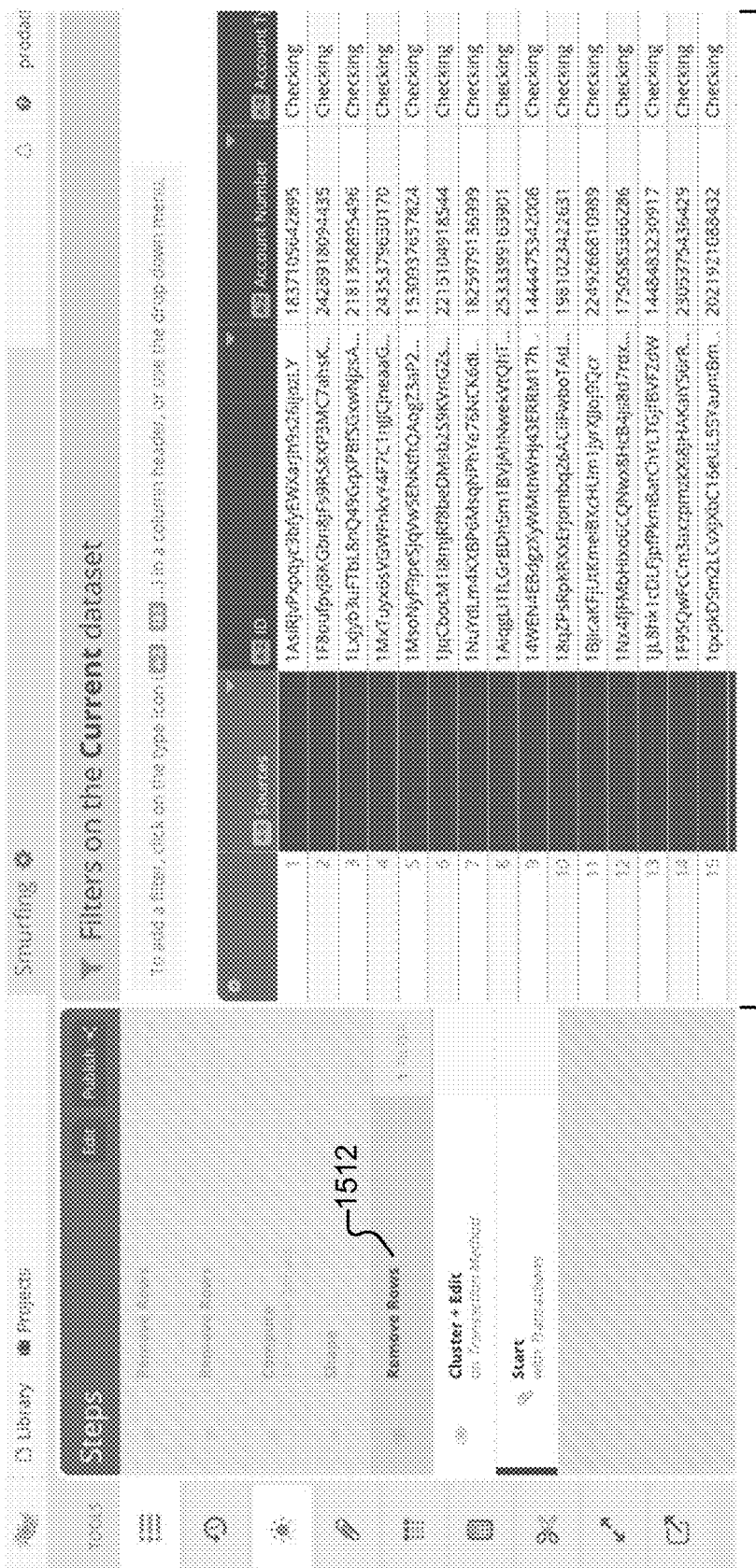

In some embodiments, the step editor provides the ability to mute a step to see how data would look like with or without that step. Continuing with the example of FIG. 15B, suppose that a user, via interface 1516 of FIG. 15C, has indicated that they would like to mute the third step, 1518 (which is the same third step 1512 of FIG. 15B). In some embodiments, a new script is generated for steps 1520 that does not include 1518. In some embodiments, the operations of the reduced set of steps are used to generate one or more operation signatures. The generated signatures can be used to determine whether any existing cached representations can be leveraged. If not, then the new sequenced set of steps minus step 1512 of FIG. 15B is recomputed.

In one example embodiment, the signature generated based on the new sequenced set of steps is used to create a tree/graph representation of the new sequenced set of steps 1520 (with 1518 muted). This is compared with the tree/graph generated from the signatures of cached results. Using techniques similar to those described in conjunction with FIGS. 11J-K, it can be determined whether there are any existing cached results that can be leveraged. For example, operator push downs can be used when determining potential matches.

The results of muting step 1518 can then be displayed, as shown at 1519.

Figure 15D:
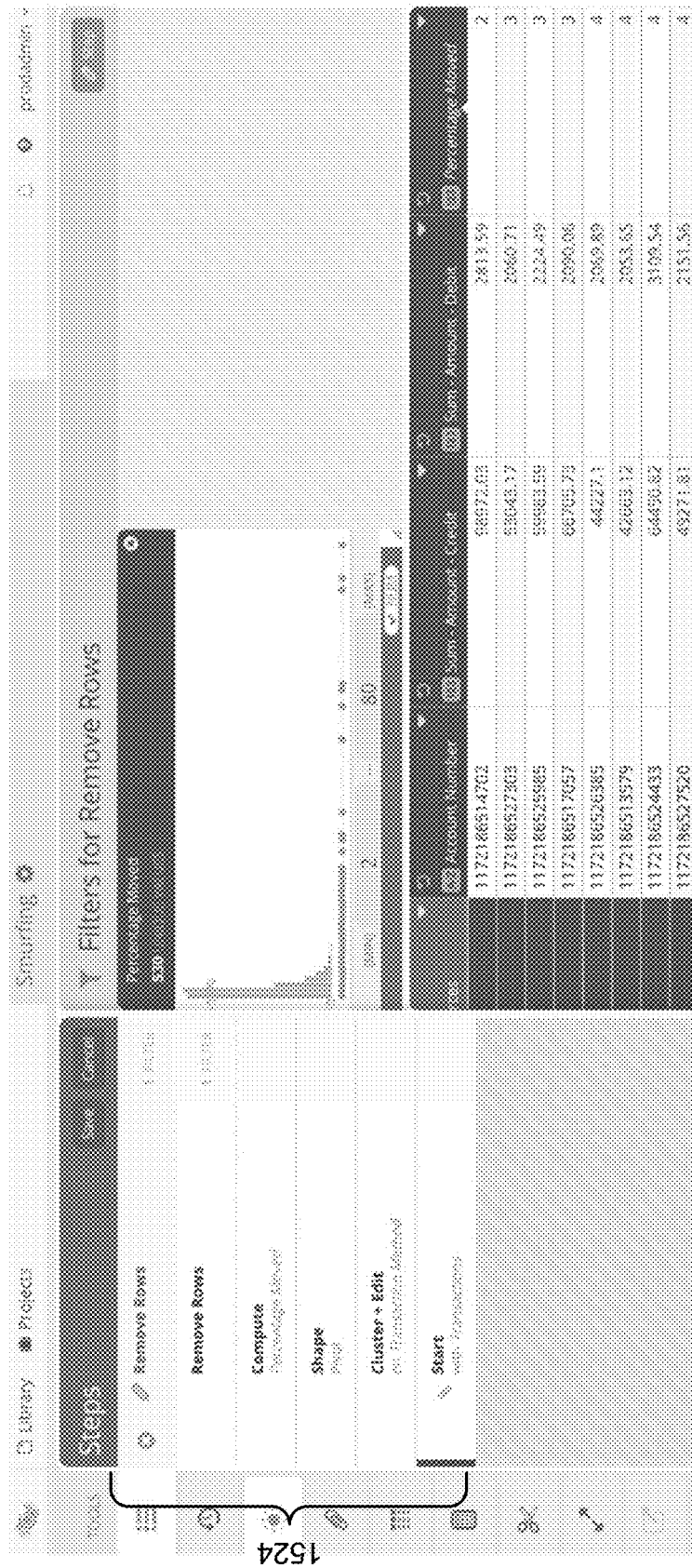
Figure 15E:
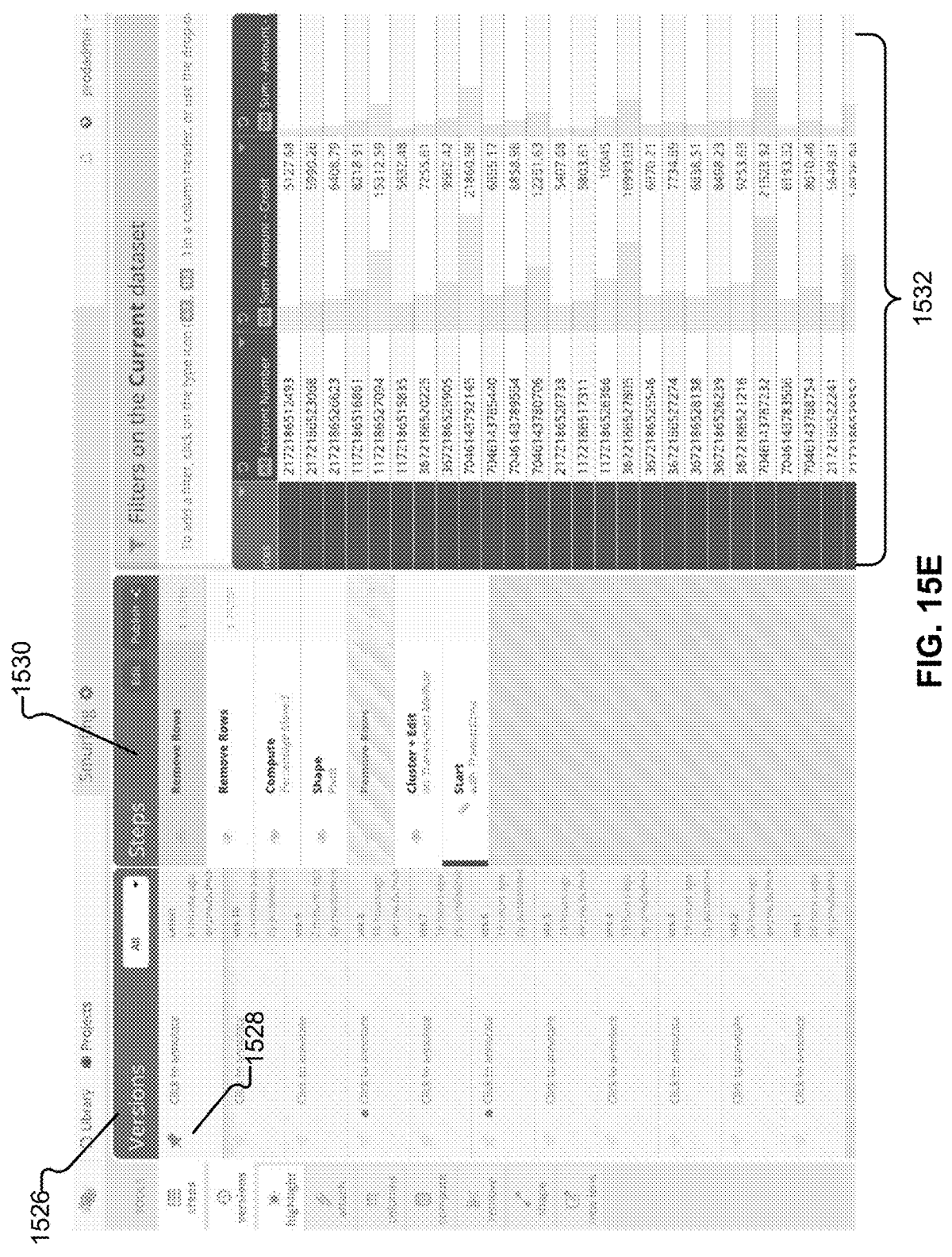

In some embodiments, the step editor also provides the ability to delete a step. Continuing with the example of FIG. 15C, suppose that the user, after viewing the data with step 1518 muted, decides to remove that step. Portion 1524 of interface 1522 of FIG. 15D is updated to reflect the removal of that step.

In some embodiments, the step editor also provides the ability to save changes to the sequenced set of operations. For example, as changes to a pipeline are made, each version of the pipeline can be saved as a different version of the project that is being worked on. For example, different versions of a project are shown at 1526 of FIG. 15E. In this example, the user has selected version 1528 to view. The corresponding pipeline for version 1528 of the project is shown at 1530. In this example, version 1528 was maintained by saving the state of the project as of FIG. 15C, where the third step was muted. The results for version 1528 of the project are shown at 1532.

Figure 16:
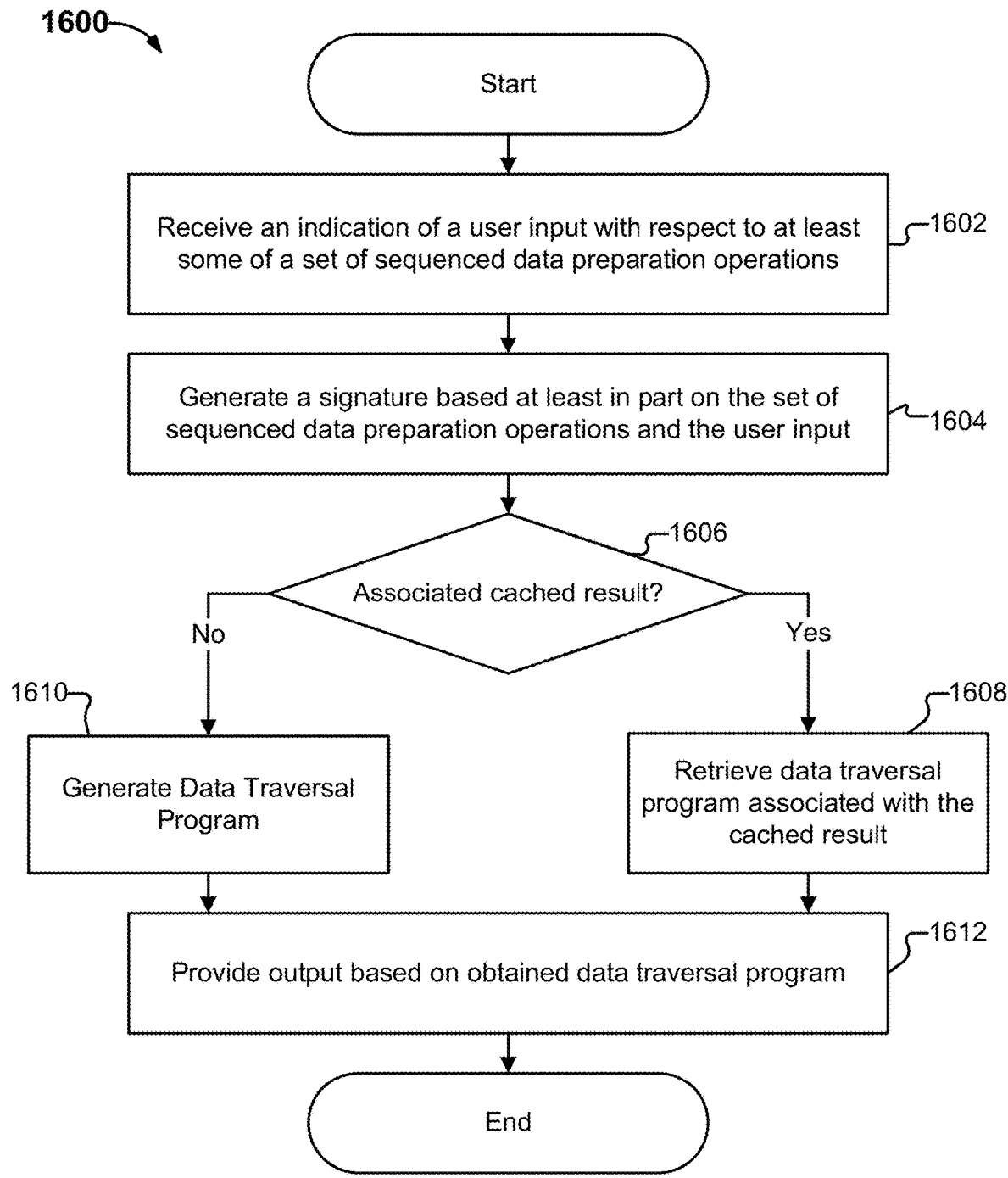
FIG. 16 is a flow diagram illustrating an embodiment of a process for using a step editor for data preparation.

FIG. 16 is a flow diagram illustrating an embodiment of a process for using a step editor for data preparation. In some embodiments, process 1600 is executed by pipeline server 206 of FIG. 2. The process begins at 1602 when an indication of a user input with respect to at least some of a set of sequenced data preparation operations on a set of data is received. For example, user inputs such as those described above (e.g., muting a step, deleting a step, stepping backwards/forwards through the set of sequenced data preparation operations, etc.), are received. In some embodiments, the user input is received via a user interface (e.g., such as step editor user interfaces 15A-E described above) provided by a front end such as front end 200 of FIG. 2 (e.g., using user interface engine 202). In some embodiments, the user input results in a modification to, or a selection of, at least some of the data preparation operations in the set of sequenced data preparation operations. In some embodiments, a script is generated (e.g., using script generator 204 of front end 200 of FIG. 2) based on the set of sequenced data preparation operations and the user input. In some embodiments, the set of sequenced data preparation operations is saved in response to the user input. For example, if a change to the sequenced set of data preparation operations is detected, then the new version of the sequenced data preparation operations is saved (e.g., versioning is performed, as described above).

At 1604, a signature is generated based at least in part on the set of sequenced data preparation operations and the user input. For example, if the user input modifies the set of sequenced data preparation operations (e.g., by muting or deleting a step), then a signature based on the modified set of sequenced data preparation operations is generated. As another example, if the user steps through the set of sequenced data preparation operations (e.g., forwards or backwards) to view the results as of some particular stage in the pipeline (e.g., as of step three in a set of five sequenced data preparation operations), then a signature can be generated for the subset of the sequenced data preparation operations up to the point indicated by the user. In some embodiments, the signature is generated based on the script that is generated in response to the user input with respect to the set of sequenced data preparation operations.

In some embodiments, the signature is generated based on the set of data being/to be processed. For example, references to/representations of the set of data are used to generate the signature. One example representation of the set of data is an identifier and version number of the set of data. For example, different sets of data can be associated with different identifiers. Different versions of the same set of data can be associated with different version numbers. As will be described in further detail below, signatures can be matched based on the set of sequenced data preparation operations, the user input with respect to the set of sequenced data preparation operations, and the representation of the set of data. For example, the same set of sequenced data preparation operations applied to two different sets of data would result in different signatures (and have different results as well).

At 1606, the generated signature is used to determine whether there exists a cached result associated with the set of sequenced data preparation operations, the user input, and the reference to the set of data. In some embodiments, the match determination and cached result identification is performed using the techniques described in conjunction with process 1400 of FIG. 14. For example, the generated signature is compared to signatures corresponding to cached results (represented by data traversal programs). Partial matches can also be identified. Similarly, other techniques described above, such as operation push down can also be used to identify matches. If an associated cached result exists, then the process continues to 1608. If an associated cached result does not exist, then the process continues to 1610.

At 1608, the matching associated cached result is retrieved. In some embodiments, the cached result is represented using a data traversal program, which is retrieved. In some embodiments, if the cached result is equivalent to the result of having applied the user input to the set of sequenced data preparation operations, then the retrieved cached result is outputted directly (e.g., displayed in a step editor UI or published/exported) at 1612. In some embodiments, if the identified cached result is a partial match and an intermediary result usable to obtain a desired final result, then that portion of the results is obtained and need not be recomputed. This reduces the amount of computation required to arrive at the final result. The final result can then be computed using the retrieved data traversal program associated with the cached result and outputted at 1612.

At 1610, if no matching cached result exists, then a data traversal program representing the result of applying the user input to the set of sequenced data preparation operations is generated (e.g., using the processing described above in conjunction with process 1300 of FIG. 13). The result represented by the generated data traversal program is then provided as output at 1612. For example, the results are published or exported (e.g., to an external file).

In some embodiments, the results are displayed to the user via step editor user interfaces such as those described above. In some embodiments, only those results that are viewable in a current window of a UI are displayed. For example, if a result includes one thousand rows, but only three hundred rows are viewable in a UI, only those three hundred rows are assembled using the data traversal program. (More rows can be included to accommodate for potential scrolling by the user through the results).

In some embodiments, the rows that are visible to the user can be used to reduce the amount of computation to be performed. For example, rather than performing data preparation operations on all of the data, the operations are performed only on those rows that are visible to a user. As one example, a determination is made as to what rows are viewable to the user (e.g., what rows are viewable in a user interface). (More rows can be included to accommodate for potential scrolling by the user through the results). Data preparation operations are only performed on those partition(s) that include (references to) the rows currently viewable by the user. This reduces the amount of calculation load while still providing the results that the user desires. Thus, by only performing operations on those rows that are visible to users, users are able to view real-time results as they interact with the step editor user interfaces (e.g., while making changes to the data preparation operations).

Data Preparation Context Navigation

As described above, using the techniques described herein, sequenced data preparation operations can be efficiently performed on data sets to generate transformation results (also referred to herein as "answer sets"). The configuration of a sequence of data preparation operations may be performed via a step editor, details of which are also described above. Different versions of a project may be maintained, as described above. Interactive viewing of corresponding results may be viewed through a data preview grid. Such functionality is supported in various embodiments using a data preparation application implemented on a system such as the data preparation system of FIG. 2.

After completing a sequence of data preparation operations on one or more data sets, a user may wish to export the results of the data preparation operations to another application for further processing.

As one example, a data preparation application may be used in conjunction with a visualization tool such as Qlik or Tableau. For example, the answer sets (e.g., prepared data) generated from a data preparation application may be exported to or directly imported into the visualization tool. Various types of visualizations of the data in the answer sets can then be rendered using the visualization tool. When viewing data using the visualization tool, a user of the visualization tool (e.g., a business analyst) may wish to further explore how the results were arrived at. For example, while a user may use a visualization tool to gain insights and answers and make data driven decisions, those insights are dependent on the data that supports them (e.g., the quality of the data, how the data was arrived at, etc.). A data preparation application such as that described above is configured to ensure that data driven decisions are based on data that is contextual, correct, clean, and complete. In other or existing techniques and systems, it can be challenging or difficult to understand the source of the data that is being visualized. For example, typically, the path from data preparation to visualization is one way.

It would be beneficial if users were provided a mechanism by which to further explore and understand the data used to support the visualizations that they are viewing in a business intelligence visualization tool. This will allow the users, for example, to make better data driven decisions.

Described herein are techniques for transporting or navigating a user from a tool such as a visualization application back into an appropriate context within the data preparation application that provides further context and understanding about the data being displayed in the visualization tool. Using the techniques described herein, a single click path may be provided from a visualization tool to a data preparation application (also referred to herein as "click-to-prep," where a user can click to navigate from a visualization tool to a data preparation application). The same visualization tool may include many different links to many different possible projects.

As will be described in further detail below, examples of such context include a project filtergram(s) (histogram of filtered data) or project step that generated or modified the data being visualized. Other examples of data preparation context which can be provided include the lineage and quality of the data being visualized using the visualization tool. As will be described in further detail below, the linking back to an appropriate context of a data preparation application is implemented, in some embodiments, using references (also referred to herein as "click-to-prep links" or "links"). An example of a link or reference is a uniform resource locator (URL). While example embodiments involving URLs are described throughout for illustrative purposes, the techniques described herein can variously be adapted to accommodate any type of reference or link.

For example, URL entry points are generated into the data preparation application, allowing users to be landed in an appropriate and/or specific data preparation context. The data preparation capabilities and techniques described above can also be leveraged, such as landing in specific data preparation steps and retrieving a corresponding cache, providing faster, more efficient retrieval and display of data.

Using the techniques described herein, URL entry points can be configured that closely tie the visualizations that a business analyst is viewing in a visualization tool with how the data supporting the visualizations was actually arrived at (e.g., how the data supporting the visualization was transformed or prepared into the values visualized). The user of the visualization tool can then determine not only data driven answers to, for example, business related questions, but also how those answers were arrived at by efficiently being landed back (e.g., with a single click of a URL) into the appropriate context in the data preparation application used to prepare the data being visualized. Thus, users can have a better or more complete understanding of the underlying data that is being visualized, as well as how the underlying data was processed.

In some embodiments, this also allows for an iterative process when making a data driven process. Using the techniques described herein, iterative, interactive refinement may be supported, for example, from data prep→visualization→data prep→visualization. For example, using the techniques described herein, users can use a visualization tool to derive data driven answers, go back to the data preparation tool to understand how the underlying data supporting the visualization was arrived at, make changes (e.g., corrections to the data or data preparation operations/process), publish new results based on the changes, return back to the visualization tool to see how the answers may have changed (e.g., improved), etc. Thus, using the URL entry points described herein, users can drill down into the data (prepared using a data preparation application) that is behind answers they are deriving using a visualization tool. This also improves the ability of the data preparation application to deliver contextually correct, clean, and complete data.

While examples involving a visualization tool are described below for illustrative purposes, the techniques described herein can variously be adapted to accommodate other types of applications, such as analytics and governance applications, as well as data libraries, relational systems, etc. (which can also be used to further process data prepared via a data preparation application). In various embodiments, any application that supports URL link backs can be supported with the techniques described herein variously adapted.

Figure 17:
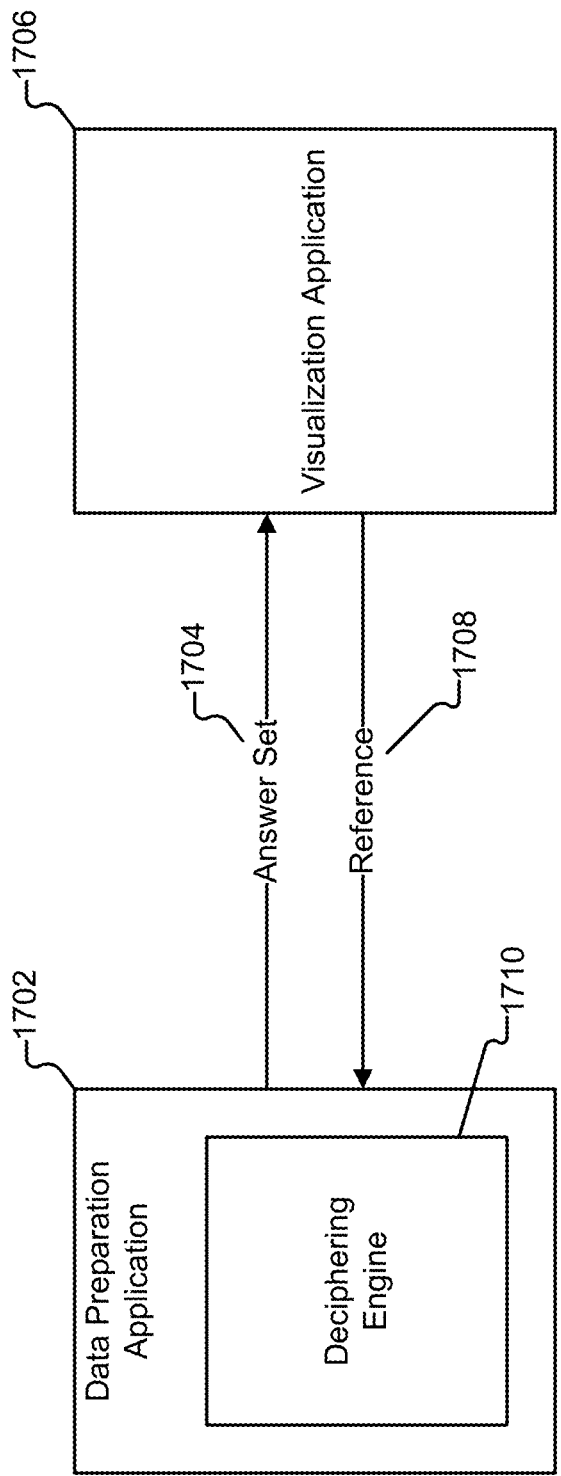
FIG. 17 illustrates an embodiment of an environment in which linking back or returning to a data preparation application is facilitated.

FIG. 17 illustrates an embodiment of an environment in which linking back or returning to a data preparation application is facilitated. In this example, a data preparation application 1702 is shown. In one example embodiment, the data preparation application is implemented using the data preparation system described in conjunction with FIG. 2. In other embodiments, the data preparation application is implemented as a standalone application.

In this example, the data preparation application is implemented as a browser-based application (e.g., where front end 200 is implemented as a browser-based client application), where a user of the data preparation application can navigate, via a browser, to various locations and landing points in the locations, such as various parts of a project, various dashboards, etc. that are associated with different references (e.g., URLs).

In the example of FIG. 17, suppose that a user of data preparation application 1702 starts a project where a sequence of data preparation operations (e.g., data transformations) is performed on one or more input data sets. In one example embodiment, the data preparation application is written in Java (or any other computer programming language, as appropriate), and is deployed on a system such as a Spark cluster, Amazon S3, etc.

As a result of the data preparation operations, multiple answer sets may be generated. For example, in addition to a final answer set 1704 (e.g., the final result of applying all of the data preparation operations), intermediate answer sets may also be generated (as a result of a subset of the data preparation operations). In various embodiments, the generated answer sets are cached, as described above.

As described above, a data preparation application may be used in conjunction with a visualization application. In this example, the final answer set 1704 is exported or otherwise passed to visualization application 1706. Examples of visualization applications include Qlik and Tableau. The visualization application may be implemented as a standalone application and/or a browser-based client application executing on a client device In this example, final answer set 1704 includes table(s) or grid(s) of prepared data, where the grid of data includes various columns, rows, and cells. Visualization application 1706 is configured to generate visualizations using the data included in final answer set 1704. The visualizations may include charts or graphs generated using the data in the answer set. For example, a chart may use different columns of the data as dimensions for axes of the chart.

When viewing a visualization, the user of the visualization application may wish to further understand the underlying data supporting the visualization, such as where the data came from (e.g., the original file from which the data came from), how the data was arrived at (e.g., if the data is arrived at via a computation), etc. (i.e., what processing was performed by the data preparation application in generating the answer set).

In this example, visualization application 1706 supports dynamic uniform resource locators (URLs). The URLs include references (1708) or links which may be used to take a user from a particular visualization in app 1706 directly into a landing point in the data preparation application 1702 that provides context about the particular visualization. In various embodiments, the references are pre-configured at the data preparation application, manually composed at the visualization application, and/or automatically generated at the visualization application. Further details regarding generation of references will be described below.

The user may be taken to various types of contexts in a data preparation application. The contexts may include filtergrams or project steps that generated or modified the data that is being visualized. Other contexts include, in various embodiments, the lineage or the data quality of the data being visualized. Further details regarding data preparation contexts will be described in further detail below. In one example embodiment, by allowing users to open links from a visualization tool to land in a data preparation application, users can make modifications to data, re-publish the data, and refresh the visualization to reflect the updated data.

In this example, suppose that a business analyst (example of an operator-user of data preparation and visualization tools) is performing customer product segmentation and analysis. Suppose that account booking information for customers (such as businesses or other entities) between the years of 2014 and 2015 are imported into the data preparation application as part of a project opened by the user. The user configures the data preparation application to perform a sequence of data preparation operations. As described above, in some embodiments, the sequence of data preparation operations includes a stack of data preparation operations that are successively applied to a set of data. The data preparation operations may include data transformations used to prepare data for further analysis.

For example, standardization can be performed on city names in which customers are located. This can include the data preparation application suggesting misspellings and corrections to city names. As another example, for city names that may be represented in a number of ways, the data preparation application can suggest a canonical normalized or standardized form of the city name (e.g., Beverly Hills and Beverly HLS are standardized to Beverly HLS). Standardization of other data, such as account names, can also be performed, as each business or customer may be spelled in different ways. Another example of a data preparation operation that can be performed on the account booking information is clustering and editing, where, for example, data under the same business (potentially represented using different names in the original imported data) can be clustered or aggregated together based on standardized names. Other examples of data preparation operations include normalization of industry, computation of variance (e.g., by subtracting bookings between years), etc.

The data preparation application can be used to perform other processing as well. For example, the prepared data can be augmented or enriched. When a user wishes to view product segmentation, such as which customers bought what products and how much the customers spent on those products, lookups can be performed where different data sets can be automatically joined to produce summarized answers based on relevant information (e.g., additional information regarding each company being referenced).

In this example, the data that is prepared using the data preparation application is published into what is referred to herein as an "answer set." As one example, the answer set includes a grid or table(s) of data prepared using the data preparation process. Intermediate answer sets may also be generated. For example, as described above, results corresponding to different points in a sequence of data preparation operations can be cached. The answer sets can include tables with various rows and columns.

The answer set(s) containing prepared data can then be published or otherwise made available for further processing, such as being visualized in the visualization application tool (e.g., the answer set resulting from the data preparation application is published and exported to the visualization application tool for further processing).

Suppose, for example, that the user is using the visualization tool and is viewing information about the top ten customers in the bookings data. In this example, Acme Bank of California had the largest bookings in 2015, according to the bookings data that was prepared during the data preparation process (using the data preparation application).

The bookings data may be visualized in a variety of ways. One example visualization displays the top ten companies by variance between 2014 and 2015 bookings. Additional visualizations such as companies by industry and individual customer rankings may also be shown. In this example, the visualization tool is configured to generate or render visualizations of data in the answer set obtained from the data preparation application. Examples of visualizations include various types of charts (e.g., bar charts, pie charts, histograms, etc.). Via the visualization tool, a user can select what information is to be visualized, for example, selecting what dimensions are of interest for visualization. In some embodiments, the dimensions correspond to data columns in an answer set, which are translated into visualizations by the visualization tool.

As one example, if the prepared answer set included a geographic region dimension for the various customers, the user may specify a visualization of a bar chart of bookings by region. The visualization tool would determine the different region values included in the answer set and aggregate bookings data by region. The results of the aggregation of bookings by region would then be displayed in a bar chart, with each bar in the bar chart corresponding to bookings for a particular region.

In this example, suppose that the visualization tool supports the ability to embed links, such as custom links. Using the techniques described herein, the user can drill down into a visualization by using a link that will take the user from the visualization application to a context in the data preparation application that will illustrate why Acme Bank of California had the largest bookings of 2015, or why the variance was a certain amount for a particular customer between 2014 and 2015.

Thus, when the user clicks on the link, the user is taken back to a relevant context in the data preparation application. In some embodiments, users are required to have permission to open any URL that directs into a project in a data preparation application.

Source-Related Query Types

In some embodiments, the references are based on different types of queries corresponding to different data preparation contexts that a user is interested in. These queries are referred to herein as "source-related queries," as they are user queries related to the data that is the underlying source of a visualization (and the user is requesting to return to the source of the data, which was prepared using the data preparation application). As described above, in various embodiments, data preparation contexts in which a user may request to be landed within include filtergrams, project steps, data lineage, and data quality.

Filtergram

One example of a relevant data preparation context to which the user can be linked back to is a filtergram that is related to what was being visualized to the user in the visualization tool. In some embodiments, a filtergram is a rich histogram based on filtered data. In this example, the filtering is based on the data used to support the visualization that the user is viewing in the visualization tool.

Figure 18:
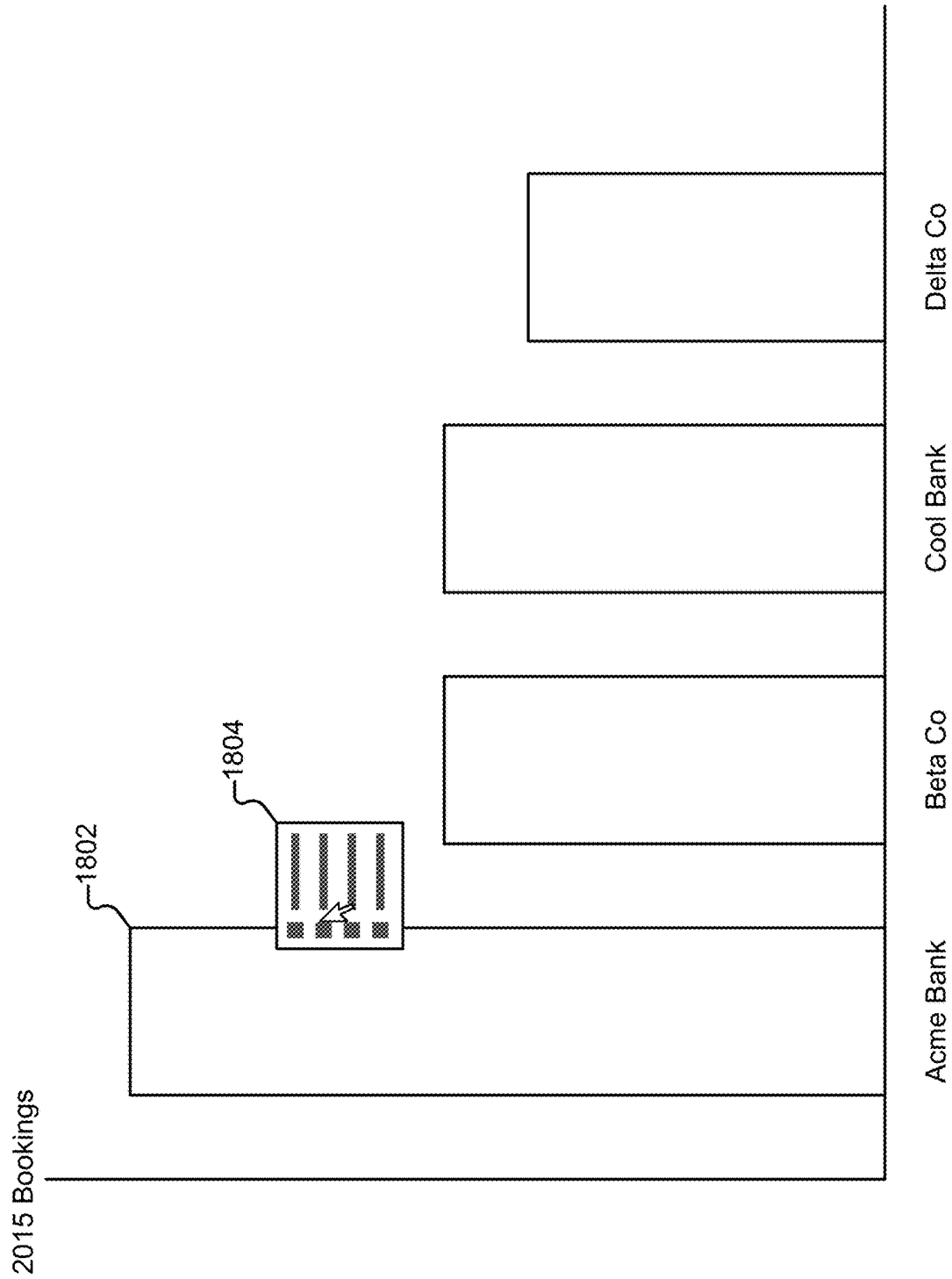
FIG. 18 illustrates an example embodiment of a bar chart.

FIG. 18 illustrates an example embodiment of a bar chart. In some embodiments, the bar chart of FIG. 18 is generated by visualization application 1706 using data prepared by data preparation application 1702. In this example, a user is viewing a bar chart that shows the 2015 bookings for the top four customers (e.g., where the X-axis is companies, and the y-axis of the chart is sales). Each bar of the histogram corresponds to a particular company. In this example, the user would like to further understand how Acme Bank of California came to have the highest bookings in 2015. In this example, suppose that the visualization tool supports the embedding of links in a visualization. The link may be embedded or added to a bar in the bar chart.

In this example, via the visualization tool, the user selects a link associated with the Acme Bank of California's bar in the bookings bar chart. For example, the user can right click on the particular bar corresponding to Acme Bank (1802). Right clicking on the bar causes a menu 1804 to be opened, where the user is presented various options, including a label or name for a preconfigured link that corresponds to a request for a filtergram to be opened that has data specifically relevant to Acme Bank's 2015 bookings (i.e., a histogram generated using data that is filtered to only include the data that is relevant to Acme Bank's 2015 bookings).

In some embodiments, the reference or link for the filtergram includes a particular set of parameters. One example of a parameter specifies a type of request or reference (e.g., filtergram-type request). Another parameter or field of the link specifies a project name. Another parameter specifies the column(s) (i.e., dimensions) on which a filtergram is opened, as well as the value on which the column is filtered (i.e., particular dimension value). In some embodiments, filtering can be performed on multiple dimensions (e.g., multiple filter columns may be specified in a filtergram reference). In some embodiments, range-based filters may be specified (e.g., filter a column not only a single value, but a range of values or multiple values).

In this example, the link will navigate the user to the appropriate project and open a filtergram on the column "company" filtered to the value "Acme Bank." In some embodiments, the link is deciphered by deciphering engine 1710 of the data preparation application. The deciphering engine is configured to interpret the reference, for example, by parsing the reference, and obtaining the parameters and fields included in the reference. In some embodiments, a regular expression is used to parse the reference. Further details regarding deciphering of references will be described below.

In this example, based on the parameter extraction, the data preparation application then causes the 2015 bookings data (e.g., y-axis visualized data) corresponding to Acme Bank to be presented (e.g., subset of the answer sets generated and/or cached by data preparation application 1702 when preparing data). Thus, the bookings data is filtered according to parameter values or criteria specified in the filtergram URL. In this example, the filter value is a particular company name "Acme Bank." Multiple filter criteria corresponding to multiple filter columns can be specified.

Thus, by using the link, the user is navigated from a particular visualization in a visualization tool to a data preparation context that allows the user to further investigate the data used to support the visualization that they were viewing (i.e., view only the bookings data used to generate Acme Bank's bar in the bar chart of FIG. 18). Thus, using a filtergram link, an entire data set is filtered or narrowed down to the set of data relevant to a particular visualization.

Filtergrams relating to other sets of data can be generated. Another example of a filtergram is a numeric histogram of the 2015 bookings data for Acme Bank. In this filtergram, the user can view the relative distribution of bookings, the min/max of bookings values, etc. for the selected customer, Acme Bank. In this example, the user is then presented with information indicating how the data was arrived at in the visualization tool. For example, the individual bookings data points for Acme Bank can be displayed (e.g., a distribution of bookings). The user can then view, for example, the peak booking for Acme Bank.

As another example, a filtergram of the data relating to variance for Acme Bank can also be automatically presented using an embedded link that indicates that a filtergram is being requested for variance data for Acme Bank. For example, the filtergram shows the distribution of the variance for the customer.

A filtergram can be configured to present various types of distributions, such as number of blank values, the number of unique values, the number of records associated with a customer, min/max values, a number of times that a value occurred in an entire data set, the distribution of blanks versus filled-in values, etc. When specifying a filtergram, a selection of some type of data (e.g., by field name) may be specified, where data is filtered according to the selection, as described above.

Using the techniques described above, a filtergram for large data sets (e.g., on the order of billions of rows) can be automatically and dynamically generated efficiently (e.g., using the data preparation filtering techniques described above). This is in contrast to existing data preparation techniques, which may provide a view of only a small sample of rows and not the entire data set. Thus, for example, outliers or anomalies in an entire data set can be presented in a filtergram, which might potentially be missed if only a sample of data were evaluated.

Thus, in the example described above, a data specific link was embedded in a bar of a bar chart displayed by a visualization tool. The reference is a link directly into the relevant subset of data in the original data set that led towards that visualization. For example, the subset of data is the bookings data for all firms or companies that match the name "Acme Bank."

Further details regarding configuring a link to a project filtergram will be described below.

Project Step

In the example above, a link to a filtergram was embedded in the visualization tool and used by the user to land in a context relevant to a visualization with which they were interacting with in the visualization tool.

Another example of a type of context that a user can be linked back to is a particular step in the data preparation process. For example, suppose that the data preparation process included clustering and standardizing account names. Now suppose that the user is viewing, in the visualization, the distribution of accounts (businesses) in different industries. A link may be created or embedded that will link or navigate the user back to a particular step in the data preparation process that standardized the industry names or industry distribution for different customers (i.e., project step that generated or modified the data being visualized).

As another example, suppose that computation of variance between 2015 and 2014 bookings by customer was performed as a step in the data preparation process. While the visualization tool may display what the computed variances are, the user may wish to further explore how those variances were arrived at. A link can be generated from the visualization tool directly into the particular step in the data preparation process that was used to compute the variance. This allows, for example, a user to identify how exactly a visualized variance was computed, by directing them to the particular step in the data preparation process that generated the particular variance value. For example, the user can then view the data that was used in performing the variance computation step.

In one example embodiment, the reference to link to a project step includes parameters for specifying a project name and a column name. In some embodiments, when clicking on the link, the user will be navigated from the visualization tool to the last step (as presented in a step editor) that edits or modifies the specified column.

In some embodiments, a type of project step is specified in a project step-type link. By doing so, the link will navigate to the last step of the specified type that affected or modified a column of interest in a particular project (versus the last step of any type that generated or modified the column). Additional details regarding configuration of references to project steps will be described below.

In some embodiments, linking to a particular step includes linking to a particular step in a step editor such as that described above. As described above, users can use a step editor in a data preparation application to view or expose the sequence of operations, make changes to the sequence of operations, etc. In some embodiments, for each step in a sequence of data preparation operations, the data preparation application is configured to automatically generate an anchor or linkable point to a given step in the data preparation process. The reference or URL used to link back to an anchor point may specify or refer to the anchor or linkable point, allowing the user to enter or land at the relevant step. In some embodiments, the step that the user is landed in is the last step that applied or contributed a change to the columns or dimensions relevant to a particular visualization (not all steps that were performed as part of a data preparation process may apply to a column). The data preparation application can land the user in other steps that applied to the columns or dimensions of interest.

The use of techniques such as cached results, as described above, provides improvements over existing data preparation techniques, where it may not be possible to inject or land a user within a step in the middle of the data preparation process.

Data Lineage

As described above, the columns of an answer set published by the data preparation application can be used as dimensions that translate into visualizations in a visualization tool. When a user using the visualization tool is interested in further exploring how a visualization is arrived at, links back to the data preparation application can be used to land a user in a relevant context. The link can include a specification of the dimensions (and values for those dimensions) that were visualized for which the data lineage is requested.

In some embodiments, the reference can be used to cause the data preparation application to highlight or identify the data preparation operations (in a sequence of data preparation operations) that affected or contributed to a particular column (or dimension name) in an answer set. Not all data preparation operations may apply to a column of data (e.g., out of 400 total steps, only 300 might have affected a particular column). This allows a user to view the lineage of the data that was being visualized in the visualization tool.

For example, suppose that the user is interested in how the data for a particular account name was arrived at. A link can be specified or configured that indicates a request for the data lineage for a particular account name value. The data preparation application, in response to activation of the link by the user, will determine that the dimension of interest is account name, which maps to a column in the answer set generated as part of a data preparation project. Using, for example, the reference stack, described above, the data preparation operations that affected the account name column can be identified (where the reference stack records the steps that were performed and the columns that were affected by each step). For example, the data preparation application can determine that a particular account name came from a particular set of account bookings data that was imported and operated on. The data preparation application determines that standardization was performed, as well as removal of blank rows. Thus, the user can view the steps that ultimately resulted in the account names that are presented in a visualization tool (e.g., the data preparation steps that contributed to the final values of a column that were visualized). In some embodiments, the data lineage is indicated by highlighting, in a step editor, the steps that generated, modified, or otherwise affected the data or column of interest.

As another example, suppose that the user, in the visualization tool, is viewing a chart of bookings by region. Using a data lineage query, the data preparation application can present to the viewer the lineage of the region data. Examples are the source of the region mapping or data (e.g., file that was imported that includes the region data), as well as other steps that were performed that contributed to the final region mapping data, such as standardizations and cluster operations. In some embodiments, the data preparation steps that contributed to particular dimension(s) or column(s) of interest are highlighted, for example, in a step editor such as that described above. Different dimensions or columns may have different data preparation lineages.

By viewing the lineage of data that is visualized, the user can better understand how the visualizations they are viewing were arrived at. As another example, suppose that the user is viewing a bar graph of bookings by banks. The user expects there to be fifty bars corresponding to 50 customers. However, the visualization shows one hundred and fifty bars. Using the link-back queries described herein, the user can view the lineage of the account information to determine why the answer set published by the data preparation application included more customers than expected. For example, by viewing the lineage, the user can determine that the reason for the excess in customers is due to the existence of different variants of an account or customer name. The user can then determine that a clustering step or a find and replace was not performed, and they should add a clustering or find and replace step to cluster the various variant names. As described above, using the techniques described herein, the user can quickly and efficiently insert or add (e.g., via a step editor) steps into any point in a sequence of data preparation operations and then re-run the new sequence of operations.

The data lineage tracing techniques can be used for other tools as well, such as governance tools, which are used to keep track of where data comes from and goes. The data lineage techniques described herein allow for efficient tracking of the lineage of data, and can be adapted to integrate, for example, within an enterprise governance framework.

As one example, suppose that a company files a 10-Q quarterly report. A user may wish to determine where the data for the 10-Q came from. Using the techniques described herein, a URL may be embedded that lands the user into the project that created the output for the 10-Q report. The data preparation operations and steps that contributed to that data can also be highlighted, for example, in a step editor, such as that described above.

Data Quality

Another example of a relevant data preparation context into which the user can be landed, using the techniques described herein, is a relevant data quality context. For example, when a user uses a visualization tool, they may wish to explore the quality of the underlying data supporting what is being visualized. In some embodiments, a reference is generated that allows the user to link back to a data quality rule(s) that applies to the data (e.g., dimensions and/or values) being visualized.

As one example, suppose that the user is viewing a bar chart where the X-axis is the dimension of customer name and the Y-axis is the dimension of account bookings. Suppose that the user wishes to view the data quality for the customer data used to generate the visualization. A link may be embedded in the visualization tool, and made available in the visualization being viewed, that allows the user to link back to the data quality rule(s) that are applicable to the data supporting the visualization (e.g., the data quality rules that apply to the dimension(s) for which a visualization is displayed). This allows the user, for example, to determine whether they can trust the visualization that they are viewing, or if the visualization is flawed due to poor quality data.

The following are examples of data quality rules that can be used for determining the quality of data that is being processed by the data preparation application.

As one example, the user can define a rule with respect to variance such that customers whose variance between 2014 and 2015 bookings exceeds a threshold, those customers are flagged as high risk customers.

Another example of a rule is a data quality rule related to a stock ticker and stock information. For example, a rule can be specified such that whenever a difference (e.g., percentage difference) between a fund manager's price and stock ticker price exceeds a threshold, those prices are flagged. An example of such a rule is as follows: pctDifference(@fund mgr price@, @ticker price@)>threshold.

In various embodiments, the data quality rules are used to determine the quality of a data set with respect to accuracy, completeness, integrity, etc. Generic data quality rules (e.g., that apply to all types of data) can be specified. Data quality rules specific to certain segments (e.g., industries) can also be specified.

One example of a data quality rule related to completeness is as follows. Suppose for example, that every Fortune 500 company is expected to have at least ten employees. If that is not the case, then there may be a problem with the data set. A data quality rule can be used to flag any companies that do not have at least ten employees.

As another example, suppose that all persons in a data set are expected to have a corresponding social security number (SSN) in the data set. If the SSN for a person is blank, then the data is not complete. A data quality rule may be pre-configured on the data set to identify such gaps.

Typically, a visualization tool does not perform an analysis of data quality of the data it is visualizing. For example, suppose that a user is again viewing, in the visualization tool, a bar chart of customers (e.g., banks) versus bookings. Suppose that there should be data for 50 customers, but only 25 customers are shown. The booking data is therefore somehow incomplete. A link can be specified between the visualization and a data quality completeness rule that will land the user in the data preparation application and present the completeness of the bookings data. For example, the link can specify the query request type (e.g., query that requests a data quality context), the project name (that produced the answer set from which data is being visualized), a dimension and/or value of interest, etc.

In response to clicking on the link, the user is landed in the data preparation application, which is configured to parse the link that was clicked on. Based on the parameters of the link, the data preparation application is configured to calculate the completeness of the bookings data, and provide the results of the completeness analysis (e.g., in a data quality dashboard) according to the data quality rule. For example, the user may be presented with a dashboard or any appropriate visual indication that indicates that 50 percent of the bookings data was blank (e.g., because a file with bookings data was not uploaded).

Now that the user is able to view the completeness of the data being visualized, the user can determine that the visualization may be flawed due to the incompleteness of the data. For example, while Acme Bank may be shown in the visualization as having the highest bookings for 2015, this may be inaccurate once the other half of the bookings data is added.

In some embodiments, upon clicking a data quality rule link, the user is landed in a data quality dashboard or report or summary view in the data preparation application that includes various types of information about the quality of the dimension(s) of interest (e.g., those viewed in a visualization from which a link back to the data preparation application is being performed). As described above, the quality information can be based on data quality rules with respect to data integrity, completeness, accuracy, etc. Individual quality scores corresponding to the different quality rules can be presented. In some embodiments, an overall, composite, quality score or measure or metric of the dimension(s) of interest can be provided based on the assessment of the dimension or values with respect to various data quality rules. In some embodiments, users of the data preparation application can configure which types of data quality rules are applicable to particular portions of data. For example, a user can specify that completeness for bookings data should be flagged according to a data quality completeness rule, but that customers' zip code need not be subject to data quality completeness rules.

By landing a user from a visualization into a relevant data quality context, the user is provided with insights into the quality of the data supporting the visualization. The user can then address or fix any quality problems (e.g., by adding additional steps to a project). The resulting answer set can then be published to the visualization tool and the visualization can be recreated using the fixed data. Improved data driven insights can then be gained.

In some embodiments, the data quality rules are created by a user such as a data steward. In some embodiments, configuring a data quality rule includes specifying whether the data quality rule is related to integrity, completeness, accuracy, etc. For example, a data quality rule can be associated with a tag or identifier of integrity, completeness, or accuracy. In some embodiments, the data quality dimensions are quantified as metrics. Other examples of data quality rules include recency or up-to-dateness of data (e.g., based on the age of the data). Information about the quality of a piece of data may be displayed in a data quality dashboard or report.

In some embodiments, data quality rules with respect to custom or semantic data types are supported. For example, values in a data set may be of types such as numbers or strings. Users of the data preparation application can also define their own, custom semantic data types. For example, rather than assigning account names or customer names as string types, a user can assign such names custom data types. As one example, a user associated with a particular business can define a customer name type as a name that contains only spaces and underscores and percentages that must be a maximum of some number of characters (i.e., a customer name is of its own type, rather than, for example, as a string type).

Each defined custom or semantic data type can be associated with corresponding data quality rules. For example, customer names can be associated with quality rules that are different from the quality rules associated with account names, as customer names and account names may be defined semantically differently.

As another example, a zip code type can be defined as having a certain format (e.g., five digits followed by four digits with a hyphen in between). Data quality rules specific to how zip codes are to be formatted can be created. For example, based on the defined format for the zip code type, a data quality rule can be used to determine whether zip code values are valid or invalid (e.g., whether the zip code values conform to the format specified for the data type).

In some embodiments, custom or semantic data types are also associated with data quality rules relating to integrity, completeness, and/or accuracy. As one example, an integrity rule for zip codes may be configured to fire if the zip code for an address does not match the city and/or state in the address.

In some embodiments, multiple rules may be stacked for a given item. In some embodiments, references usable to land in quality rules corresponding to custom data types are configurable and decipherable.

Data quality rules may be applicable to various levels of granularity of an answer set. For example, data quality rules may apply at a cell level, row level, column level, table level, etc.

Combined Queries

A combined reference query may be generated. For example, a reference may be configured that will link or navigate back to a filtergram on data as of a certain step in a sequence of data preparation operations. For example, as described above, a sequence or stacked set of data preparation operations or transformations may be applied to imported data. Intermediate answer sets as of a particular point in the sequence of operations may be cached. In some embodiments, a reference is configured such that it returns a user to a particular point or step in the sequence of operations. The cached result associated with that particular point is retrieved or otherwise obtained. A filtergram may then be applied to further narrow the view into a context applicable to the user. Thus, combinations of query types (in this example, particular project step and further filtergram) may be configured in a reference to provide the user with relevant information in the data preparation application. For example, in the above examples, the user may wish to view information associated with Acme Bank as of a "cluster and edit operation" performed on a column in the data preparation process. The combined query allows the user to land at the last cluster and edit operation in the sequence of data preparation operations that affected the column. The intermediate answer set (e.g., cached result) as of that cluster and edit operation is obtained. The intermediate answer set is filtered based on the company name value of Acme Bank such that only data associated with the customer Acme Bank is presented to the user.

The user may then iterate by changing the data preparation process to see how the visualizations may change. For example, as described above, the user can use the step editor to change the ordering of operations. As one example, suppose that in a first run of the data preparation operations, a lookup of customer data was performed after standardization of customer names. The ordering of those two operations can be flipped to see if there is an impact on the answer set that is generated (and seeing how the visualization of the data is updated).

Configuring a Link

The references described above may be generated or configured in a variety of ways.

In one embodiment, the references are generated manually at the visualization tool. For example, a user can manually compose a reference in the visualization tool. Further details regarding composition of references will be described below.

In another embodiment, the references are generated automatically by the visualization tool. In some embodiments, the references are generated based on templates that are preconfigured in the data preparation application and provided to the visualization application, which are filled in with values derived from the visualization, which will be described in further detail below.

In some embodiments, the references are generated or configured at the data preparation tool. As one example, references are pre-configured and are included as part of project metadata. For example, as described above, the result of a project is an answer set, which is passed to a visualization tool. References may be passed along with the answer set as metadata associated with the answer set. As one example, common reference formats may be pre-configured.

In some embodiments, reference templates are generated at the data preparation tool. In some embodiments, the template for the reference includes the structure of a particular type of URL, and includes parameters or variables that are to be filled in. The values may be filled in at the visualization tool to generate a final reference or link, for example, using data derived from a visualization.

The references may apply to various levels of granularity of the answer set. For example, as described above, an answer set may include tables of data. Metadata references may apply to columns, rows, cells, tables, the overall answer set, etc. of the answer sets.

FIG. 19 is an example embodiment of a portion of an answer set including reference metadata. In this example embodiment, a user of the data preparation application is viewing the grid of data of FIG. 19. In this example, the answer set includes sales and variance data for various companies, as shown at 1902. In this example, included in the answer set/grid are column(s) (1904) used to include references as metadata. In some embodiments, the user selects (e.g., clicks) on a column of the grid (e.g., company name column) and selects an option to generate a metadata column including URLs. When requesting to generate the column of URLs, the user may then specify the type of URL that they would like to generate (e.g., filtergram, lineage, project step, and/or data quality).

In some embodiments, a metadata column of reference is then generated from the grid based on the selected column (e.g., company name). For example, suppose that a column of project step URLs is to be generated based on the column "company name." In this example, all of the project step URLs may be the same or common (e.g., same server host, same project name, same project step (obtained, for example, based on a step editor or reference stack)), as the last step that generated or modified the "company name" is the same for the column, regardless of the company name values.

As another example, suppose that a metadata column of filtergram URLs is to be generated on the column "company name." In this example, all of the filtergram URLs in the column may be pre-filled to have the parameters filter column "company name" and filter value equal to a corresponding company name value (e.g., a URL in a given row will have the corresponding company name value in the same given row). In other embodiments, the URLs in the metadata column include template format URLs, where parameter values are not filled in.

Generated URLs may include parameter values corresponding to multiple columns. A single data column may be associated with multiple URLs (e.g., the company name column may have corresponding data lineage, project step, filtergram, and data quality URLs). Compound URLs (e.g., URLs that include combinations of two or more types of data preparation contexts) can also be generated that refer to one or more columns.

In some embodiments, the user manually enters the URLs to be configured. In other embodiments, the data preparation application automatically generates references based on the data in the answer grid.

In this example, metadata references can be preconfigured in the data preparation application. This provides additional convenience, as users of the visualization tool need not manually compose the URLs. For example, commonly viewed URLs can be pre-generated in the data preparation application so that users need not manually compose them.

In this example, metadata is generated for a particular selected column. Metadata references can also be generated for other levels of granularity of an answer set(s), such as at the cell level, row level, grid level, etc.

In this example, the user views the answer grid using a project interface (e.g., the user has opened up a corresponding project and elected to view the answer set of FIG. 19). In other embodiments, the grid of data can be viewed via a project summary, data set summary, or library screen, which may also lead, for example, to data quality reports or other landing points within the data preparation application.

In this example, the metadata URLs were directly included or appended to an answer set. In other embodiments, the metadata references are included in a separate table. In some embodiments, the metadata is included in a file such as an XML, JSON, or text file.

Embedding URLs

As described above, in some embodiments, a tool such as a visualization application supports the embedding of dynamic URLs.

As described above, a user can manually type in a URL in the visualization application. As one example, the user can create a two-dimensional plot with X and Y-axes, and then manually compose URLs for the plot (e.g., for the dimensions of the graph). The manually composed URLs are then embedded in the plot.

In other embodiments, the URLs that are embedded in a visualization tool include pre-configured/pre-created URLs, such as those passed along or published with an answer set, from a data preparation application. As one example, suppose that a user of the visualization tool (who may be the same or different from the user performing the data preparation process) creates a two dimensional bar chart that has the company name dimension as the X-axis entry. Each bar in the chart corresponds to a particular company name.

If each company name is associated with a corresponding filtergram URL (e.g., previously configured in the metadata published with the answer set, either included in the answer set, as a separate metadata file or grid, etc.), the visualization tool, in some embodiments, automatically embeds each bar with a corresponding URL obtained from the metadata published with the answer set. Thus, each bar will be associated with a filtergram URL that has the appropriate company name value. As one example, the column of filtergram URLs is indicated as metadata for a corresponding data column in an answer set. Based on the indicated metadata association, the visualization application knows that the URL is metadata for the data column, and should thus be presented as a selectable option.

As another example, suppose that a user who is preparing a dashboard in the visualization tool selects two columns in the answer set to create a chart. The references associated with the selected two columns are automatically obtained from the metadata and automatically embedded in the visualization tool. For example, as the column of URLs has been classified as metadata, the visualization tool determines that the column includes metadata that corresponds to the "company name" column.

In some embodiments, if a template URL is included as metadata, with parameter values to be filled, the template URL is obtained and the appropriate dimensions or values are used to construct or create (at the visualization tool) a final URL based on what is being visualized. For example, the filtergram URL template may be pre-configured to include that the filter dimension is to be "company name" (i.e., that data will be filtered on company name), with a placeholder variable for filling a particular "company name" value. When the user elects to view a filtergram filtered on "Acme Bank" data, in some embodiments, the company name value is derived from the bar in the bar chart selected by the user (which corresponds to a specific company name). The value is then plugged into the template URL. The value will be used to filter data by the data preparation application. Thus, in some embodiments, values to be used to fill in parameter variables in a template URL can be derived, captured, or otherwise obtained from the visualization (e.g., a company name value can be obtained from a particular bar that the user has selected to further explore, and plugged in as the value for a filtergram URL that specifies a filter column of "company name," which was used as the X-axis dimension in the visualized bar graph).

In some embodiments, the URL is embedded in a context menu associated with a bar. When a user, for example, right-clicks on the bar, a menu of options is shown. One of the options is the filtergram URL to link back to the data preparation application to view a filtergram of data corresponding to the company name of the bar that was selected.

The URLs, whether manually composed at the visualization tool or preconfigured at the data preparation tool, are then accessible via the visualization tool. For example, users of the visualization tool can select URLs to further explore the source of the data supporting the visualizations.

Deciphering URLs

When the user clicks on the link, they are directed or navigated to the data preparation application (e.g., in a browser window, using the specified hostname or server in the URL on which a specified project is running). The data preparation application is configured to decipher (e.g., via deciphering engine 1710) the link that was clicked and provides the appropriate data preparation context.

In some embodiments, deciphering the link includes parsing the link and extracting various parameter values from the link. For example, in the case of a filtergram reference, the extracted parameter values include the query or reference type (e.g., filtergram type reference), project name, column selection (e.g., "company name" column), and/or the value of the company name (e.g., "Acme Bank"). The data preparation application then uses the extracted information to generate a filtergram by applying the Acme Bank value as a filter to a data set (e.g., bookings data).

For example, in some embodiments, the data preparation application evaluates the type (also referred to as an "entry point") specified for the URL, such as lineage, filtergram, step, and/or data quality. In some embodiments, a regular expression is used to determine the type of the URL, for example, based on the structure of the link (e.g., based on what pattern of URL-type the obtained reference matches to).

For a specified entry point, the data preparation application also determines the dimensions (e.g., column names) and/or additional values specified for the type of context to be viewed.

Multiple entry points or types may be specified in a single reference. For example, a reference can include a request to show the lineage of a filtered set of data.

The user can then view information about the data preparation context relevant to what was being visualized in the visualization tool. For example, if the reference is of type "lineage" and includes the column name "variance," then the data preparation application is configured to present a highlighted lineage of the variance column (e.g., in a step editor).

While the user is in the data preparation application, they may use the application to perform various changes to a project, such as changing steps, adding steps, etc. The user can then re-publish the answer set for the data preparation project and view the changes in the visualization tool (e.g., viewing new charts if new data was added, refreshing charts, etc.).

In some embodiments, after changes are made in the data preparation application, versioning is performed by the data preparation application, where the results of the changes are cached. In some embodiments, each answer set that results from a set of data preparation operations in a project is tagged with a different version number. Users can then undo changes to revert back to previous versions of an answer set.

Figure 20:
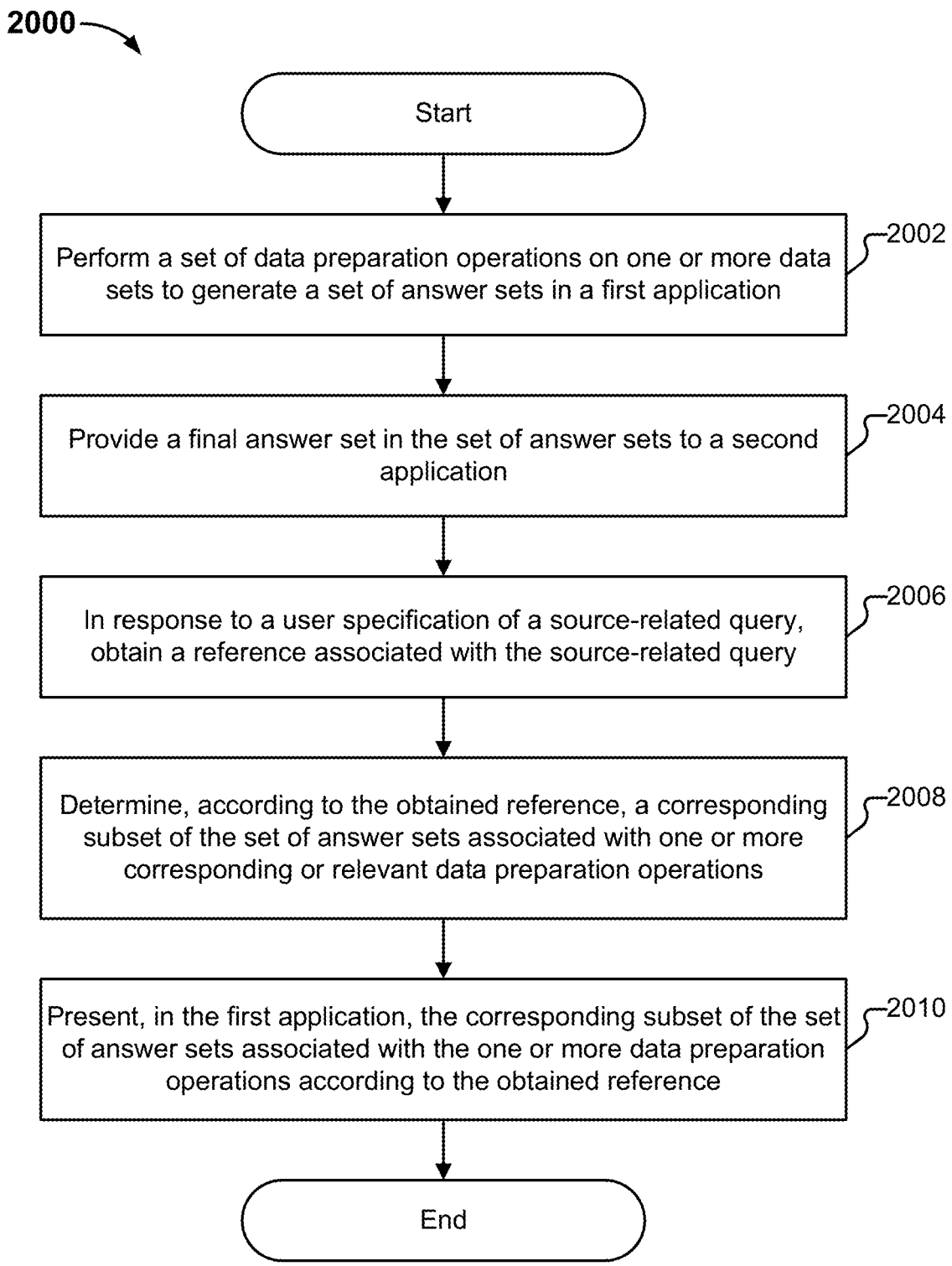
FIG. 20 illustrates an example embodiment of a process for navigating to a data preparation context.

FIG. 20 illustrates an example embodiment of a process for navigating to a data preparation context. In some embodiments, process 2000 is executed by data preparation application 1702 of FIG. 17. The process begins at 2002 when a set of data preparation operations is performed on one or more data sets to generate one or more answer sets in a first application (e.g., data preparation application 1702).

In some embodiments, the data preparation operations performed at 2002 are performed using processes 1300 and 1400 of FIGS. 13 and 14.

In various embodiments, answer sets outputted by a project executed in the data preparation application include a final answer set (the final results of a sequence of data preparation operations) as well as intermediate answer sets (e.g., results as of an intermediate step of the sequence of data preparation operations). In some embodiments, the answer sets, including intermediate answer sets, are cached. In some embodiments, the answer sets include grids or tables of data that have been prepared using the sequence of data preparation operations.

In some embodiments, the answer sets are associated with metadata. A portion of the metadata may include a reference (e.g., URL) that refers to a subset of an answer set or a set of answer sets. In other embodiments, the references are composed at another application (e.g., to which an answer set may be published or exported for further processing, such as a visualization application). The metadata may also be applicable to various levels of granularity in the answer sets outputted by the data preparation application. For example, the metadata may apply to a specific cell in a table of an answer set, a row of an answer set, a column in an answer set, an answer set (either intermediate or final), a set of answer sets, etc.

In some embodiments, the metadata is included as part of an answer set (e.g., in an additional column appended to the answer set). In other embodiments, the metadata is included in a separate metadata file (e.g., XML or JSON format file). The metadata may also be included in a separate table of metadata.

In some embodiments, the metadata is generated manually at the first application (e.g., data preparation application). For example, when viewing an answer set, a user can select a data column of interest to generate references (e.g., URLs) for the selected column that will refer back to data in the column. Various types of URLs can be generated, such as filtergram, lineage, step, and data quality URLs. In various embodiments, the metadata is generated from a project interface, a project summary screen, or any other appropriate interface. In other embodiments, the URLs are generated automatically. As one example, a user may specify a type of URL to be generated for a set of columns (which may include multiple data columns). The template for a URL may specify various types of parameters and variables. The values for the parameters and variables may be automatically filled using data values from an associated column.

At 2004, a final answer set in the set of answer sets is provided to a second application. Examples of second applications include a visualization application (e.g., visualization application 1706) and governance applications. In some embodiments, the final answer set produced or outputted by the data preparation application is published or exported by the data preparation application to the second application, where the final answer set is further processed and/or presented.

At 2006, in response to a user specification of a source-related query, a reference associated with the source-related query is obtained. In some embodiments, the source related query is a query, made from within the second application, that pertains to the source of the data used by the second application (i.e., the first application that produced and published the data used by the second application). In some embodiments, the user specification includes an indication of a user request to navigate or return to a context associated with a source of the data being presented in the second application. One example of a user specification is a user interaction with a menu item and selection of an option or link to navigate to the first application. The user specification invokes the reference, where, in response to the invocation of the reference, the first application is activated. For example, in response to the invocation of the reference, navigation from the second application to a relevant data preparation context in the first application is performed (e.g., a browser is directed from a visualization application to a relevant data preparation context in a data preparation application according to the reference). A relevant data preparation context in the first application is then presented.

For example, the source-related query may include a query by the user to further explore, in a data preparation application, the data that supported a visualization being presented in a visualization tool. In some embodiments, the queries are associated with references (e.g., URLs that when clicked on and deciphered, will land the user at an entry point in the first application and cause to be presented a context that satisfies the query). In various embodiments, relevant data preparation contexts include filtergrams, project steps that generated or modified data being visualized, data quality, and data lineage.

In some embodiments, a filtergram provides a rich histogram of a filtered subset of data. A project step context may indicate the last project step which generated or modified a dimension of a column of interest in the final answer set. In some embodiments, a data quality context presents information regarding the quality of data of interest. In some embodiments, a data lineage context highlights (e.g., in a step editor of the data preparation application) the steps that contributed to the data of interest. Further details regarding data preparation contexts are described above.

Different types of references for different types of contexts may have respective URL specifications or configurations. In some embodiments, a single reference may include multiple query types (e.g., show the quality for a filtered subset of data, or the data as of a certain step). In some embodiments, the references include a host name or server name of the server hosting the first application. In some embodiments, the references include a name of the project associated with the data pertaining to the source related query (e.g., the name of the project that produced the final answer set published to the second application).

In some embodiments, the references associated with the source-related queries are embedded in the second application. The references may be obtained from metadata published with the first answer set from the first application. In other embodiments, the references are manually or automatically composed at the second application.

In some embodiments, the reference, when invoked (e.g., clicked on) at the second application, causes navigation from the second application to the first application. For example, the reference, when invoked, leads to a return to a data preparation context relevant to data being presented or processed by the second application (e.g., a visualization being displayed in a visualization tool). In some embodiments, the first and second applications are browser-based applications provided by web-based front ends, and accessible, for example, via a browser. As one example, the reference is implemented as a URL that when invoked, causes the browser to be directed from the second application to a relevant data preparation context in the first application. The first and second applications may also be implemented as standalone applications (or a combination of standalone and browser-based applications). When a user selects a link in the second application, they are directed to a particular portion or entry point of the first application. In some embodiments, the references include a host name or server name of the server hosting the first application.

At 2008, a corresponding subset of the set of answer sets associated with one or more corresponding or relevant data preparation operations is determined according to the obtained reference. At 2010, the corresponding subset of the set of answer sets associated with the one or more data preparation operations is presented according to the obtained reference.

For example, in some embodiments, the obtained reference (that was clicked from the second application) is deciphered.

In some embodiments, deciphering a reference includes parsing the references (e.g., regular expressions), and extracting parameter values from the reference. In some embodiments, the obtained references are deciphered using regular expressions associated with the various types of references that may be configured. In some embodiments, the extracted parameter values include a project name. Parameter values relating to various types of references such as filtergram, data quality, project step, and data lineage may also be extracted from the obtained reference associated with the source-related query.

In some embodiments, based on, or according to, the parameters and corresponding values extracted from the obtained reference, the corresponding subset of the one or more answer sets is determined. For example, based on the type of reference, various processing is performed to determine where the user clicking on the reference should be landed in the first application, and what data should be presented. In some embodiments, cached results (e.g., associated with final and/or intermediate answer sets) are obtained based on the configuration or specification of the obtained reference.

For example, if a filtergram URL is obtained, the appropriate data set (e.g., data that was being visualized) is filtered using criteria (e.g., dimension) specified in the filtergram URL (e.g., data is filtered using specified value of a specified filter column). The filter values may include specific values or a range of values. The user is then presented with a rich histogram of the filtered data.

In some embodiments, if a project step reference is obtained, the data preparation application is configured to present a step editor, which presents information associated with the last step (e.g., last step of any type or last step of a particular type specified in the reference) which generated or modified data of interest.

In some embodiments, if a data lineage type reference is obtained, the data preparation application is configured to present a step editor that highlights the steps in a sequence of operations that contributed (e.g., generated or modified) data (e.g., some dimension or column) of interest. In some embodiments, cached results (described above) associated with the project step are obtained and may be presented via the step editor.

For example, if the data lineage of a column of variance values is requested (specified in the reference), then all points in the data preparation process that contributed to the final state of the variance values in an answer set are shown. As one example, the variance values may have been arrived at by importing bookings data from a particular file, computing variance in a particular way, standardizing the variance values, etc. Each step (data preparation operation) in the lineage of the variance values is presented by the data preparation application.

In some embodiments, reference stacks, as described above, are used to generate an appropriate response to the reference (e.g., URL) obtained at 2006. For example, the reference stacks may be used to determine the steps that contributed to a column of data specified in a data lineage request. The identified steps may be highlighted in a step editor. Cached results associated with the identified steps may be obtained and presented. The reference stacks may also be used to determine the last project step that generated or modified a column of data.

In some embodiments, if a data quality type reference is obtained, the data preparation application is configured to cause a data preparation application to present a data quality context. For example, for some data being visualized in a visualization tool, a link can be generated that returns back to the data preparation application and displays information pertaining to the quality of the data that was visualized in the visualization tool. This allows a user to determine a trustworthiness of a visualization based on the quality of the underlying data used to generate the visualization. In various embodiments, data quality rules include rules related to dimensions such as integrity, accuracy, and completeness.

In some embodiments, data quality rules are determined with respect to different levels. For example, when landing a user in a data quality report, individual rules can be selected for the report. Categories of data quality rules can also be selected.

As described above, in some embodiments, an obtained reference may be configured such that it includes a combination of data preparation context types. For example, a reference may be configured such that the data preparation application causes a filtergram for a column to be shown, as well as the data lineage for that column. Other combinations of various numbers of data preparation contexts or entry points can be requested in a query and presented. For example, a filtergram for data as of a certain step in a data preparation process can be displayed along with the lineage of the data. Data quality rules corresponding to the filtered data can also be shown.

As described above, different types of references may lead or correspond to different kinds of landing spots or entry points in the data preparation application. For example, in the cases of references referring to filtergram, data step, and data lineage contexts, a user can be referred to an entry or landing point in a project. In some embodiments, for a data quality reference, a user is landed in a data quality dashboard or report associated with a project. In some embodiments, the data quality dashboard includes various dimensions of data quality such as integrity, completeness, accuracy, age, recency, etc. computed for various dimensions (e.g., columns of data) of interest.

In some embodiments, the user is landed in a project summary screen in the first application. Other user interfaces may be brought up by the data preparation application, such as data set summary or library screens. Other examples of interfaces that may be presented include step editors (e.g., when presenting project steps or data lineage).

Additional Details Regarding Click-to-Prep

The following are additional details regarding click-to-prep. The additional details include examples of a framework for composing URLs such as filtergram and project step URLs.

As described above, a data preparation application such as that described above may be used in conjunction with data visualization tools such as Qlik and Tableau. For visualization tools that support dynamic URLs, "click-to-prep" links as described above may be created (e.g., manually or automatically at the visualization tool or preconfigured at the data preparation application) that will take a user from a visualization tool directly into a data preparation context associated with the data being visualized, such as a data lineage of the data, data quality summary of the data, a filtergram associated with the data, or a project step that generated or modified the data. A user may then open the link from the visualization tool, make modification to the data in the data preparation application, re-publish the results, and refresh the visualization to reflect the updated data.

Example details regarding configuration of project filtergram and project step links are described below.

Example Click-to-Prep for Project Filtergrams

Figure 21:
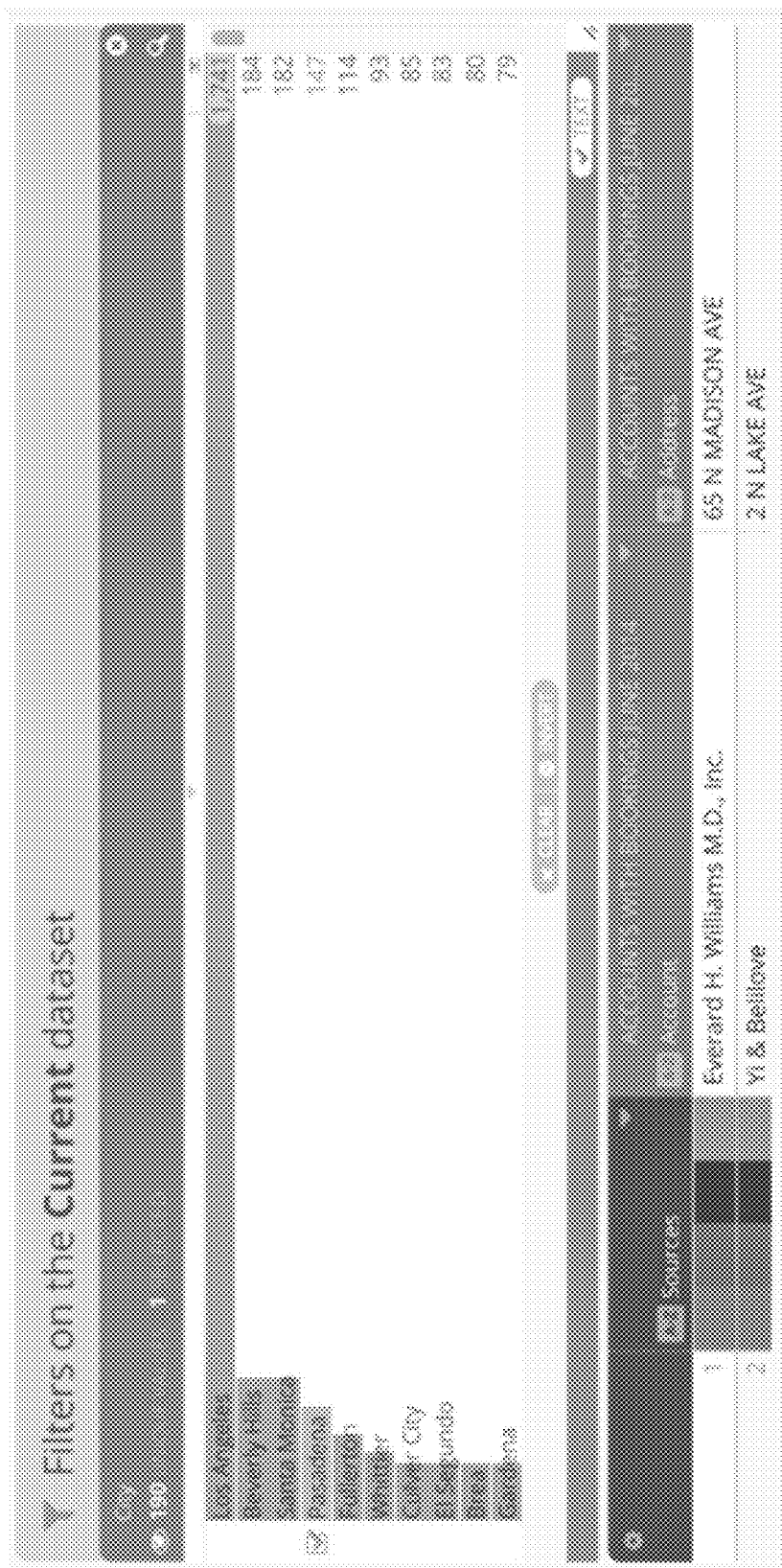
FIG. 21 illustrates an example embodiment of a filtergram.

In some embodiments, as described above, a filtergram type link causes to be opened in a data preparation application a filtergram for a dataset on a specified column and value. For example, the following click-to-prep link navigates to the "customers" project and opens the example filtergram of FIG. 21 on the column "city" filtered to the value "Pasadena."

https://prod.paxata.com/#/view/Customers?filtercolumn-City&filtervalue-Pasade na FIG. 21 illustrates an example embodiment of a filtergram. Further details regarding creating a filtergram-type link are described below.

Example Configuration of a Click-to-Prep Link for Project Filtergrams

An example format and configuration parameters for filtergram links are described below. An example embodiment of steps for creating filtergram links in a visualization tool such as Tableau are described below.

The following is an example embodiment of a structure or template or format of a filtergram link including the format and configuration parameters for the link:

https://[server]/#/view/[projectname]?filtercolumn=[column]&filtervalue[value]

In some embodiments, the portion of the link after the "#" symbol in the URL is case sensitive. Links such as the filtergram link may be embedded in visualization tools that support dynamic URLs.

In some embodiments, if a project's name or a column's name includes one or more spaces, each space in the URL must be replaced or resolved with "%20" (the HTML encoding value for a space). For example:

https://<server>/#/edit/Web %20Campaigns %20demo/ Phone %20Number.

In some embodiments, a visualization tool provides an option to automatically encode spaces. An HTML URL encoding reference can be used for other special characters that require encoding.

Example Tableau Steps to Create Click-to-Prep Link for a Project Filtergram

Figure 22A:
FIG. 22A illustrates an embodiment of an interface for creating a click-to-prep link for a project filtergram in a visualization tool.
Figure 22B:
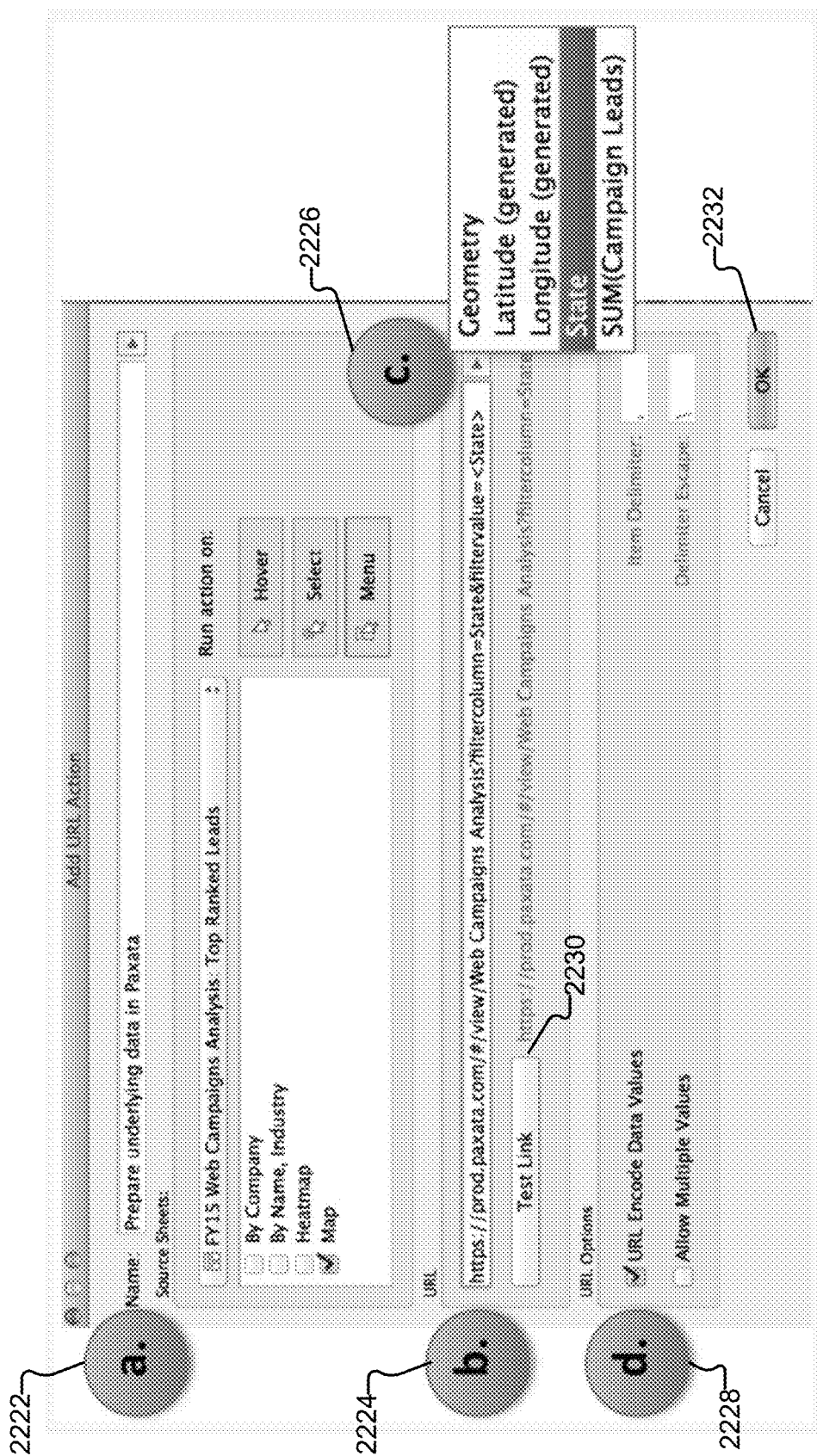
FIG. 22B illustrates an embodiment of an interface for creating a click-to-prep link for a project filtergram in a visualization tool.

FIGS. 22A and 22B illustrate example steps for creating (e.g., manually composing) a click-to-prep link for a project filtergram in the Tableau visualization tool.

FIG. 22A illustrates an embodiment of an interface for creating a click-to-prep link for a project filtergram in a visualization tool. In this example, a first step for creating a filtergram link is shown, where a user opens a visualization in Tableau and goes to: "Worksheet"→"Actions" (2202).

FIG. 22B illustrates an embodiment of an interface for creating a click-to-prep link for a project filtergram in a visualization tool. In this example, a second step for creating a filtergram link is shown, where the "Add URL Action" is selected, and where a user is prompted to provide configuration information.

In this example, at 2222, a field for entering a name for the link is provided. In some embodiments, the provided name is the name for the link that is displayed in Tableau.

At 2224, a field is provided for entering the project filtergram link, which, in this example, is a URL of the format:

https://[server]/#/view/[projectname]?filtercolumn=[column]&filtervalue=[value]

As described above, in some embodiments, the portion of the URL after the "#" symbol is case sensitive.

At 2226, a user may click to select the Tableau column that will dynamically receive data from the URL specified at 2224.

At 2228, an option is provided to URL encode data values (e.g., user may check the option).

In some embodiments, a user clicks on "test link" button 2230 to verify that the link works. The user can save the URL by clicking on button 2232.

Example Click-to-Prep for a Project Step

In some embodiments, a project step-type link causes a project to be opened in a data preparation application to:
the last step that edits or modifies a column
or
the last [StepType] that edits or modifies a column, for example, a "Find and Replace" step on the column.

In some embodiments, the project is opened in an edit mode.

Figure 23A:
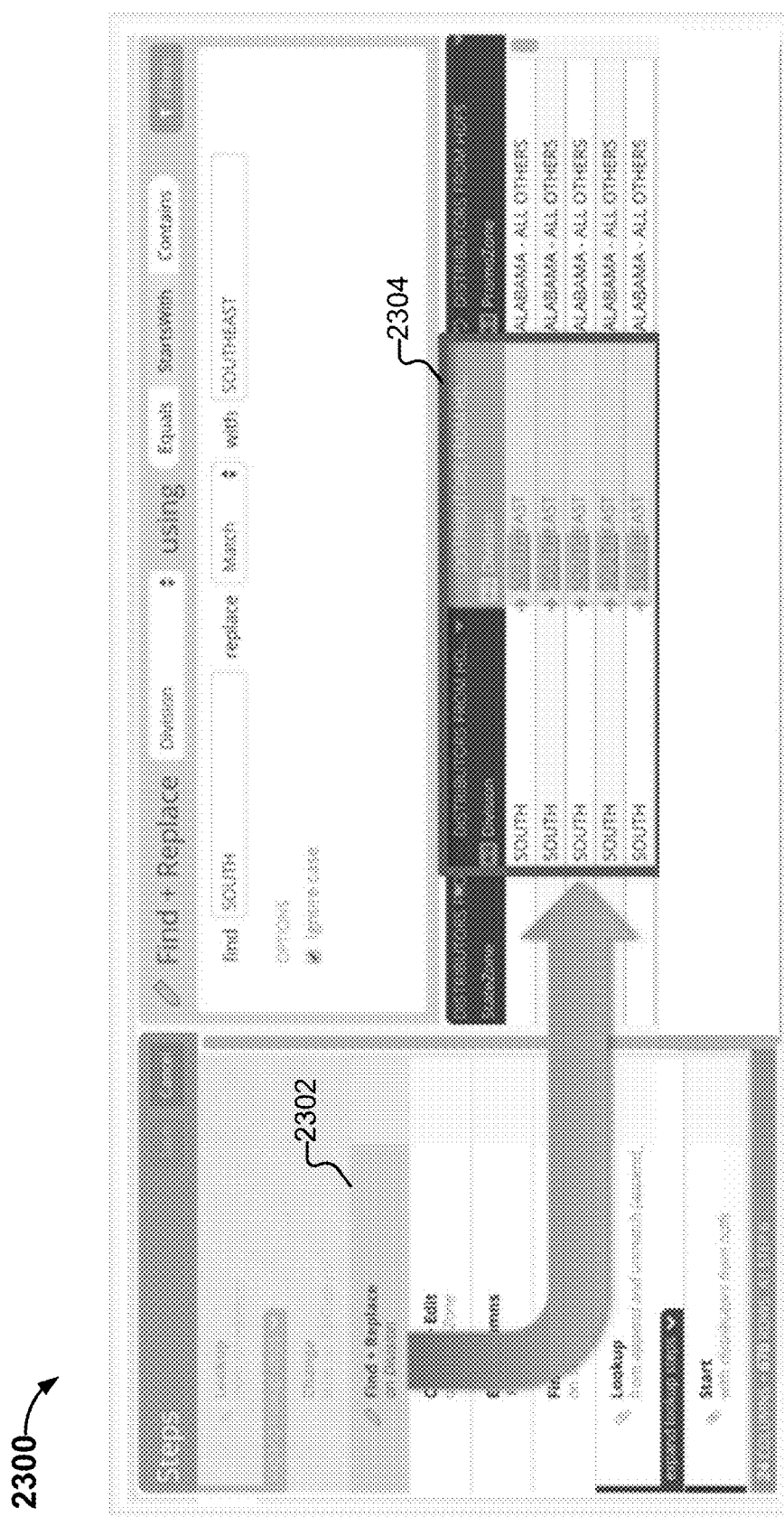
FIG. 23A illustrates an embodiment of navigating to a last step in a project that affected or modified data in a column.

FIG. 23A illustrates an embodiment of navigating to a last step in a project that affected or modified data in a column. Consider the following example project step link:

https://prod.paxata.comMedit/Customer/Division

The above example link navigates to the last step in the "customer" project that affected or modified data in the "division" column, as shown in the example interface 2300. In some embodiments, interface 2300 is a portion of a step editor of a data preparation application. As shown, the link navigates a user to the last step edit that occurred for the "division" column. In this example, the last step is highlighted at 2302 in the step editor. Corresponding data (e.g., cached data as of the last step) is shown at 2304.

Figure 23B:
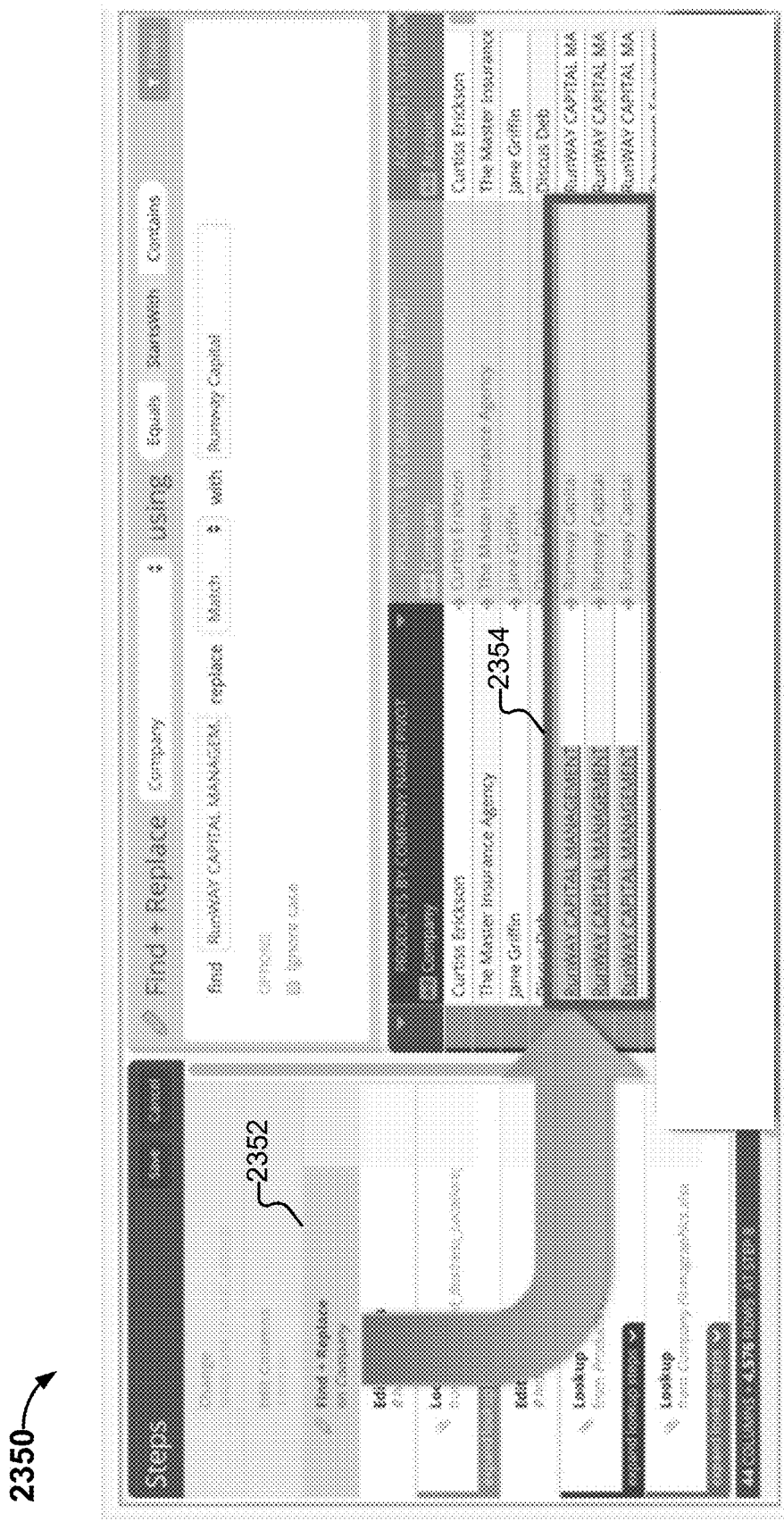
FIG. 23B illustrates an embodiment of navigating to a project where the last step of a particular type was made on a column.

FIG. 23B illustrates an embodiment of navigating to a project where the last step of a particular type was made on a column. Consider the following example project step link:

https://prod.paxata.comMedit/Customer/ Company?Filter=BulkEditStep

The above example link navigates to the "customer" project where the last "Find+Replace" [BulkEditStep] step was made on the "company" column, as shown in the example interface 2350. In some embodiments, interface 2350 is a portion of a step editor of a data preparation application. As shown, the link navigates a user to the last step in the project where a "Find+Replace" occurred for the column, as specified in the link. In this example, the last "Find+Replace" step is highlighted in the step editor at 2352. Corresponding data (e.g., cached data as of the last "Find+Replace" step) is shown at 2354.

FIG. 24 illustrates example types of steps (also referred to herein as "[StepTypes]") that are supported using the click-to-prep techniques described herein. In some embodiments, if there is more than one of the step-types shown in a project, the project step link points to the last one that occurs in a panel of steps (e.g., step editor).

Example Configuration of a Click-to-Prep Link for a Project Step

An example format and configuration parameters for project step links are described below. An example embodiment of steps for creating project step links in a visualization tool such as Tableau is described below.

The following is an example embodiment of a structure or template or format for a project step link for the last step that edits or modifies a column:

https://[server]/#/edit/[projectname]/[columnname]

The following is an example embodiment of a structure or template or format for a project step link that edits or modifies a column, for example, a "Find and Replace" step on the column:

https://[server]/#/edit/[projectname]/[columnname]?filter=[StepType]

In some embodiments, the following [StepTypes] are supported:

Anchor table step
Append step
Bulk edit step
Cluster and edit step
Duplicate column step
Edit columns step
Expression step
Pivot step
Transform step Explanations for each [StepType] are described in conjunction with FIG. 24.

Similar to project filtergrams, as described above (and also applicable to other links such as those for data quality and lineage), in some embodiments, the portion of the link after the "#" symbol in the URL is case sensitive. Links such as the filtergram link may be embedded in visualization tools that support dynamic URLs.

In some embodiments, if a project's name or a column's name includes one or more spaces, each space in the URL must be replaced or resolved with "%20" (the HTML encoding value for a space). For example:

https://<server>/#/edit/Web %20Campaigns %20demo/Phone %20Number.

In some embodiments, a visualization tool provides an option to automatically encode spaces. An HTML URL encoding reference can be used for other special characters that require encoding.

Example Tableau Steps to Create Click-to-Prep Link for a Project Step

Figure 25A:
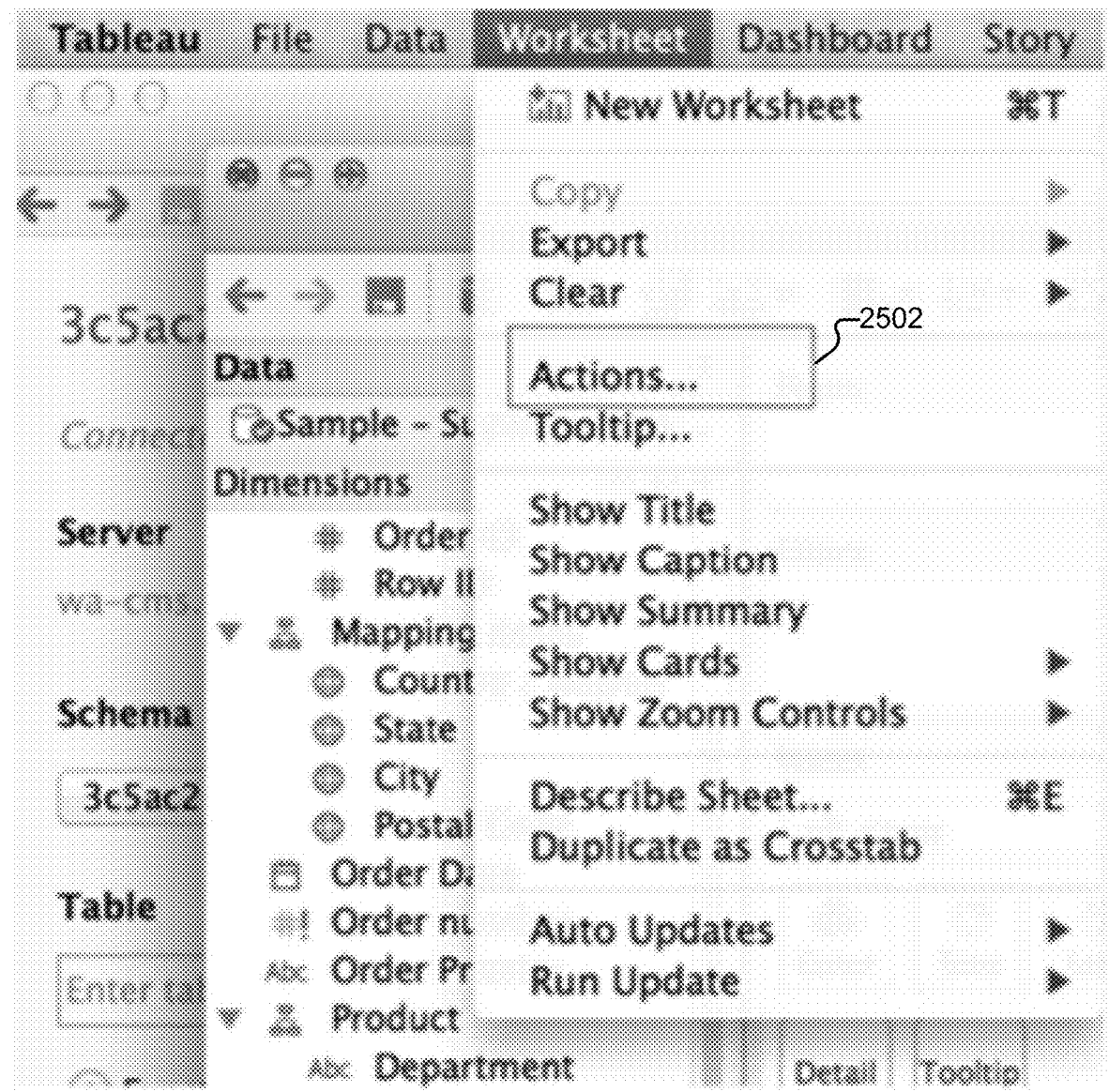
FIG. 25A illustrates an embodiment of an interface for creating a click-to-prep link for a project step in a visualization tool.
Figure 25B:
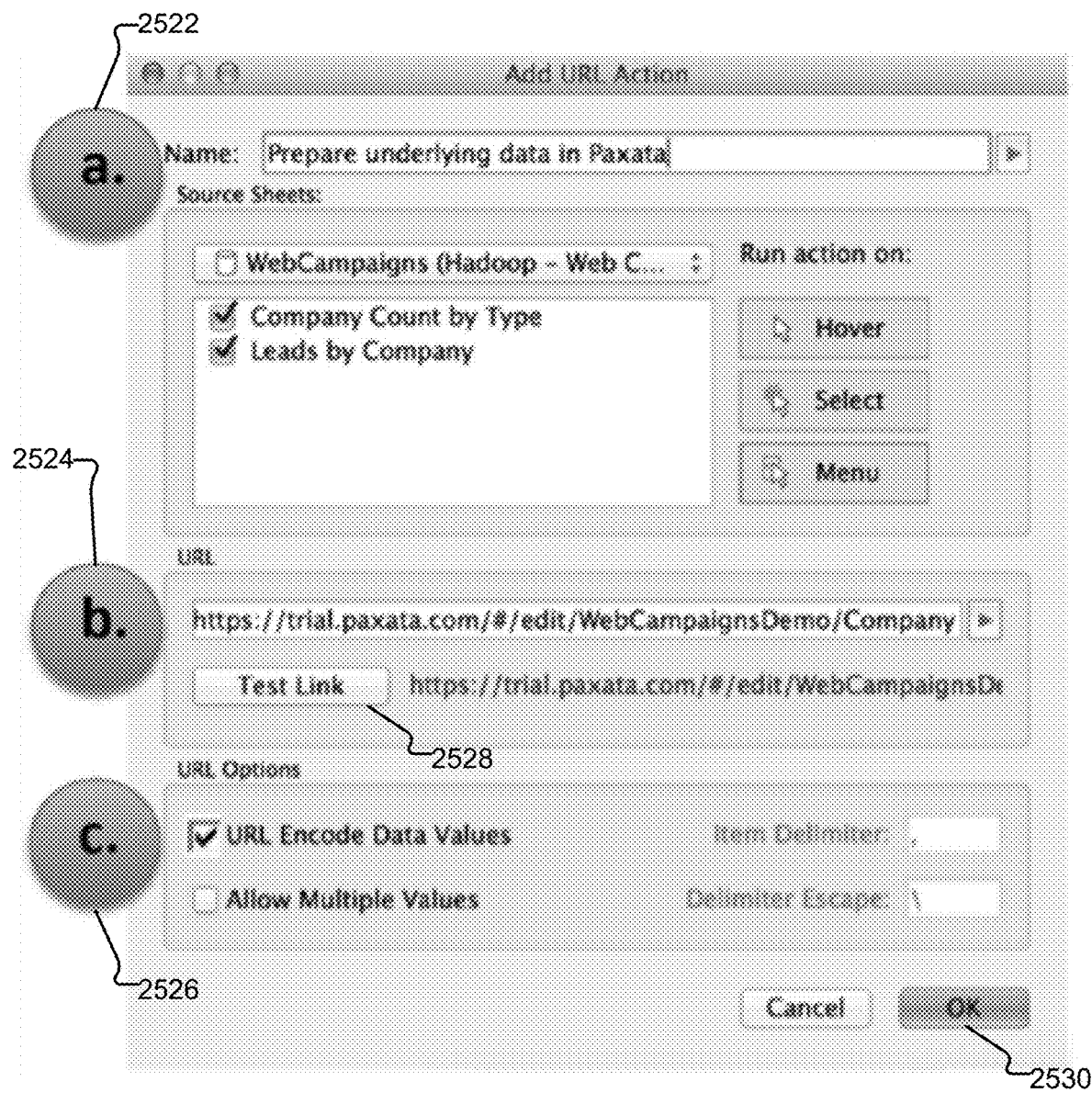
FIG. 25B illustrates an embodiment of an interface for creating a click-to-prep link for a project step in a visualization tool.

FIGS. 25A and 25B illustrate example steps for creating (e.g., manually composing) a click-to-pre link for a project step in the Tableau visualization tool.

FIG. 25A illustrates an embodiment of an interface for creating a click-to-prep link for a project step in a visualization tool. In this example, a first step for creating a project step link is shown, where a user opens a visualization in Tableau and goes to: "Worksheet"->"Actions" (2502).

FIG. 25B illustrates an embodiment of an interface for creating a click-to-prep link for a project step in a visualization tool. In this example, a second step for creating a project step link is shown, where the "Add URL Action" is selected, and where a user is prompted to provide configuration information.

In this example, at 2522, a field for entering a name for the link is provided. In some embodiments, the provided name is the name or label for the link that is displayed in Tableau.

At 2524, a field is provided for entering the project step link. The link may be in the following formats:

for the last project step that edits or modifies a column:
https://[serverlattedit/[projectname]/[columnname]

for the last [StepType] that edits or modifies a column:
https://[server]/#/edit/[projectname][columnname]?filter=[StepType]

Explanations of various example step types are described in conjunction with FIG. 24.

As described above, in some embodiments, the portion of the URL after the "#" symbol is case sensitive.

At 2526, an option is provided to URL encode data values (e.g., user may check the option).

In some embodiments, a user clicks on "test link" button 2528 to verify that the link works. The user can save the URL by clicking on button 2530.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
sequentially perform, using a data preparation application, a set of data preparation operations on one or more data sets to generate a set of answer sets, wherein an answer set comprises a result of transforming at least a portion of the one or more data sets using at least some of the set of data preparation operations;
provide a final answer set in the set of answer sets to a visualization application, wherein the visualization application is configured to render a visualization of data associated with the final answer set;
in response to a user specification of a source related query made from within the visualization application, obtain a reference associated with the source related query, wherein the reference comprises a link for navigating a user from the visualization application to a data preparation context in the data preparation application that is associated with the data associated with the final answer set that is visualized using the visualization application;
determine, according to the obtained reference, a corresponding subset of the set of answer sets associated with one or more corresponding data preparation operations; and
present, in the data preparation application, the corresponding subset of the set of answer sets associated with the one or more data preparation operations according to the obtained reference; and
a memory coupled to the one or more processors and configured to provide the one or more processors with instructions.

2. The system of claim 1 wherein in response to the reference being invoked in the visualization application, the data preparation application is activated.

3. The system of claim 1 wherein the data preparation context comprises a histogram of filtered data associated with the final answer set.

4. The system of claim 1 wherein the data preparation context comprises a project step that affected at least some data associated with the final answer set.

5. The system of claim 1 wherein the data preparation context comprises a lineage of at least some data associated with the final answer set.

6. The system of claim 1 wherein the data preparation context comprises a data quality summary of at least some data associated with the final answer set.

7. The system of claim 1 wherein the reference is provided to the visualization application with the final answer set.

8. The system of claim 1 wherein the reference is composed at the visualization application.

9. A method, comprising:

sequentially performing, using a data preparation application, a set of data preparation operations on one or more data sets to generate a set of answer sets, wherein an answer set comprises a result of transforming at least a portion of the one or more data sets using at least some of the set of data preparation operations;

providing a final answer set in the set of answer sets to a visualization application, wherein the visualization application is configured to render a visualization of data associated with the final answer set;

in response to a user specification of a source related query made from within the visualization application, obtaining a reference associated with the source related query, wherein the reference comprises a link for navigating a user from the visualization application to a data preparation context in the data preparation application that is associated with the data associated with the final answer set that is visualized using the visualization application;

determining, using one or more processors and according to the obtained reference, a corresponding subset of the set of answer sets associated with one or more corresponding data preparation operations; and presenting, in the data preparation application, the corresponding subset of the set of answer sets associated with the one or more data preparation operations according to the obtained reference.

10. The method of claim 9 wherein the data preparation context comprises a histogram of filtered data associated with the final answer set.

11. The method of claim 9 wherein the data preparation context comprises a project step that affected at least some data associated with the final answer set.

12. The method of claim 9 wherein the data preparation context comprises a lineage of at least some data associated with the final answer set.

13. The method of claim 9 wherein the data preparation context comprises a data quality summary of at least some data associated with the final answer set.

14. A computer program product embodied in a non-transitory computer readable storage medium and comprising computer instructions for:

sequentially performing, using a data preparation application, a set of data preparation operations on one or more data sets to generate a set of answer sets, wherein an answer set comprises a result of transforming at least a portion of the one or more data sets using at least some of the set of data preparation operations;

providing a final answer set in the set of answer sets to a visualization application, wherein the visualization application is configured to render a visualization of data associated with the final answer set;

in response to a user specification of a source related query made from within the visualization application, obtaining a reference associated with the source related query, wherein the reference comprises a link for navigating a user from the visualization application to a data preparation context in the data preparation application that is associated with the data associated with the final answer set that is visualized using the visualization application;

determining, using one or more processors and according to the obtained reference, a corresponding subset of the set of answer sets associated with one or more corresponding data preparation operations; and presenting, in the data preparation application, the corresponding subset of the set of answer sets associated with the one or more data preparation operations according to the obtained reference.

15. The computer program product of claim 14 wherein the data preparation context comprises a histogram of filtered data associated with the final answer set.

16. The computer program product of claim 14 wherein the data preparation context comprises a project step that affected at least some data associated with the final answer set.

17. The computer program product of claim 14 wherein the data preparation context comprises a lineage of at least some data associated with the final answer set.

18. The computer program product of claim 14 wherein the data preparation context comprises a data quality summary of at least some data associated with the final answer set.

19. The computer program product of claim 14 wherein the reference is provided to the visualization application with the final answer set.

20. The computer program product of claim 14 wherein the reference is composed at the visualization application.

* * * * *